(12) United States Patent
Osada

(10) Patent No.: US 12,435,967 B2
(45) Date of Patent: Oct. 7, 2025

(54) MAGNETISM DETECTION DEVICE AND ABSOLUTE ENCODER

(71) Applicant: MINEBEA MITSUMI Inc., Nagano (JP)

(72) Inventor: Yasuo Osada, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 245 days.

(21) Appl. No.: 18/547,747

(22) PCT Filed: Feb. 24, 2022

(86) PCT No.: PCT/JP2022/007640
§ 371 (c)(1),
(2) Date: Aug. 24, 2023

(87) PCT Pub. No.: WO2022/181700
PCT Pub. Date: Sep. 1, 2022

(65) Prior Publication Data
US 2024/0133671 A1     Apr. 25, 2024
US 2024/0230310 A9     Jul. 11, 2024

(30) Foreign Application Priority Data

Feb. 26, 2021   (JP) ................. 2021-031228

(51) Int. Cl.
*G01B 7/30*       (2006.01)
*G01D 5/14*       (2006.01)

(52) U.S. Cl.
CPC ........ *G01B 7/30* (2013.01); *G01D 5/14* (2013.01)

(58) Field of Classification Search
CPC .... G01B 7/30; G01D 11/245; G01D 2205/26; G01D 11/30; G01D 5/14; G01D 5/145
See application file for complete search history.

(56) References Cited

U.S. PATENT DOCUMENTS

2008/0164866 A1 *   7/2008   Steinich ............ G01D 5/08
                                                    324/207.2
2011/0080162 A1      4/2011   Steinich et al.
(Continued)

FOREIGN PATENT DOCUMENTS

EP    3 109 599 A1    12/2016
EP    3 650 815 A1     5/2020
(Continued)

OTHER PUBLICATIONS

International Search Report for corresponding International Application No. PCT/JP2022/007640 mailed May 17, 2022.
(Continued)

*Primary Examiner* — Judy Nguyen
*Assistant Examiner* — Adam S Clarke
(74) *Attorney, Agent, or Firm* — Chrisman Gallo Tochtrop LLC

(57) ABSTRACT

Shielding members having different thicknesses can be easily attached. A magnetism detection device includes a magnet (Mr) magnetized, an angle sensor (Sr) as a magnetic sensor configured to detect a magnetic flux from the magnet (Mr), a magnet holder holding the magnet (Mr), and a second layshaft gear shaft. The magnetism detection device includes a case including a plurality of outer wall portions and a lid portion and configured to accommodate the magnet (Mr) and the magnetic sensor (Sr) inside and a shielding member having a flat plate shape and a shape corresponding to the lid portion and attached to the lid portion. The shielding member includes a protruding portion protruding outward from an outer peripheral portion. The case includes a recessed portion opening inward at an end portion outside of the lid portion and configured to accommodate the protruding portion. The recessed portion includes a plurality (Continued)

of sidewall portions having different widths and a plurality of upper wall portions having different heights.

6 Claims, 41 Drawing Sheets

(56) References Cited

U.S. PATENT DOCUMENTS

| | | | |
|---|---|---|---|
| 2016/0352190 | A1 | 12/2016 | Hieda et al. |
| 2017/0052038 | A1* | 2/2017 | Aichriedler ............ G01D 5/145 |
| 2020/0132507 | A1 | 4/2020 | Osada |
| 2022/0333959 | A1* | 10/2022 | Loeken ................. G01D 5/145 |

FOREIGN PATENT DOCUMENTS

| | | |
|---|---|---|
| JP | 2016-109431 A | 6/2016 |
| JP | 2016-217993 A | 12/2016 |
| JP | 2019-015536 A | 1/2019 |
| JP | 2020-153794 A | 9/2020 |

OTHER PUBLICATIONS

Written Opinion for corresponding International Application No. PCT/JP2022/007640 dated May 17, 2022.

\* cited by examiner

MAGNETISM DETECTION DEVICE AND ABSOLUTE ENCODER

CROSS-REFERENCE TO RELATED APPLICATIONS

This application is a national stage entry of International Application No. PCT/JP2022/007640 filed on Feb. 24, 2022, which claims the benefit of priority to Japanese Application No. JP2021-031228, filed Feb. 26, 2021, the entire disclosures of which are hereby incorporated herein by reference.

TECHNICAL FIELD

The present invention relates to a magnetism detection device and an absolute encoder.

BACKGROUND ART

Magnetism detection devices configured to detect a magnetic flux from a magnet by using a magnetic sensor have been used for various technologies. In various types of control mechanical devices, the magnetism detection devices are also sometimes used for a rotary encoder used to detect a position and angle of a movable element. The rotary encoder includes an incremental-type encoder configured to detect a relative position or angle and an absolute-type absolute encoder configured to detect an absolute position or angle. Such an absolute encoder sometimes includes a magnetism detection device, and the known absolute encoder including the magnetism detection device includes a magnetic encoder device including a magnetized magnet attached to a rotation shaft (main shaft) to be measured and configured to detect the rotation angle of the magnet by using a magnetic sensor to detect the amount of rotation of the main shaft to be measured. In addition, a known method specifies the amount of rotation of the main shaft during multiple rotations by acquiring the rotation angle of a rotating body rotating while decelerating due to the rotation of the main shaft.

To broaden the range of the specifiable amount of rotation of the main shaft while maintaining the resolution of the specifiable amount of rotation of the main shaft, such an absolute encoder has a proposed structure for detecting the amounts of rotation of a plurality of magnets by using magnetic sensors as angle sensors corresponding to the magnets. For example, proposed has been a structure for connecting the main shaft and a layshaft or a subsequent shaft by using a reduction mechanism and detecting the amount of rotation of a magnet attached to each shaft by a magnetic sensor corresponding to the magnet to specify the amount of rotation of the main shaft (see, for example, Patent Document 1).

CITATION LIST

Patent Literature

Patent Document 1: JP 2019-15536 A

SUMMARY OF INVENTION

Technical Problem

In such an absolute encoder configured to detect the amount of rotation of the magnet, the magnetic flux of the magnet detected by the magnetic sensor periodically changes when the rotation shaft rotates, and the amount of rotation of the rotation shaft is detected on the basis of the change of the magnetic flux in a predetermined rotation period of the rotation shaft. For this reason, part of a magnetic flux generated from an external device or the like affecting the magnetic sensor, a magnetism detection element, may degrade the detection accuracy due to an influence of noise from an external element other than a permanent magnetic flux from a magnet to be originally detected. Thus, to prevent the magnetic flux from the external device from affecting the magnetic sensor, a magnetic shielding member made of a magnetic member may be provided outside a case of the absolute encoder.

However, the shielding performance required for the magnetic shielding member of the absolute encoder varies depending on use environments and required specifications. The shielding performance of the magnetic shielding member can be changed by changing the plate thickness of the member. For this reason, a plurality of different shielding members needs to be easily attached.

The present invention has been made in view of the above-described problems, and an object of the present invention is to provide a magnetism detection device configured to easily attach shielding members having different thicknesses and an absolute encoder.

Solution to Problem

To achieve the above object, a magnetism detection device according to the present invention includes: a magnet magnetized; a magnetic sensor configured to detect a magnetic flux from the magnet; a magnet holder holding the magnet; a shaft; a case including a plurality of sidewall portions and an upper surface portion and configured to accommodate the magnet and the magnetic sensor inside; and a shielding member having a flat plate shape and a shape corresponding to the upper surface portion and attached to the upper surface portion. The shielding member includes a protruding portion protruding outward from an outer peripheral portion. The case includes a recessed portion opening inward at an end portion outside of the upper surface portion and configured to accommodate the protruding portion. The recessed portion includes a plurality of sidewall portions having different widths and a plurality of upper wall portions having different heights.

In the magnetism detection device according to an aspect of the present invention, the heights of the plurality of upper wall portions are set according to a height of the protruding portion of a plurality of the shielding members having different plate thicknesses, and the widths of the plurality of sidewall portions are set according to a width of the protruding portion of the plurality of the shielding members having different plate thicknesses.

In the magnetism detection device according to an aspect of the present invention, the case includes a recessed portion forming portion with the recessed portion formed projecting upward from an end portion outside of the upper surface portion, and the shielding member includes an outer surface portion facing the recessed portion forming portion at an outer side in a width direction from the protruding portion.

In the magnetism detection device according to an aspect of the present invention, the case includes a boss portion protruding upward from the upper surface portion, and the shielding member includes a boss hole configured to accommodate the boss portion.

In the magnetism detection device according to an aspect of the present invention, the shielding member includes, at an outer peripheral portion on a side opposite to a position where the protruding portion is provided, a bent surface portion bent along a sidewall portion of the sidewall portions of the case and a through hole formed in the bent surface portion, and the case includes, at the sidewall portion on a side opposite to a position where the protruding portion is provided, a screw hole configured to communicate with the through hole.

To achieve the above object, an absolute encoder according to the present invention includes a magnetism detection device according to the present invention.

Advantageous Effects of Invention

The magnetism detection device and the absolute encoder according to the present invention allows shielding members having different thicknesses to be easily attached.

DESCRIPTION OF EMBODIMENTS

Embodiments of the present invention are described below with reference to the drawings. The dimensions of members in each drawing are appropriately enlarged or reduced in order to facilitate understanding. In each drawing, some members not important in describing an embodiment of the present invention are omitted. Each drawing illustrates gears with a shape of a tooth portion omitted. Terms including ordinal numbers such as "first" and "second" are used to describe various components, but these terms are used only for distinguishing one component from other components and do not limit the components. The present invention is not limited by the present embodiment.

A magnetism detection device 60 according to an embodiment of the present invention includes a magnetized magnet Mr, an angle sensor Sr as a magnetic sensor for detecting a magnetic flux from the magnet Mr, a magnet holder 61 for holding the magnet Mr, and a second layshaft gear shaft 62 as a shaft. The magnet holder 61 is rotatably supported on the second layshaft gear shaft 62. The second layshaft gear shaft 62 is made of a magnetic material, and an attractive force due to a magnetic force is generated between the magnet Mr and the second layshaft gear shaft 62 in a direction of a rotation axis of the magnet holder 61. An absolute encoder 2 according to an embodiment of the present invention includes the magnetism detection device 60 according to the embodiment of the present invention described above. The structures of the absolute encoder 2 and the magnetism detection device 60 are described below in detail.

Figure 1:
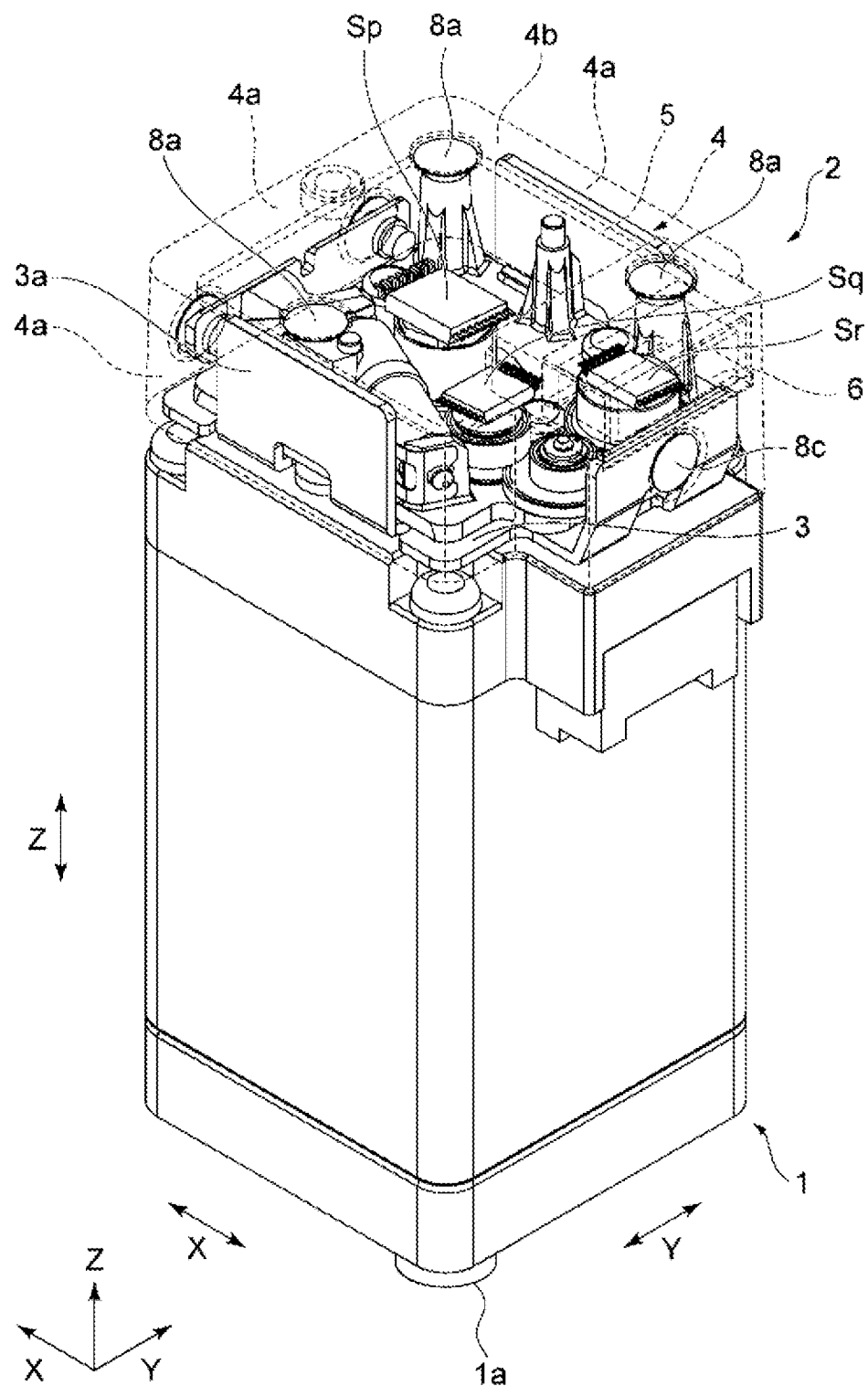
FIG. 1 is a perspective view schematically illustrating a configuration of an absolute encoder according to an embodiment of the present invention.
Figure 2:
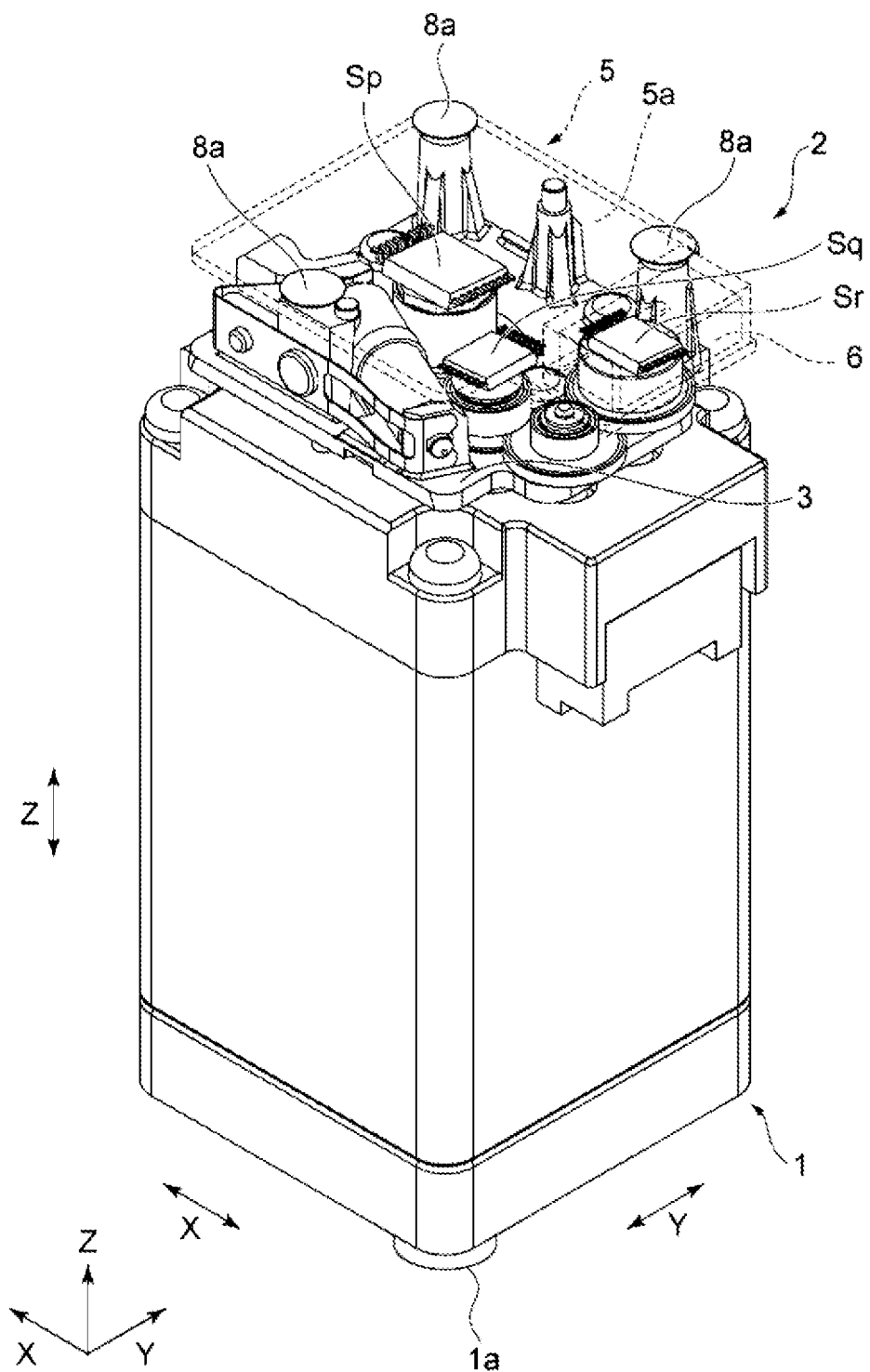
FIG. 2 is a perspective view schematically illustrating the configuration of the absolute encoder in FIG. 1 with a case and a shield removed.

FIG. 1 is a perspective view schematically illustrating a configuration of the absolute encoder 2 according to an embodiment of the present invention. FIG. 2 is a perspective view illustrating the configuration of the absolute encoder 2 in FIG. 1 with a case 4 and a shield removed. FIG. 1 transparently illustrates the shield, the case 4, and a substrate 5 of the absolute encoder 2, and FIG. 2 transparently illustrates the substrate 5 of the absolute encoder 2.

In the present description, for the purpose of convenience, the absolute encoder 2 is described with reference to an XYZ orthogonal coordinate system. The X-axis direction corresponds to a horizontal left-right direction, the Y-axis direction corresponds to a horizontal front-rear direction, and the Z-axis direction corresponds to a vertical up-down direction. The Y-axis direction and the Z-axis direction are orthogonal to the X-axis direction. In the present description, the X-axis direction is also referred to as the left side or the right side, the Y-axis direction is also referred to as the front side or the rear side, and the Z-axis direction is also referred to as the upper side or the lower side. The absolute encoder 2 illustrated in FIGS. 1 and 2 is orientated (upright orientated) such that the left side in the X-axis direction is the left side and the right side in the X-axis direction is the right side. The absolute encoder 2 illustrated in FIGS. 1 and 2 is orientated such that the near side in the Y-axis direction is the front side and the back side in the Y-axis direction is the rear side. The absolute encoder 2 illustrated in FIGS. 1 and 2 is orientated such that the upper side in the Z-axis direction is the upper side and the lower side in the Z-axis direction is the lower side. A state viewed from the upper side in the Z-axis direction is referred to as a plan view, a state viewed from the front side in the Y-axis direction is referred to as a front view, and a state viewed from the X-axis direction is referred to as a side view. The notation for such directions is not intended to limit the use orientation of the absolute encoder 2, and the absolute encoder 2 may be used in any orientation.

As described above, the absolute encoder 2 is an absolute-type encoder specifying and outputting the amount of rotation of a main shaft 1a of a motor 1 over multiple rotations. In an embodiment of the present invention, the absolute encoder 2 is provided at an end portion at the upper side in the Z-axis direction of the motor 1. In an embodiment of the present invention, the absolute encoder 2 has a substantially rectangular shape in plan view and has a rectangular shape being thin and long in the up-down direction being the extension direction of the main shaft 1a in front view and side view. That is, the absolute encoder 2 has a flat rectangular parallelepiped shape being longer in the horizontal direction than in the up-down direction.

The absolute encoder 2 includes the case 4 configured to accommodate an internal structure. The case 4 includes a plurality of (for example, four) outer wall portions 4a surrounding at least part of the main shaft 1a of the motor 1, a main shaft gear 10, a first intermediate gear 20, a first layshaft gear 30, a second intermediate gear 70, and the magnet holder 61. The case 4 further includes a lid portion 4b configured to close an upper opening of the four outer wall portions 4a. The lid portion 4b is covered with a shield.

The motor 1 may be a stepper motor or a brushless DC motor, for example. As an example, the motor 1 may be a motor employed as a drive source for driving an industrial robot via a reduction mechanism such as strain wave gearing. The main shaft 1a of the motor 1 projects from the case of the motor at both sides in the up-down direction. The absolute encoder 2 outputs the amount of rotation of the main shaft 1a of the motor 1 as a digital signal.

The motor 1 has a substantially rectangular shape in plan view and also has a substantially rectangular shape in the up-down direction. That is, the motor 1 has a substantially cuboid shape. In plan view, the four outer wall portions constituting the outer shape of the motor 1 each have a length of 25 mm, for example. In other words, the external shape of the motor 1 is a 25 mm square in plan view. The absolute encoder 2 provided in the motor 1 is, for example, a 25 mm square in plan view to match the external shape of the motor 1.

In FIGS. 1 and 2, the substrate 5 is provided to cover the inside of the absolute encoder 2 together with the case 4. The substrate 5 has a substantially rectangular shape in plan view and is a plate-like printed wiring substrate being thin in the up-down direction. A connector 6 is connected to the substrate 5 and is used for connecting the absolute encoder 2 to an external device (not illustrated).

Figure 3:
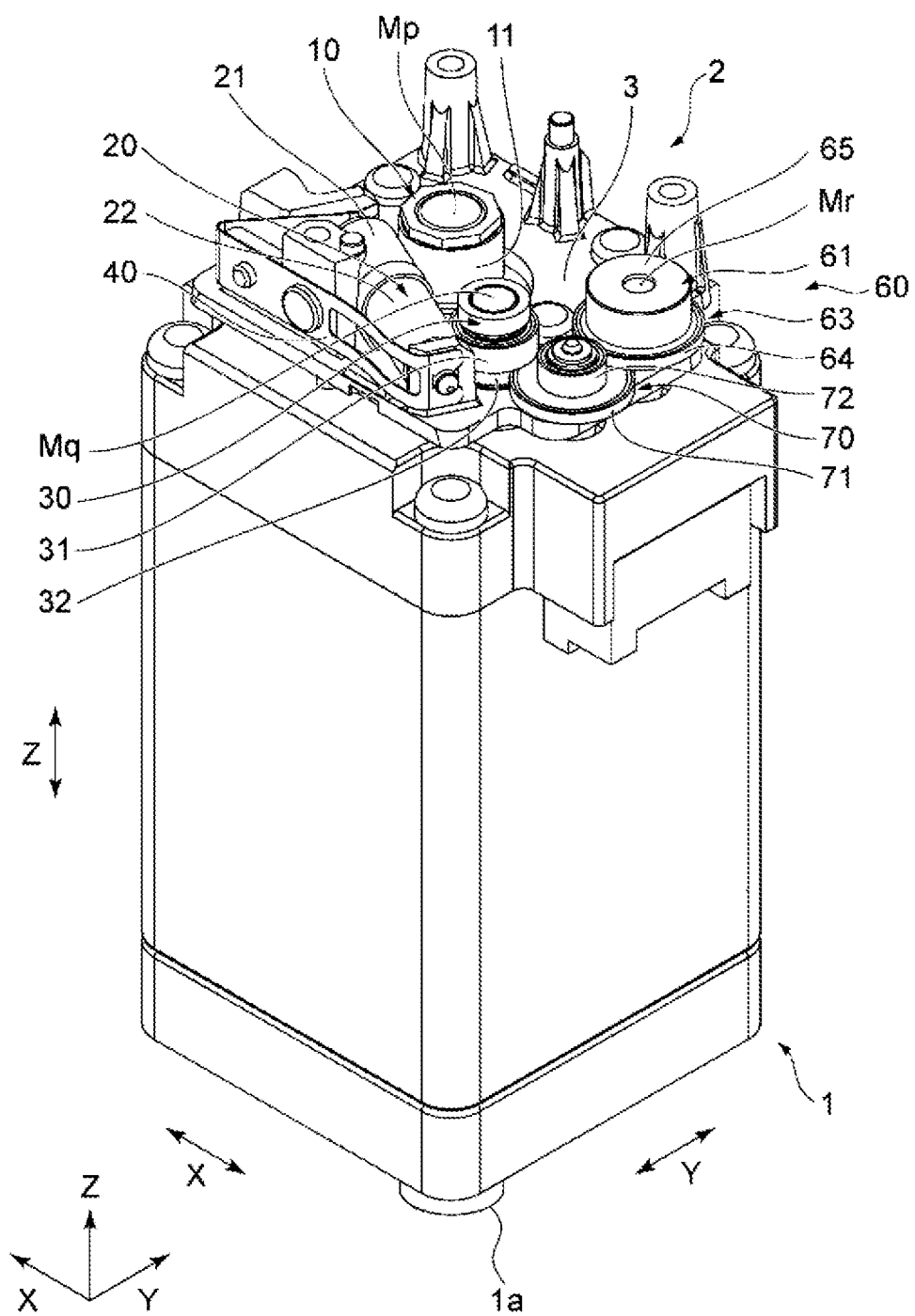
FIG. 3 is a perspective view schematically illustrating the configuration of the absolute encoder in FIG. 2 with a substrate, a connector, and a supporting plate removed.
Figure 4:
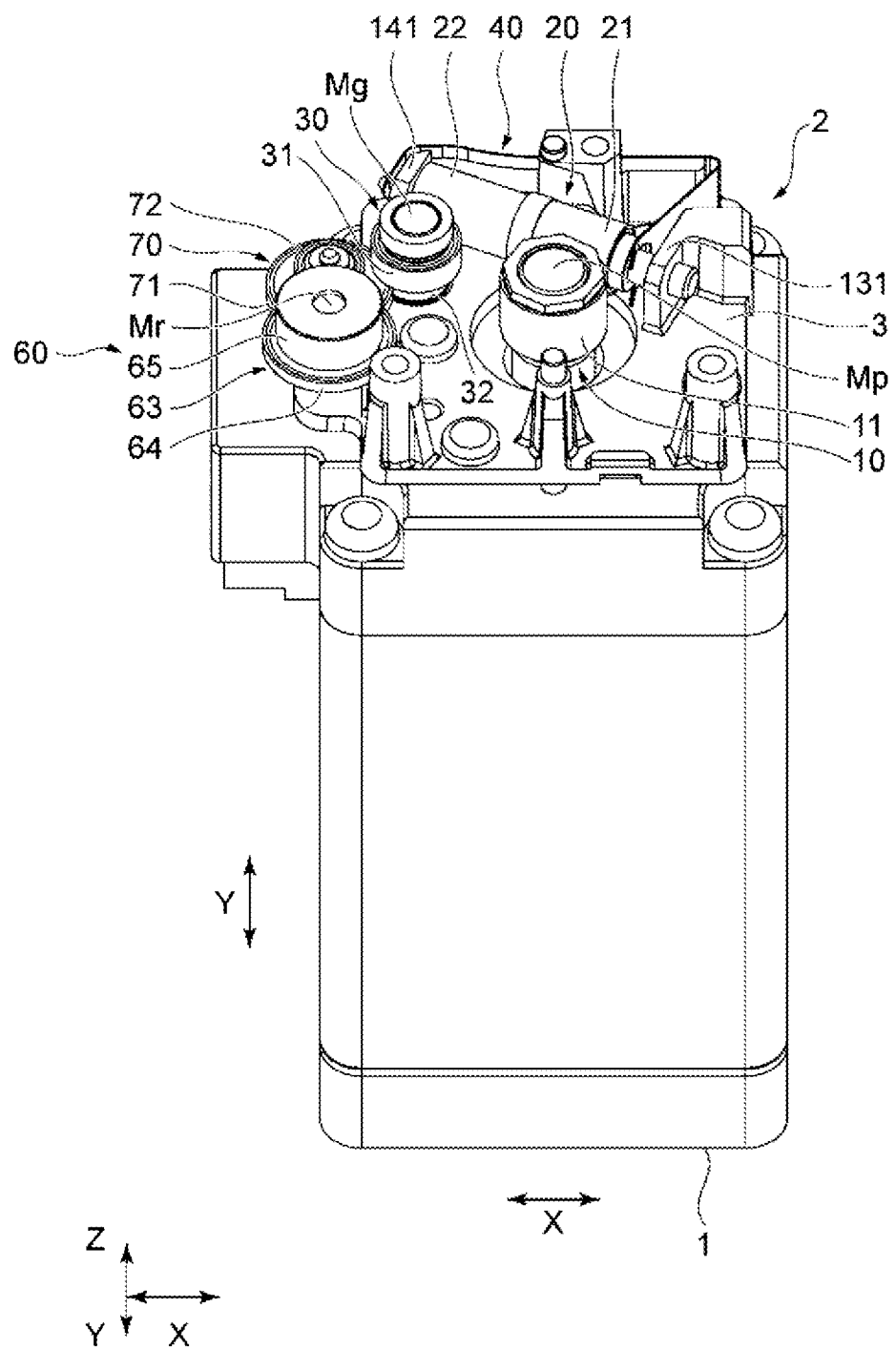
FIG. 4 is a perspective view schematically illustrating the configuration of the absolute encoder in FIG. 3 when viewed from another angle.
Figure 5:
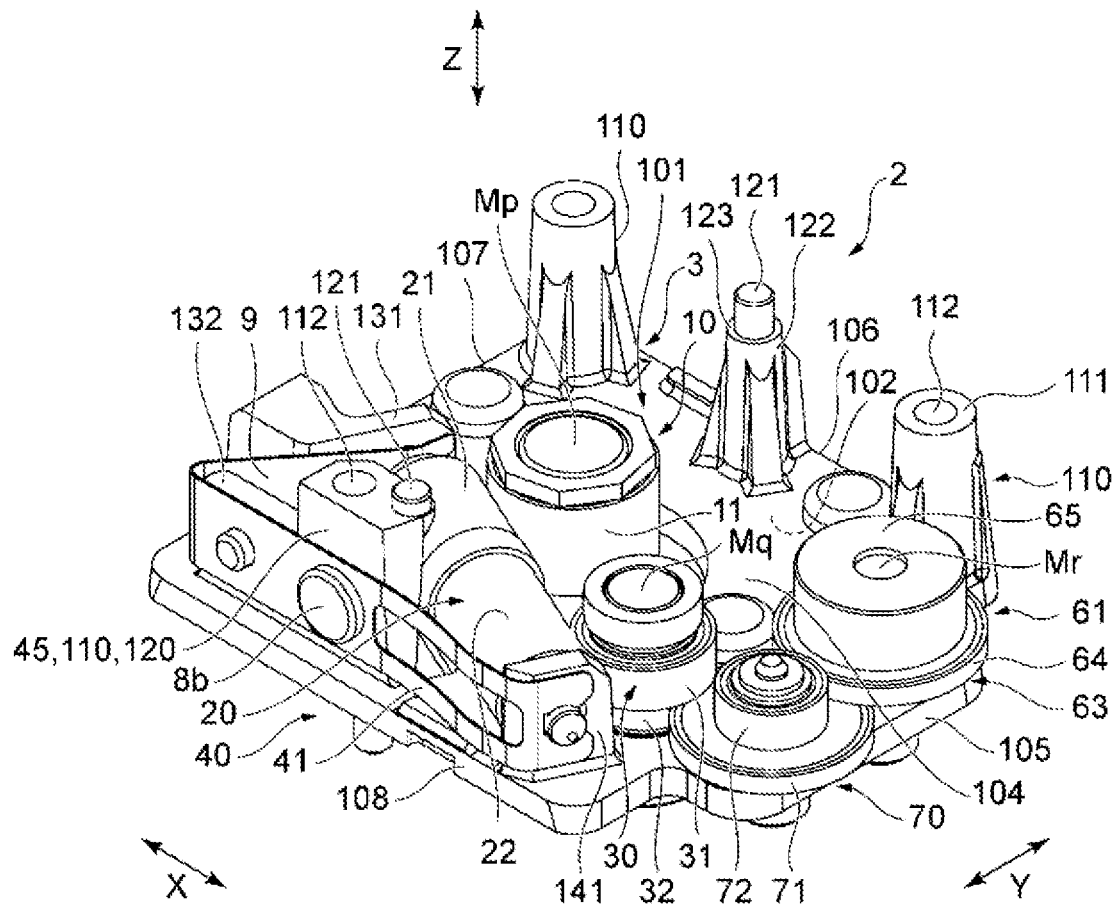
FIG. 5 is a perspective view schematically illustrating the configuration of the absolute encoder in FIG. 3 with a motor removed.
Figure 6:
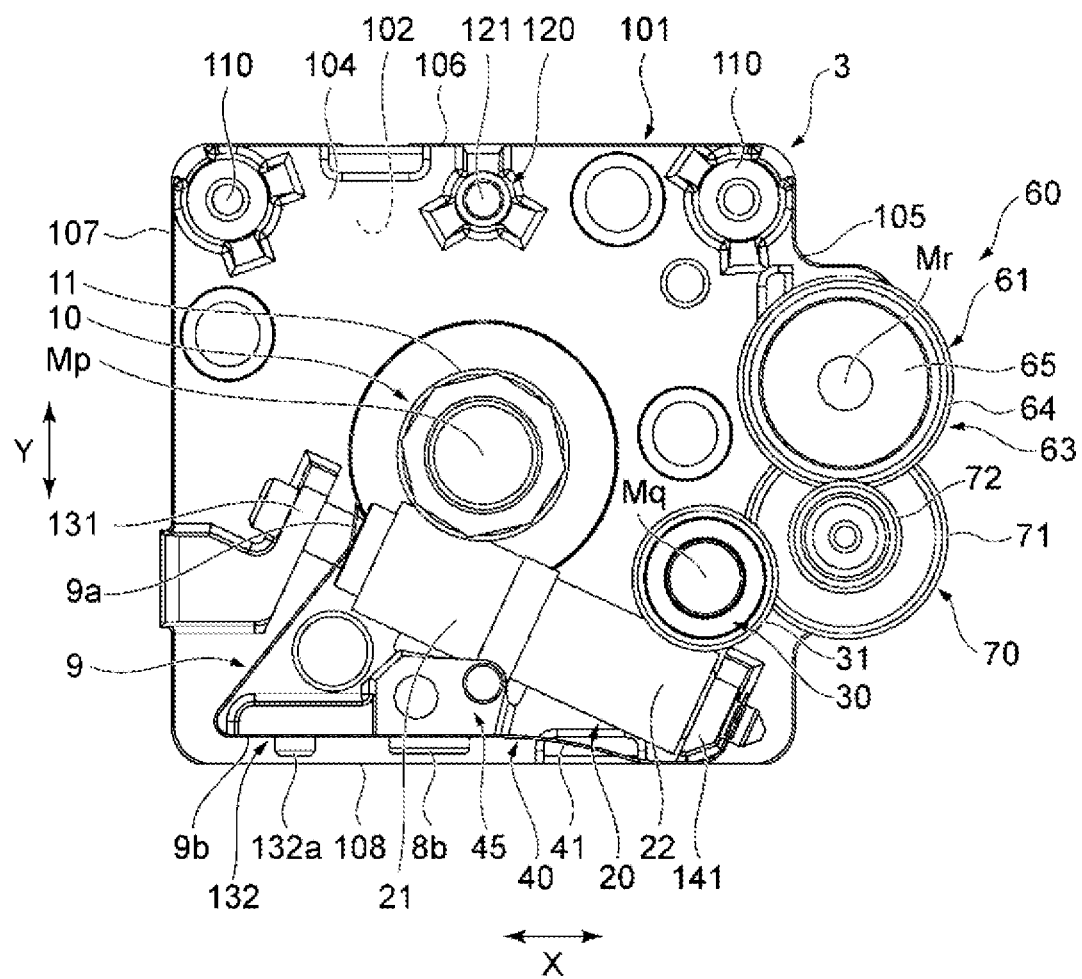
FIG. 6 is a plan view schematically illustrating the configuration of the absolute encoder in FIG. 5.

FIG. 3 is a perspective view schematically illustrating the configuration of the absolute encoder 2 in FIG. 2 with the substrate 5 and the connector 6 removed. FIG. 4 is a perspective view schematically illustrating the configuration of the absolute encoder 2 in FIG. 3 when viewed from another angle. FIG. 5 is a perspective view schematically illustrating the configuration of the absolute encoder 2 in FIG. 3 with the motor 1 removed. FIG. 6 is a plan view schematically illustrating the configuration of the absolute encoder 2 in FIG. 5.

The absolute encoder 2 includes the main shaft gear 10 having a first worm gear portion 11 (first drive gear), the first intermediate gear 20 having a first worm wheel portion 21 (first driven gear) and a second worm gear portion 22 (second drive gear), the first layshaft gear 30 having a second worm wheel portion 31 (second driven gear) and a gear portion 32 (third drive gear), the second intermediate gear 70, the magnet holder 61 having a second layshaft gear 63, a magnet Mp, an angle sensor Sp corresponding to the magnet Mp, a magnet Mq, an angle sensor Sq corresponding to the magnet Mq, the magnet Mr, an angle sensor Sr corresponding to the magnet Mr, and a microcomputer 51.

The main shaft 1a of the motor 1 is an output shaft of the motor 1 and is an input shaft transmitting rotational force to the absolute encoder 2. The main shaft gear 10 is fixed to the main shaft 1a of the motor 1 and is rotatably supported by a bearing member of the motor 1 integrally with the main shaft 1a. The first worm gear portion 11 is provided at an outer periphery of the main shaft gear 10 to rotate with the rotation of the main shaft 1a of the motor 1. In the main shaft gear 10, the first worm gear portion 11 is provided so that the central axis of the first worm gear portion 11 coincides with or substantially coincides with the central axis of the main shaft 1a. The first worm wheel portion 21 is provided at an outer periphery of the first intermediate gear 20 and is provided to mesh with the first worm gear portion 11 and rotate with the rotation of the first worm gear portion 11. The axial angle between the first worm wheel portion 21 and the first worm gear portion 11 is set to 90° or approximately 90°.

Although the outer diameter of the first worm wheel portion 21 is not particularly limited, in the illustrated example, the outer diameter of the first worm wheel portion 21 is set to be smaller than the outer diameter of the first worm gear portion 11 (see FIG. 8), and the outer diameter of the first worm wheel portion 21 is reduced. This reduces the dimension in the up-down direction of the absolute encoder 2.

The second worm gear portion 22 is provided at the outer periphery of the first intermediate gear 20 and rotates with the rotation of the first worm wheel portion 21. In the first intermediate gear 20, the second worm gear portion 22 is provided so that a central axis of the second worm gear portion 22 coincides with or substantially coincides with a central axis of the first worm wheel portion 21. The second worm wheel portion 31 is provided at an outer periphery of the first layshaft gear 30 and is provided to mesh with the second worm gear portion 22 and rotate with the rotation of the second worm gear portion 22. The axial angle between the second worm wheel portion 31 and the second worm gear portion 22 is set to 90° or approximately 90°. A rotation axis of the second worm wheel portion 31 is parallel or substantially parallel to a rotation axis of the first worm gear portion 11. The gear portion 32 is provided at the outer periphery of the first layshaft gear 30 and rotates with the rotation of the second worm wheel portion 31. In the first layshaft gear 30, the gear portion 32 is provided so that a central axis of the gear portion 32 coincides with or substantially coincides with a central axis of the second worm wheel portion 31.

Here, the first worm wheel portion 21 moves toward the first worm gear portion 11 to mesh with the first worm gear portion 11 in a direction. This direction is defined as a first meshing direction (direction indicated by an arrow P1 in FIG. 12). Similarly, the second worm gear portion 22 moves toward the second worm wheel portion 31 to mesh with the second worm wheel portion 31 in a direction. This direction is defined as a second meshing direction (direction indicated by an arrow P2 in FIG. 12). In the present embodiment, the first meshing direction P1 and the second meshing direction P2 are both a direction along a horizontal plane (XY plane).

The second intermediate gear 70 includes a gear portion 71 (third driven gear) and a gear portion 72 (fourth drive gear). The gear portion 71 is provided at an outer periphery of the second intermediate gear 70, meshes with the gear portion 32 of the first layshaft gear 30, and rotates with the rotation of the gear portion 32. The gear portion 72 is provided at the outer periphery of the second intermediate gear 70 and rotates with the rotation of the gear portion 71. In the second intermediate gear 70, the gear portion 72 is provided so that a central axis of the gear portion 72 coincides with or substantially coincides with a central axis of the gear portion 71. Rotation axes of the gear portions 71 and 72 are provided in parallel to or substantially parallel to a rotation axis of the gear portion 32 of the first layshaft gear 30.

The magnet holder 61 includes the second layshaft gear 63 and includes a gear portion 64 (fourth driven gear) provided at the second layshaft gear 63, as described below. The gear portion 64 is provided at an outer periphery of the second layshaft gear 63, meshes with the gear portion 72 of the second intermediate gear 70, and rotates with the rotation of the gear portion 72. A rotation axis of the gear portion 64 is provided in parallel to or substantially parallel to the rotation axis of the gear portion 72 of the second intermediate gear 70.

The angle sensor Sq detects a rotation angle of the second worm wheel portion 31, that is, a rotation angle of the first layshaft gear 30. The magnet Mq is fixed to an upper surface of the first layshaft gear 30 so that the central axes of the magnet Mq and the first layshaft gear 30 coincide with or substantially coincide with each other. The magnet Mq has 2-pole magnetic poles arranged in a direction perpendicular or substantially perpendicular to the rotation axis of the first layshaft gear 30. In order to detect the rotation angle of the first layshaft gear 30, the angle sensor Sq is provided so that a lower surface of the angle sensor Sq faces an upper surface of the magnet Mq across a gap in the up-down direction.

As an example, the angle sensor Sq is fixed to the substrate 5 supported by substrate pillars 110 disposed at a base 3 (to be described below) of the absolute encoder 2. The angle sensor Sq detects the magnetic flux of the magnet Mq and outputs detection information to the microcomputer 51. The microcomputer 51 specifies the rotation angle of the magnet Mq, that is, the rotation angle of the first layshaft gear 30, on the basis of the input detection information on the magnetic flux.

The angle sensor Sr detects a rotation angle of the magnet holder 61, that is, a rotation angle of the second layshaft gear 63. The magnet Mr is fixed to an upper surface of the second layshaft gear 63 so that the central axes of the magnet Mr and the second layshaft gear 63 coincide with or substantially coincide with each other. The magnet Mr has 2-pole magnetic poles arranged in a direction perpendicular to a rotation axis of the second layshaft gear 63. In order to detect the rotation angle of the second layshaft gear 63, the angle sensor Sr is provided so that a lower surface of the angle sensor Sr faces an upper surface of the magnet Mr across a gap in the up-down direction.

As an example, the angle sensor Sr is fixed to the substrate 5 at the same surface as the surface where the angle sensor Sq is fixed, the angle sensor Sq being fixed to the substrate 5. The angle sensor Sr detects the magnetic flux of the magnet Mr and outputs detection information to the microcomputer 51. The microcomputer 51 specifies a rotation angle of the magnet Mr, that is, the rotation angle of the second layshaft gear 63, on the basis of the received detection information on the magnetic flux.

The magnet Mp is fixed to an upper surface of the main shaft gear 10 so that the central axes of the magnet Mp and the main shaft gear 10 coincide or substantially coincide with each other. The magnet Mp has 2-pole magnetic poles arranged in a direction perpendicular to a rotation axis of the main shaft gear 10. In order to detect the rotation angle of the main shaft gear 10, the angle sensor Sp is provided so that a lower surface of the angle sensor Sp faces an upper surface of the magnet Mp across a gap in the up-down direction.

As an example, the angle sensor Sp is fixed to the substrate 5, and the angle sensor Sp is fixed to the substrate 5 at the same surface as the surface where the angle sensor Sq is fixed, the angle sensor Sq being fixed to the substrate 5. The angle sensor Sp detects the magnetic flux of the magnet Mp and outputs detection information to the microcomputer 51. The microcomputer 51 specifies the rotation angle of the main shaft gear 10, that is, the rotation angle of the main shaft 1a by specifying the rotation angle of the magnet Mp on the basis of the input detection information on the magnetic flux. The resolution of the rotation angle of the main shaft 1a corresponds to the resolution of the angle sensor Sp. As described below, the microcomputer 51 specifies the amount of rotation of the main shaft 1a on the basis of the specified rotation angle of the first layshaft gear 30, the rotation angle of the second layshaft gear 63, and the specified rotation angle of the main shaft 1a and outputs the specified amount of rotation. As an example, the microcomputer 51 may output the amount of rotation of the main shaft 1a of the motor 1 as a digital signal.

The absolute encoder 2 configured in this way can specify the rotation number of the main shaft 1a according to the rotation angle of the first layshaft gear 30 specified on the basis of the detection information of the angle sensor Sq and the rotation angle of the second layshaft gear 63 specified on the basis of the detection information of the angle sensor Sr and specify the rotation angle of the main shaft 1a on the basis of the detection information of the angle sensor Sp. Then, the microcomputer 51 specifies the amount of rotation of the main shaft 1a over multiple rotations based on the specified rotation number of the main shaft 1a and the rotation angle of the main shaft 1a.

The number of threads of the first worm gear portion 11 of the main shaft gear 10 provided at the main shaft 1a is, for example, five, and the number of teeth of the first worm wheel portion 21 is, for example, 20. That is, the first worm gear portion 11 and the first worm wheel portion 21 constitute a first transmission mechanism R1 having a reduction ratio of 20/5=4 (see FIG. 6). When the first worm gear portion 11 rotates four times, the first worm wheel portion 21 rotates one time. Since the first worm wheel portion 21 and the second worm gear portion 22 are coaxially provided to constitute the first intermediate gear 20 and rotate integrally with each other, when the first worm gear portion 11 rotates four times, that is, when the main shaft 1a and the main shaft gear 10 rotate four times, the first intermediate gear 20 rotates one time and the second worm gear portion 22 rotates one time.

The number of threads of the second worm gear portion 22 is, for example, two, and the number of teeth of the second worm wheel portion 31 of the first layshaft gear 30 is, for example, 25. That is, the second worm gear portion 22 and the second worm wheel portion 31 constitute a second transmission mechanism R2 having a reduction ratio of 25/2=12.5 (see FIG. 6). When the second worm gear portion 22 rotates 12.5 times, the second worm wheel portion 31 rotates one time. Since the first lay shaft gear 30 formed with the second worm wheel portion 31 is configured to rotate integrally with a magnet holder 35 and the magnet Mq as described below, when the second worm gear portion 22 constituting the first intermediate gear 20 rotates 12.5 times, the magnet Mq rotates one time.

The number of teeth of the gear portion 32 of the first layshaft gear 30 is, for example, 18, and the number of teeth of the gear portion 71 of the second intermediate gear 70 is, for example, 36. That is, the gear portion 32 and the gear portion 71 constitute a third transmission mechanism R3 having a reduction ratio of 36/18=2 (see FIG. 5). When the gear portion 32 of the first layshaft gear 30 rotates twice, the gear portion 71 of the second intermediate gear 70 rotates one time. The number of teeth of the gear portion 72 of the second intermediate gear 70 is, for example, 19, and the number of teeth of the gear portion 64 of the second layshaft gear 63 is, for example, 38. That is, the gear portion 64 and the gear portion 72 constitute a fourth transmission mechanism R4 having a reduction ratio of 38/19=2 (see FIG. 5). When the gear portion 72 of the second intermediate gear 70 rotates twice, the gear portion 64 of the second layshaft gear 63 rotates one time.

The gear portion 71 and the gear portion 72 are coaxially provided, constitute the second intermediate gear 70, and rotate integrally, and thus the gear portion 72 rotates one time when the gear portion 71 rotates one time. Accordingly, the second intermediate gear 70 as a whole has a reduction ratio of 4. That is, when the gear portion 32 of the first layshaft gear 30 rotates four times, the second intermediate gear 70 rotates twice and the gear portion 64 of the second layshaft gear 63 rotates one time. The second layshaft gear 63 formed with the gear portion 64 constitutes the magnet holder 61 as described below and rotates integrally with the magnet Mr. Therefore, when the gear portion 32 constituting the first layshaft gear 30 rotates four times, the magnet Mr rotates one time.

From the above, when the main shaft 1a rotates 200 times, the first intermediate gear 20 rotates 50 times, the first layshaft gear 30 and the magnet Mq rotate four times, the second intermediate gear 70 rotates twice, and the second layshaft gear 63 and the magnet Mr rotate once. That is, the rotation number for 50 rotations of the main shaft 1a can be specified by the detection information of the angle sensor Sq regarding the rotation angle of the first layshaft gear 30, and the rotation number for 200 rotations of the main shaft 1a can be specified by the detection information of the angle sensor Sr regarding the rotation angle of the second layshaft gear 63. The first layshaft gear 30 has a smaller reduction ratio with respect to the main shaft gear 10 than the second layshaft gear 63, and the resolution of the amount of rotation of the main shaft 1a based on the detection information of the magnetic sensor Sq corresponding to the magnet Mq rotating together with the first layshaft gear 30 is higher than the resolution of the amount of rotation of the main shaft 1*a* based on the detection information of the magnetic sensor Sr corresponding to the magnet Mr rotating together with the second layshaft gear 63. Therefore, in the absolute encoder 2, the range of the specifiable amount of rotation of the main shaft 1*a* can be expanded without lowering the resolution of the specifiable amount of rotation of the main shaft 1*a*.

The configuration of the absolute encoder 2 is described below in more detail.

As described above (see FIGS. 1 to 6), the absolute encoder 2 includes the base 3, the case 4, the substrate 5, and the connector 6. The absolute encoder 2 further includes the main shaft gear 10, the first intermediate gear 20, the first layshaft gear 30, the second intermediate gear 70, the magnet holder 61 having the second layshaft gear 63, and a biasing mechanism 40. The absolute encoder 2 includes the magnets Mp, Mq, and Mr and the angle sensors Sp, Sq, and Sr and includes the microcomputer 51 for controlling a drive unit, a detection unit, and the like of the absolute encoder 2.

Figure 7:
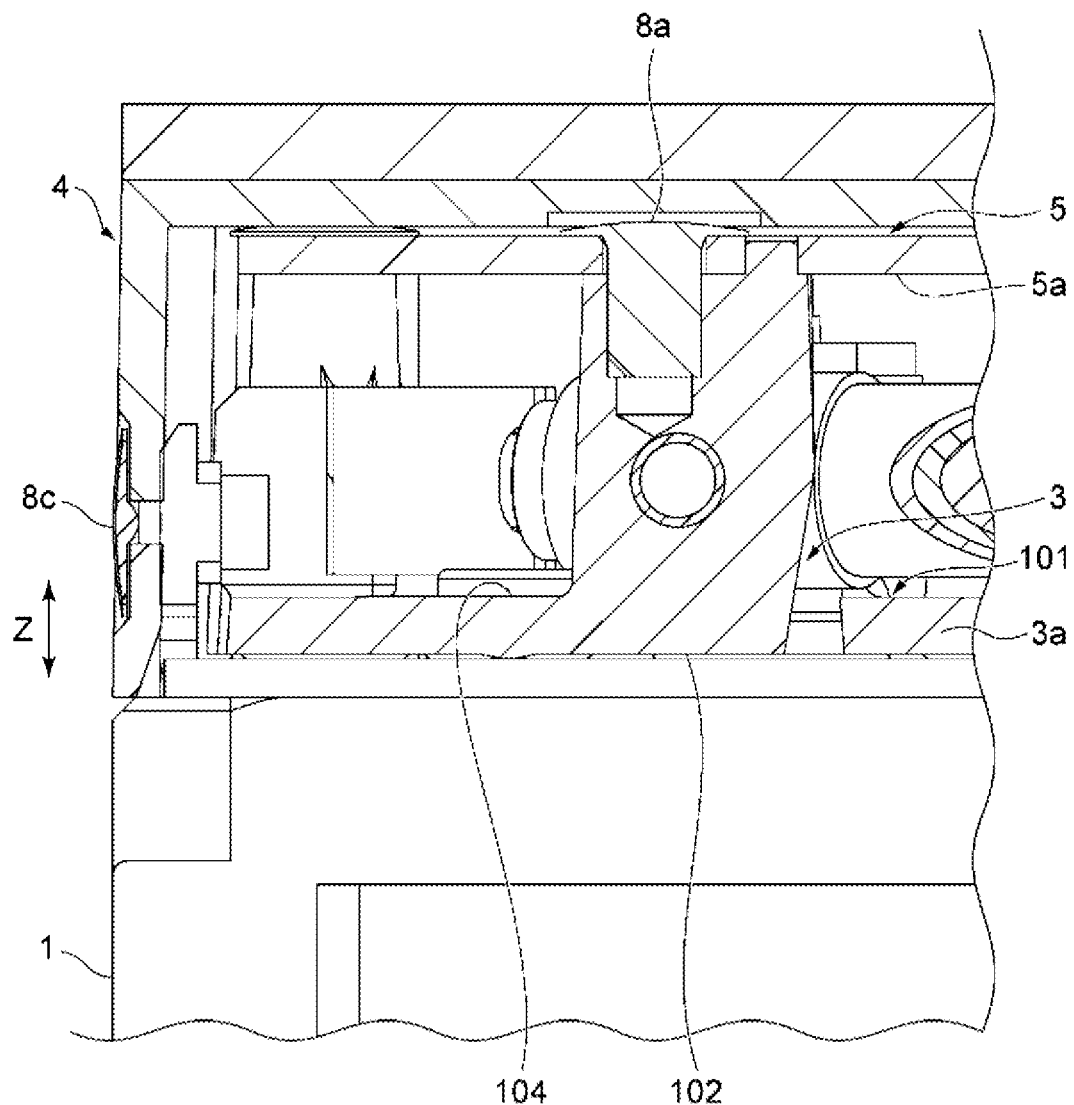
FIG. 7 is a cross-sectional view of the absolute encoder in FIG. 1 cut along a plane parallel to a central axis of a main shaft.

The base 3 is a base rotatably holding rotating bodies such as the main shaft gear 10, the first intermediate gear 20, the first layshaft gear 30, the second intermediate gear 70, and the magnet holder 61 (second layshaft gear 63) and fixing members such as the substrate 5 and the biasing mechanism 40. As illustrated in FIGS. 3 to 6, FIGS. 11 to 14, and others, the base 3 includes a base portion 101 and various supporting portions (to be described below) for supporting each member of the absolute encoder 2 provided at the base portion 101. As illustrated in FIG. 7, the case 4 is fixed to the base 3 via a supporting plate 3*a*. The supporting plate 3*a* is clamped between the base 3 and the motor 1, and the case 4 is fixed to the supporting plate 3*a*, for example, at one position by a screw 8*c*. The substrate 5 is configured to be fixed to the base 3, for example, at three positions by screws 8*a*. The base portion 101 is a plate-like portion having a pair of surfaces facing the up-down direction of the absolute encoder 2 and extends in the horizontal direction (X-axis direction and Y-axis direction).

The substrate pillars 110 and substrate positioning pins 120 being portions for supporting the substrate 5 are provided at an upper surface 104 being a surface at the upper side of the base portion 101. The base 3 includes, for example, three substrate pillars 110 and two substrate positioning pins 120.

As illustrated in FIG. 5 and others, the substrate pillars 110 are portions protruding upward from the upper surface 104 of the base portion 101 and are, for example, columnar or substantially columnar portions. A screw hole 112 extending downward is formed at an end surface on an upper side (upper end surface 111) of each of the substrate pillars 110. The upper end surface 111 of each of the substrate pillars 110 is formed extending on the same horizontal plane or extending along the same horizontal plane. In the absolute encoder 2, a lower surface 5*a* of the substrate 5 is in contact with the upper end surfaces 111 of the substrate pillars 110, and the substrate 5 is fixed to the substrate pillars 110 by the screws 8*a* screwed into the screw holes 112. As described below, one of the substrate pillars 110 is integrated with a supporting projection 45 constituting the one substrate positioning pin 120 and the biasing mechanism 40 described below. The substrate pillars 110 may have ribs for reinforcement.

Figure 28:
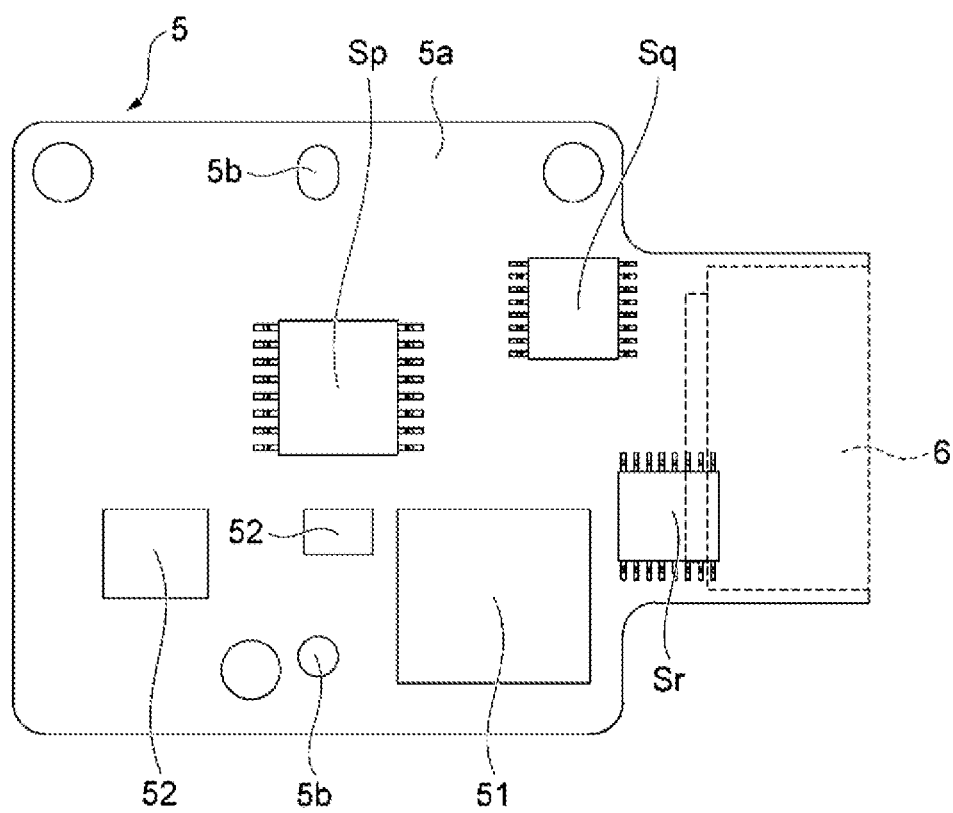
FIG. 28 is a view of the substrate in FIG. 2 when viewed from a lower surface side.

As illustrated in FIG. 5 and others, the substrate positioning pin 120 is a portion protruding upward from the upper surface 104 of the base portion 101 and is, for example, a columnar or a substantially columnar portion. An upper end portion (a tip end portion 121) of the substrate positioning pin 120 is narrower than a portion (a base portion 122) being lower than the tip end portion 121, and a stepped surface 123 is formed between the tip end portion 121 and the base portion 122. The tip end portions 121 of the substrate positioning pins 120 are insertable into positioning holes 5*b* formed in the substrate 5 as illustrated in FIG. 28 described below, and the substrate 5 is positioned relative to the base 3 by inserting the tip end portions 121 of the substrate positioning pins 120 into the positioning holes 5*b* of the substrate 5.

As illustrated in FIG. 5 and others, the base 3 includes supporting projections 131, 132, and 141 provided at the upper surface 104 of the base portion 101 and being portions protruding upward (see FIGS. 3 to 6 and others). The supporting projection 132 is a portion supporting a plate spring 9 configured to push the first intermediate gear 20 in the central axial direction of the first intermediate gear 20, as described below. The supporting projections 131 and 141 are portions for rotatably supporting the first intermediate gear 20, as described below. The base 3 further includes a bearing holder portion 134 supporting a bearing 135 configured to rotatably hold the first layshaft gear 30, as described below (see FIG. 15). As described below, the base 3 further includes a shaft supporting portion 137 that supports the second layshaft gear shaft 62 that rotatably supports the magnet holder 61 formed with the second layshaft gear 63, and a shaft supporting portion 136 supporting a shaft 75 configured to rotatably support the second intermediate gear 70 (see FIGS. 17 to 19). Additionally, the supporting projection 45 is formed at the upper surface 104 of the base portion 101 of the base 3. As described below, the supporting projection 45 is a portion constituting the biasing mechanism 40 biasing the second worm gear portion 22 in the direction of the second worm wheel portion 31 and is a portion supporting a biasing spring 41.

Subsequently, each component of the absolute encoder 2 supported by the base 3 is described in detail.

Main Shaft Gear

Figure 8:
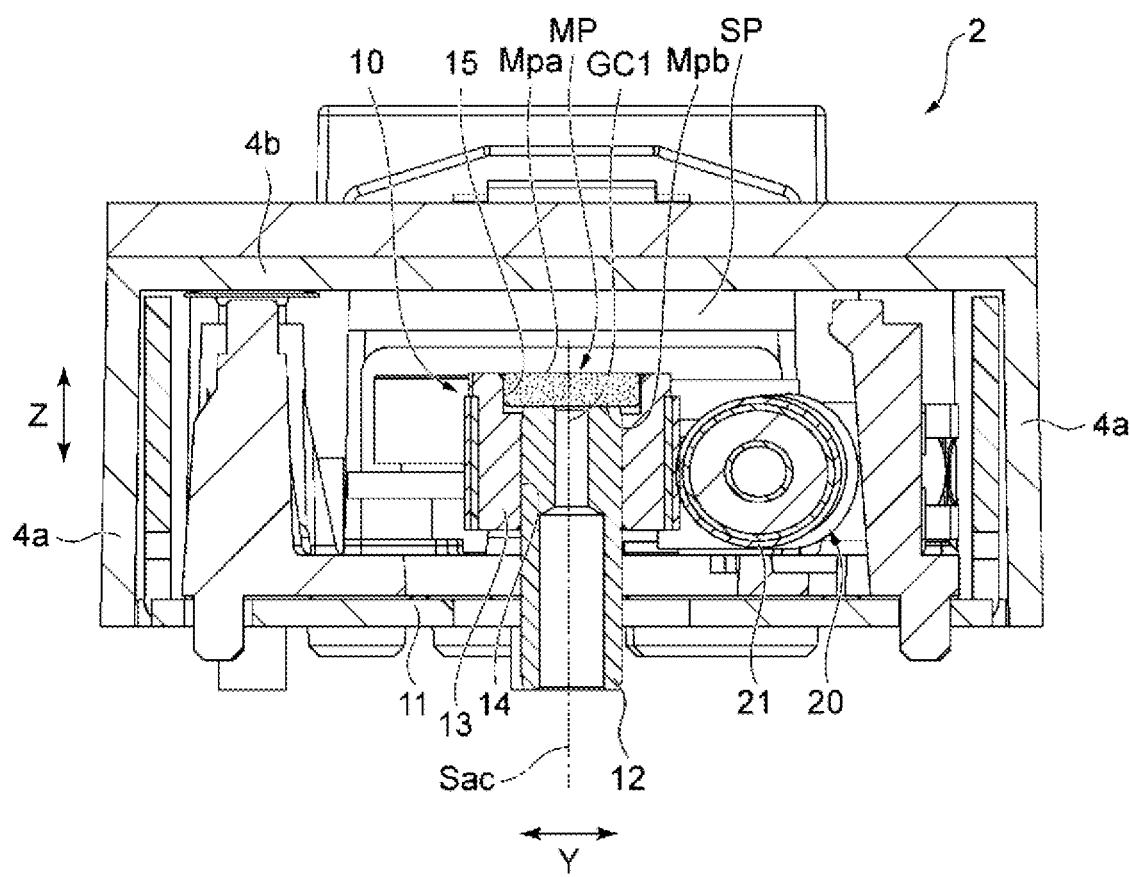
FIG. 8 is a cross-sectional view schematically illustrating the configuration of the absolute encoder in FIG. 1 cut along a plane through a central axis of a main shaft gear and orthogonal to a central axis of a first intermediate gear with the motor removed.
Figure 9:
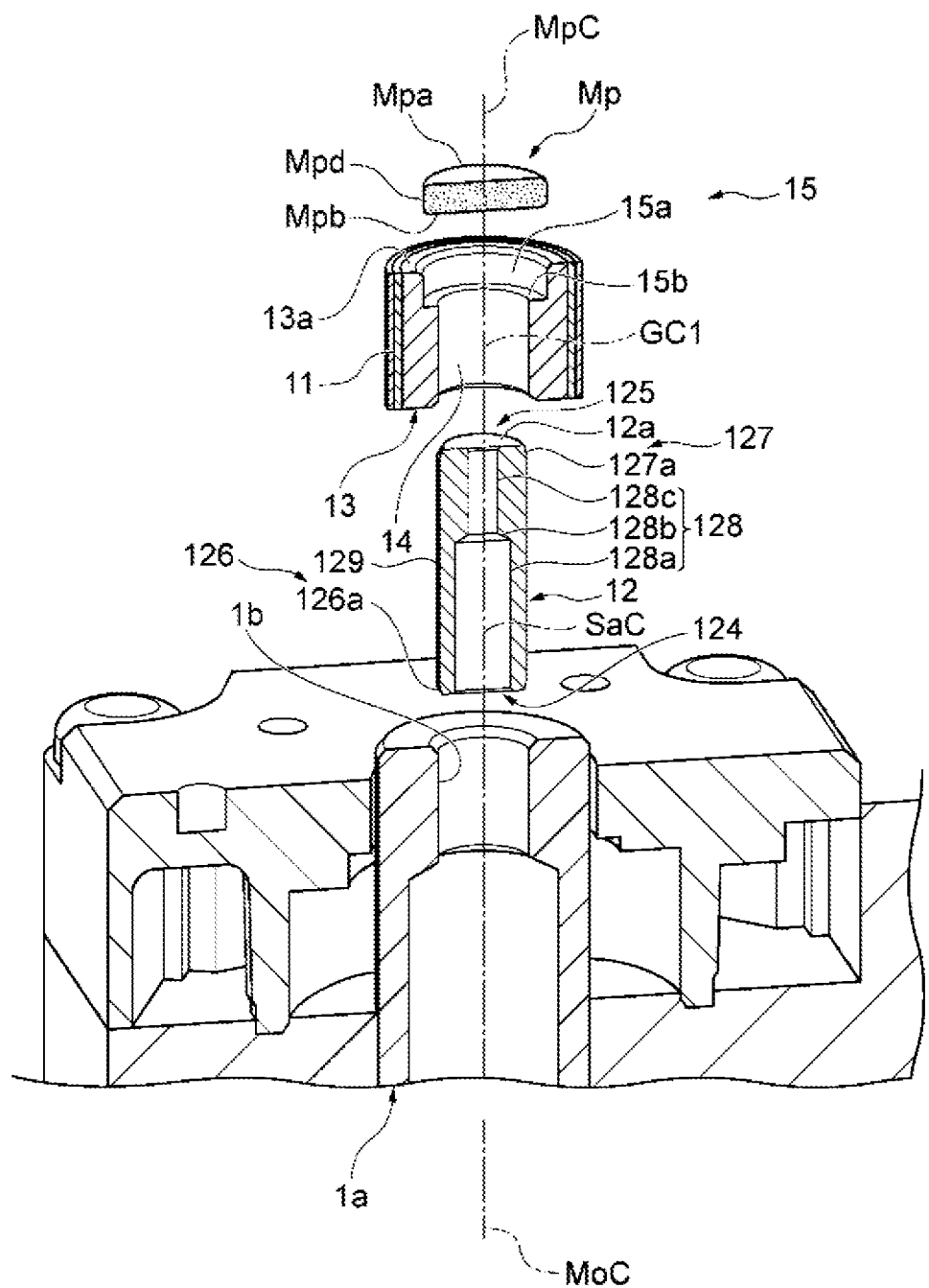
FIG. 9 is an exploded longitudinal cross-sectional view schematically illustrating configurations of a magnet, the main shaft gear, a main shaft adapter, and a main shaft of the motor in the configuration of the absolute encoder in FIG. 8.

FIG. 8 is a cross-sectional view schematically illustrating the configuration of the absolute encoder 2 in FIG. 1 cut along a plane through the central axis of the main shaft gear 10 and orthogonal to the central axis of the first intermediate gear 20 with the motor 1 removed. FIG. 9 is an exploded longitudinal cross-sectional view schematically illustrating configurations of the magnet Mp, the main shaft gear 10, a main shaft adapter 12, and the main shaft 1*a* of the motor 1 in the configuration of the absolute encoder 2 in FIG. 8.

As illustrated in FIGS. 8 and 9, the main shaft gear 10 is a tubular member provided coaxially or substantially coaxially with the main shaft 1*a* of the motor 1 and the main shaft adapter 12. The main shaft gear 10 includes a tubular portion 13 having a tubular shape and the first worm gear portion 11 provided at the outer side in the radial direction of the tubular portion 13. The first worm gear portion 11 is a gear portion of the main shaft gear 10. As illustrated in FIG. 9, a press-fitting portion 1*b* in the form of a cylindrical surface and forming a space at an inner peripheral side is formed at the upper end of the main shaft 1*a* of the motor 1, and the press-fitting portion 1*b* has a shape allowing the main shaft adapter 12 to be press-fitted and fixed. The tubular portion 13 of the main shaft gear 10 is formed with a press-fitting portion 14 in the form of a cylindrical surface and forming a space at an inner side, and the press-fitting portion 14 has a shape allowing the main shaft adapter 12 to be press-fitted and fixed.

As illustrated in FIGS. 8 and 9, a magnet holding portion 15 for holding the magnet Mp is formed in the tubular portion 13 of the main shaft gear 10. The magnet holding portion 15 is a portion forming a recess part corresponding to the shape of the magnet Mp and being recessed downward from an upper end surface 13a of the tubular portion 13. The magnet holding portion 15 can accommodate the magnet Mp. The magnet holding portion 15 has an inner peripheral surface 15a in the form of a cylindrical surface communicating with the press-fitting portion 14 and having a larger diameter than the press-fitting portion 14, and an annular bottom surface 15b connecting the inner peripheral surface 15a and the press-fitting portion 14.

The inner peripheral surface 15a of the magnet holding portion 15 is formed in contact with an outer peripheral surface Mpd of the magnet Mp accommodated in the magnet holding portion 15. In the absolute encoder 2, an upper end surface 12a of the main shaft adapter 12 is positioned above the bottom surface 15b of the magnet holding portion 15. In the absolute encoder 2, a bottom surface Mpb of the magnet Mp is in contact with the upper end surface 12a of the main shaft adapter 12 but is not in contact with the bottom surface 15b of the magnet holding portion 15 of the main shaft gear 10. Thus, the magnet Mp is positioned in the up-down direction by the upper end surface 12a of the main shaft adapter 12 and positioned in the horizontal direction by the inner peripheral surface 15a of the magnet holding portion 15. The lower surface Mpb of the magnet Mp positioned in this manner is bonded and fixed to the upper end surface 12a of the main shaft adapter 12.

As described above, the magnet Mp is fixed to the main shaft adapter 12, and the magnet Mp, the main shaft gear 10, and the main shaft adapter 12 rotate integrally with the main shaft 1a of the motor 1. The magnet Mp, the main shaft gear 10, and the main shaft adapter 12 are configured to rotate about the same axis line as the main shaft 1a of the motor 1.

The first worm gear portion 11 is constituted by a tooth portion formed into a helical shape and is formed meshing with the first worm wheel portion 21 of the first intermediate gear 20. The first worm gear portion 11 is made of, for example, polyacetal resin. The first worm gear portion 11 is an example of a first drive gear.

As illustrated in FIG. 9, the magnet Mp is a disk-shaped or substantially disk-shaped permanent magnet inserted into the magnet holding portion 15 of the main shaft gear 10 and has an upper surface Mpa and the lower surface Mpb opposing each other. In the absolute encoder 2, the position (position in the up-down direction) of the magnet Mp in a direction of a central axis GC1 of the main shaft gear 10 is defined by the upper end surface 12a of the main shaft adapter 12 as described above so that the upper surface MPa of the magnet Mp opposes the surface of the angle sensor Sp across a certain distance in the up-down direction.

A central axis MpC of the magnet Mp (axis representing the center of the magnet Mp or axis passing through the center of a magnetic pole boundary) coincides or substantially coincides with the central axis GC1 of the main shaft gear 10, a central axis SaC of the main shaft adapter 12, and a central axis MoC of the main shaft 1a of the motor 1. When these central axes are made to coincide or substantially coincide with each other, the angle sensor Sp can detect the rotation angle or the amount of rotation of the magnet Mp with higher accuracy.

In an embodiment of the present invention, the two magnetic poles (N/S) of the magnet Mp are preferably formed adjacent in a horizontal plane (XY plane) perpendicular to the central axis MpC of the magnet Mp. This can further improve the detection accuracy of the rotation angle or amount of rotation of the angle sensor Sp. The magnet Mp is formed from a magnetic material such as a terrific material, an Nd (neodymium) —Fe (iron) —B (boron) material. The magnet Mp may be, for example, a rubber magnet or a bond magnet including a resin binder.

Main Shaft Adapter

Figure 10:
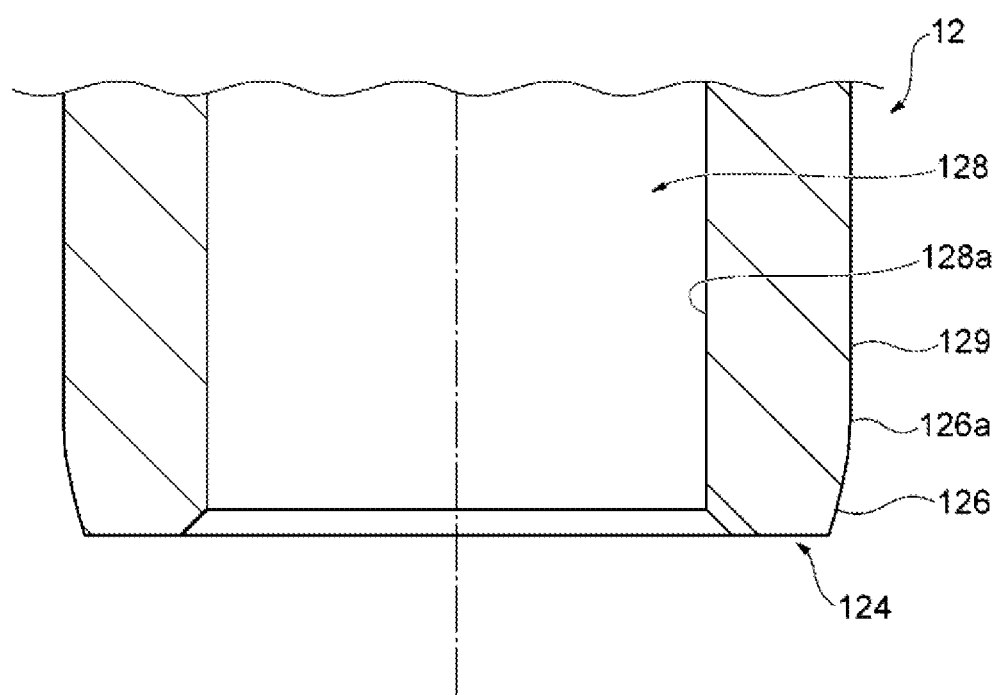
FIG. 10 is an enlarged cross-sectional view illustrating one end portion of the main shaft adapter illustrated in FIG. 8.

FIG. 10 is an enlarged cross-sectional view illustrating one end portion 124 of the main shaft adapter 12.

The main shaft adapter 12 is a shaft press-fitted into the press-fitting portion 1b and the press-fitting portion 14 by using the main shaft 1a of the motor 1 and the tubular portion 13 of the main shaft gear 10 as supporting members. As illustrated in FIGS. 8, 9 and 10, the main shaft adapter 12 includes tapered surface portions 126 and 127 and a through hole 128.

The through hole 128 passes through the one end portion 124 to the other end portion 125 of the main shaft adapter 12. The through hole 128 has a first hole portion 128a occupying a region having a predetermined length in the axial direction from the one end portion 124 side, and a second hole portion 128c communicating with the first hole portion 128a and occupying a region up to the other end portion 125. In the through hole 128, the diameter of the hole of the first hole portion 128a in the region having the predetermined length in the axial direction from the one end portion 124 side is larger than the diameter of the hole of the second hole portion 128c provided at the other end portion 125 side. An end portion 128b between the first hole portion 128a and the second hole portion 128c is a portion formed when the first hole portion 128a is machined by a drill having an angle at the tip of a cutting edge. The first hole portion 128b does not exist when machined by an endmill.

To support the main shaft 1a having various diameters, the absolute encoder 2 has a structure of attaching the main shaft gear 10 to the main shaft 1a of the motor 1. In the structure, the main shaft gear 10 is not directly attached to the main shaft 1a but is fixed to the main shaft 1a via the main shaft adapter 12. The main shaft 1a is a rotation shaft of the motor and requires rigidity. Since the magnet Mg needs to be fixed to the main shaft adapter 12 with an adhesive as described above, the main shaft 1a and the main shaft adapter 12 preferably use a metal. Thus, a high press-fitting force is required when the main shaft adapter 12 is press-fitted into the press-fitting portion 1b of the main shaft 1a. In this case, the press-fitting force may cause breakage such as buckling deformation of the main shaft 1a or scraping of the press-fitting portion (inner or outer diameter portion) between the main shaft 1a and the main shaft adapter 12.

In the absolute encoder 2, by making the diameter of the first hole portion 128a of the through hole 128 of the main shaft adapter 12 larger than the diameter of the second hole portion 128c and making the wall thickness thinner, the main shaft adapter 12 can be easily bent, the press-fitting force to the main shaft 1a can be reduced, and the load to the main shaft 1a can be reduced. On the other hand, since the magnet Mp is fixed to the upper portion (tip end side) of the main shaft adapter 12 with an adhesive, a contact area with the magnet Mp (thickness between the outer diameter and the inner diameter of the main shaft adapter 12) is required. Therefore, in the main shaft adapter 12, the diameter of the through hole 128 is made different at a predetermined position in the axial direction, for example, with a region corresponding to a press-fitting margin (dimension necessary for press-fitting) at the one end portion 124 side as a boundary.

That is, making the diameter of the first hole portion 128a of the main shaft adapter 12 at the one end portion 124 side (lower side in FIG. 9) from the press-fitting margin larger than the diameter of the second hole portion 128c allows a peripheral surface 129 of the main shaft adapter 12 to be easily deformed and easily press-fitted into the press-fitting portion 1b. By making the diameter of the second hole portion 128c at the other end portion 125 side (upper side in FIG. 9) with respect to the press-fitting margin smaller than the diameter of the first hole portion 128a, an adhesive area with the magnet Mp can be secured and reduction of the press-fitting force can be achieved without impairing an adhesive holding force.

The tapered surface portions 126 and 127 are inclined outer peripheral surfaces such that the diameters of the one end portion 124 and the other end portion 125 are smaller than the diameter of the peripheral surface 129. In the tapered surface portion 126, a connecting portion 126a of an outer peripheral surface between the tapered surface portion 126 and the peripheral surface 129 of the main shaft adapter 12 is connected by a curved surface. Also in the tapered surface portion 127 at the other end portion 125 side, a connecting portion 127a of an outer peripheral surface between the tapered surface portion 127 and the peripheral surface 129 is connected by a curved surface. That is, curved surface processing is performed on the connecting portions 126a and 127a of the outer peripheral surfaces between the tapered surface portions 126 and 127 and the peripheral surface 129.

As illustrated in FIG. 9, a region of the main shaft adapter 12 having a predetermined length in the axial direction from the one end portion 124 is press-fitted into the press-fitting portion 1b formed at the upper end of the main shaft 1a of the motor 1. A region of the main shaft adapter 12 having a predetermined length in the axial direction from the other end portion 125 is press-fitted into the press-fitting portion 14 formed in the tubular portion 13 of the main shaft gear 10.

In a case where only linear chamfering is performed on the tapered surface portion 126, when the one end portion 124 of the main shaft adapter 12 is press-fitted into the press-fitting portion 1b, if the edge of the hole of the press-fitting portion 1b and the tapered surface portion 126 come into contact with each other, shavings are generated from both the main shaft adapter 12 and the press-fitting portion 1b. Similarly, in a case where only linear chamfering is performed on the tapered surface portion 127, when the other end portion 125 of the main shaft adapter 12 is press-fitted into the press-fitting portion 14, the edge of the hole of the press-fitting portion 14 and the tapered surface portion 127 come into contact with each other, causing the generation of shavings from both the main shaft adapter 12 and the press-fitting portion 14.

On the other hand, when the main shaft adapter 12 is press-fitted into the press-fitting portion 1b and the press-fitting portion 14, after the tapered surface portions 126 and 127 are inserted into the press-fitting portions 1b and 14, the connecting portions 126a and 127a of the outer peripheral surfaces between the tapered surface portions 126 and 127 and the peripheral surface 129 come into contact with the press-fitting portions 1b and 14. The connecting portions 126a and 127a of the outer peripheral surfaces between the tapered surface portions 126 and 127 and the peripheral surface 129 of the main shaft adapter 12 are subjected to curved surface processing, and thus the main shaft adapter 12 is smoothly press-fitted into the press-fitting portions 1b and 14. This can prevent both the main shaft adapter 12 and the press-fitting portions 1b and 14 from being scraped.

Therefore, the main shaft adapter 12 can reduce scattering of the shavings and the like. In addition, the main shaft adapter 12 can reduce the main shaft adapter 12 being press-fitted while falling (inclining) due to the member being scraped. Further, the main shaft adapter 12 suppresses the inclination of the main shaft adapter 12 and can reduce a press-fitting margin (dimension necessary for press-fitting) to be reduced.

The curved surface processing on the connecting portions 126a and 127a preferably has, for example, a radius R of about 1 [mm]. The main shaft adapter 12 can prevent, by making surface roughness of the surfaces of the peripheral surface 129 and the tapered surface portions 126 and 127 including the connecting portions 126a and 127a smoother, materials of the surfaces of both the main shaft adapter 12 and the press-fitting portion 14 from being scraped. Surface roughness Rmax (maximum roughness) of the surface of the main shaft adapter 12 may be, for example, 1.6 [μm] or less. The curved surface processing on the connecting portions 126a and 127a may be performed on either the one end portion 124 or the other end portion 125.

First Intermediate Gear

Figure 11:
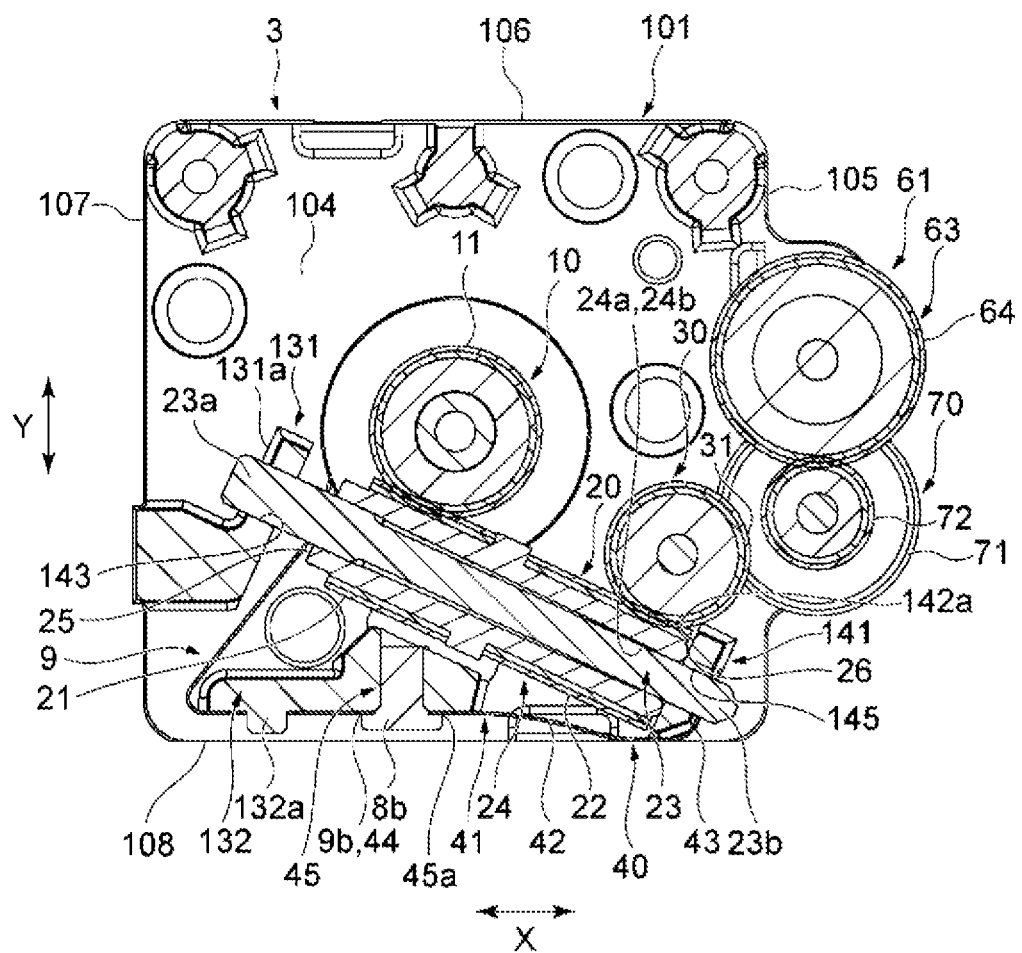
FIG. 11 is a cross-sectional view schematically illustrating the configuration of the absolute encoder in FIG. 6 cut along a plane through the central axis of the first intermediate gear and parallel to an XY plane.
Figure 12:
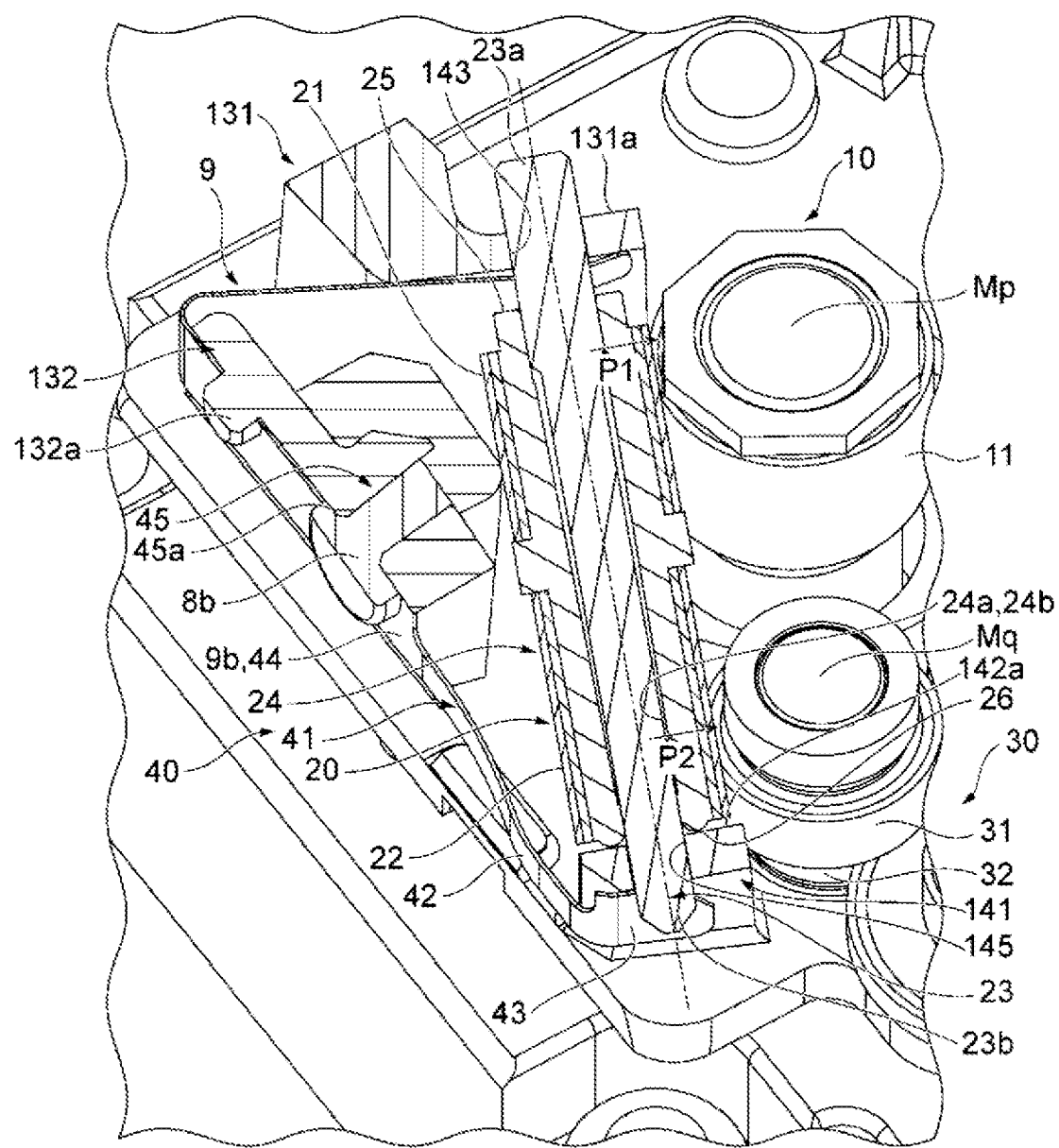
FIG. 12 is an enlarged perspective view of the cross-sectional view in FIG. 11 when viewed from another angle.
Figure 13:
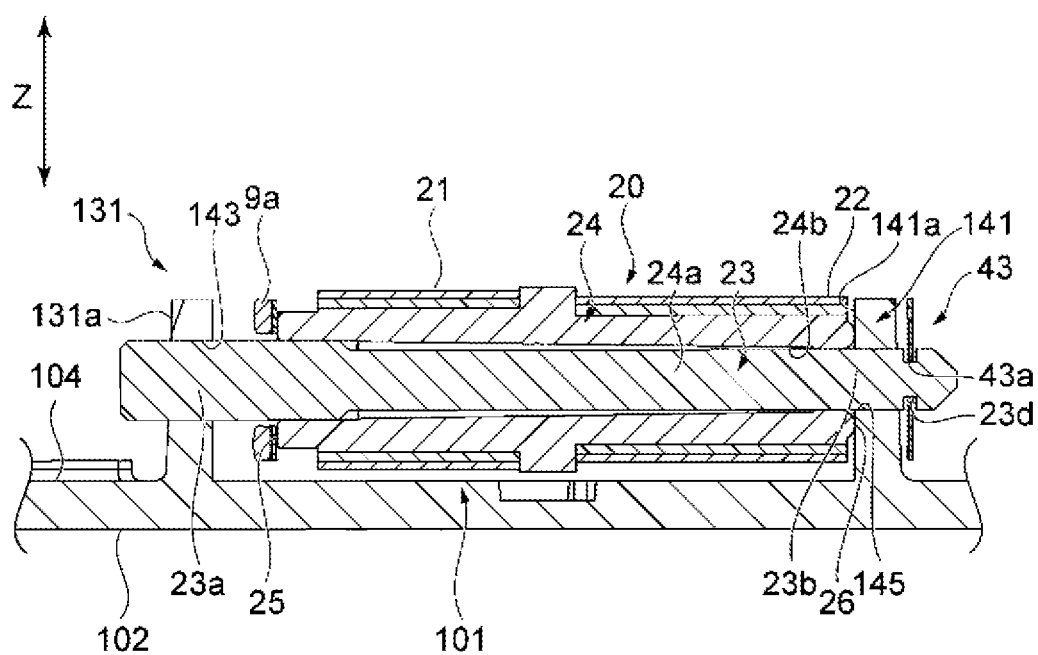
FIG. 13 is a partial cross-sectional view schematically illustrating the configuration of the absolute encoder in FIG. 6 cut along a plane through the central axis of the first intermediate gear and orthogonal to the XY plane.

FIG. 11 is a cross-sectional view schematically illustrating the configuration of the absolute encoder 2 in FIG. 6 cut along a plane through the central axis of the first intermediate gear 20 and parallel to the horizontal plane (XY plane). FIG. 12 is an enlarged perspective view of the absolute encoder 2 sectioned as illustrated in FIG. 11, when viewed from above at a layshaft-side end portion 23b side of a first intermediate gear shaft 23. FIG. 13 is a partial cross-sectional view schematically illustrating the configuration of the absolute encoder 2 in FIG. 6 cut along a plane through the central axis of the first intermediate gear 20 and orthogonal to the horizontal plane (XY plane).

As illustrated in FIGS. 4 to 6 and FIGS. 11 to 13, the first intermediate gear 20 is rotatably supported by the first intermediate gear shaft 23 at the upper side of the base portion 101 of the base 3. The first intermediate gear shaft 23 extends in parallel to the horizontal plane. The first intermediate gear shaft 23 is not parallel to each of the left-right direction (X-axis direction) and the front-rear direction (Y-axis direction) in plan view. That is, the first intermediate gear shaft 23 is inclined with respect to each of the left-right direction and the front-rear direction. The first intermediate gear shaft 23 being inclined with respect to each of the left-right direction and the front-rear direction means that the first intermediate gear shaft 23 extends obliquely with respect to outer peripheral surfaces 105 to 108 of the base portion 101 of the base 3 (see FIG. 11). In the absolute encoder 2, the first intermediate gear shaft 23 is supported on the base portion 101 of the base 3 by the supporting projection 131 located at the main shaft gear 10 side and the supporting projection 141 located at the first layshaft gear 30 side.

As illustrated in FIG. 11, the outer peripheral surfaces of the base 3 are constituted by a right-side outer peripheral surface 105, a left-side outer peripheral surface 107 parallel to a YZ plane, and a rear-side outer peripheral surface 106 and a front-side outer peripheral surface 108 parallel to the XZ plane and extending between the right-side outer peripheral surface 105 and the left-side outer peripheral surface 107. The right-side outer peripheral surface 105 is a side surface provided at the right side (right side in the X-axis direction) of the base 3. The left-side outer peripheral surface 107 is a side surface provided at the left side (left side in the X-axis direction) of the base 3. The rear-side outer peripheral surface 106 is a side surface provided at the rear side (rear side in the Y-axis direction) of the base 3. The front-side outer peripheral surface 108 is a side surface provided at the front side (front side in the Y-axis direction) of the base 3.

As illustrated in FIGS. 3 to 6, the dimensions of the absolute encoder 2 in plan view are aligned with the dimensions of the motor 1 being 25 mm square as an example. Thus, the first intermediate gear 20 disposed in parallel to the upper surface 104 of the base 3 is provided extending obliquely with respect to the outer peripheral surfaces 105 to 108 of the base 3, allowing the dimensions of the absolute encoder 2 in the horizontal direction to be reduced. The horizontal direction is a direction equal to a direction orthogonal to the central axis of the main shaft 1a of the motor 1 and is a direction equal to the direction parallel to the XY plane.

As illustrated in FIGS. 5 and 6 and FIGS. 11 to 14, the first intermediate gear 20 is a tubular member formed rotatably around the first intermediate gear shaft 23 and includes the first worm wheel portion 21, the second worm gear portion 22, a tubular portion 24, a main shaft-side sliding portion 25, and a layshaft-side sliding portion 26. The tubular portion 24 is a member extending in a tubular shape and has an inner peripheral surface 24b forming a through hole 24a. The first intermediate gear shaft 23 can be inserted into the through hole 24a. The through hole 24a is a space surrounded by an inner peripheral surface 24b of the tubular portion 24. The inner peripheral surface 24b is formed slidably at an outer peripheral surface of the first intermediate gear shaft 23 inserted into the through hole 24a, and the first intermediate gear 20 is supported on the first intermediate gear shaft 23 rotatably around the first intermediate gear shaft 23. The first intermediate gear 20 is a member integrally formed of metal, resin, or the like and is formed of polyacetal resin as an example.

As illustrated in FIGS. 5 to 8, the first worm wheel portion 21 is a gear meshing with the first worm gear portion 11 of the main shaft gear 10. The first worm wheel portion 21 is an example of a first driven gear. The first worm wheel portion 21 is provided at one end portion side of the tubular portion 24 of the first intermediate gear 20 and is composed of, for example, a plurality of teeth provided at a cylindrical surface formed at one end portion side of the tubular portion 24 of the first intermediate gear 20. In the absolute encoder 2, the first intermediate gear 20 is provided so that the first worm wheel portion 21 is located near the center of the base portion 101 of the base 3. Accordingly, the one end portion of the tubular portion 24 provided in the vicinity of the first worm wheel portion 21 is an end portion of the first intermediate gear 20 at the main shaft gear 10 side.

As illustrated in FIG. 8, the outer diameter of the first worm wheel portion 21 is smaller than the outer diameter of the first worm gear portion 11. The central axis of the first worm wheel portion 21 is coaxial or substantially coaxial with the central axis of the inner peripheral surface 24b of the tubular portion 24. In the absolute encoder 2, the central axis of the first worm wheel portion 21 is parallel or substantially parallel to the upper surface 104 of the base portion 101 of the base 3, allowing the outer diameter of the first worm wheel portion 21 to be decreased and thus the absolute encoder 2 in the up-down direction (height direction) to be reduced in size.

As illustrated in FIGS. 5, 6, 11 to 15, and others, the second worm gear portion 22 is composed of a tooth portion formed in a helical shape and is disposed coaxially or substantially coaxially with the first worm wheel portion 21. The second worm gear portion 22 is an example of a second drive gear. Specifically, the second worm gear portion 22 is provided at the other end portion side of the tubular portion 24 and is composed of, for example, the tooth portion formed in a helical shape and provided at a cylindrical surface formed at the other end portion side of the tubular portion 24. The other end portion side of the tubular portion 24 is a side of the end portion of the first intermediate gear 20 at the first layshaft gear 30 side. The central axis of the second worm gear portion 22 is coaxial or substantially coaxial with the central axis of the inner peripheral surface 24b of the tubular portion 24. When the second worm gear portion 22 meshes with the second worm wheel portion 31 provided at the first layshaft gear 30, the rotational force of the first intermediate gear 20 is transmitted to the first layshaft gear 30.

As described above, the axial angle between the first worm gear portion 11 and the first worm wheel portion 21 is 90° or substantially 90°, and the central axis of the first worm gear portion 11 and the central axis of the first worm wheel portion 21 are orthogonal or substantially orthogonal to each other when viewed from a direction perpendicular to the central axis of the first worm gear portion 11 and perpendicular to the central axis of the first worm wheel portion 21. Similarly, the axial angle between the second worm gear portion 22 and the second worm wheel portion 31 is 90° or substantially 90°, and the central axis of the second worm gear portion 22 and the central axis of the second worm wheel portion 31 are orthogonal or substantially orthogonal to each other when viewed from a direction perpendicular to the central axis of the second worm gear portion 22 and perpendicular to the central axis of the second worm wheel portion 31.

Figure 15:
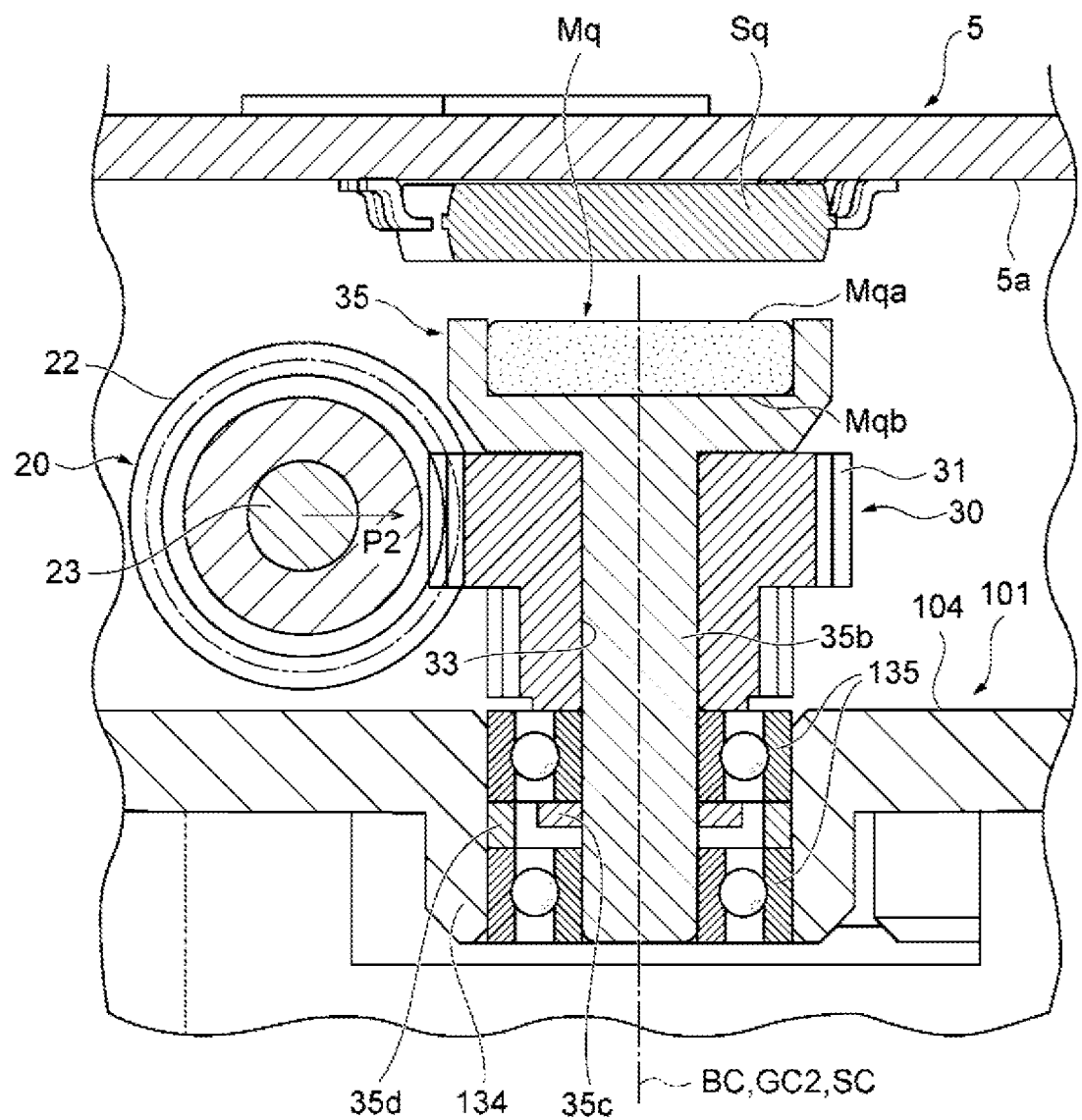
FIG. 15 is a partial cross-sectional view schematically illustrating the configuration of the absolute encoder in FIG. 2 cut along a plane through a central axis of a first layshaft gear and orthogonal to the central axis of the first intermediate gear.

As illustrated in FIG. 15, the outer diameter of the second worm gear portion 22 is set as small as possible in order to achieve miniaturization of the absolute encoder 2 in the up-down direction (height direction).

As illustrated in FIGS. 6 and 11 to 13, the main shaft-side sliding portion 25 of the first intermediate gear 20 is provided at an end of the first intermediate gear 20, that is, at an end of the first intermediate gear 20 at the main shaft gear 10 side. Specifically, the main shaft-side sliding portion 25 is an end surface of one end of the tubular portion 24 and is an annular surface facing the central axial direction of the first intermediate gear 20 formed at one end of the tubular portion 24. In the absolute encoder 2, the main shaft-side sliding portion 25 of the first intermediate gear 20 is in contact with one end 9a of the plate spring 9 described below.

The plate spring 9 is an example of an elastic member and is made of metal, for example. The plate spring 9 is a member for pushing the first intermediate gear 20 in the central axial direction of the first intermediate gear shaft 23 in the absolute encoder 2. As illustrated in FIGS. 4 to 6 and 13, the other end 9b of the plate spring 9 is supported on a projection 132a of the supporting projection 132 of the base 3 and is fixed to the supporting projection 45 of the base 3 by a screw 8b to be supported on the base 3. The one end 9a of the plate spring 9 is formed in contact with the main shaft-side sliding portion 25 of the first intermediate gear 20. Specifically, as illustrated in FIGS. 4 and 13, the one end 9a of the plate spring 9 is constituted by two branched portions divided into two prongs. A gap greater than the diameter of the first intermediate gear shaft 23 is formed between the two branched portions constituting the one end 9a of the plate spring 9. This causes, in the absolute encoder 2, the two branched portions of the one end 9a of the plate spring 9 to be in contact with the main shaft-side sliding portion 25 of the first intermediate gear 20 with the first intermediate gear shaft 23 passing through between the two branched portions.

As illustrated in FIGS. 4, 6, 11, and 13, in the absolute encoder 2, the plate spring 9 is supported on the supporting projection 132 of the base 3 and is fixed to the supporting projection 45 of the base 3 at the other end 9b such that the one end 9a is in contact with the main shaft-side sliding portion 25 of the first intermediate gear 20 in a state of the plate spring 9 being bent. Therefore, an elastic force is generated in the plate spring 9, and the main shaft-side sliding portion 25 of the first intermediate gear 20 is pressed by the one end 9a of the plate spring 9. The pressing force of the plate spring 9 biases the first intermediate gear 20 in a direction from the supporting projection 131 at the main shaft gear 10 side toward the supporting projection 141 at the first layshaft gear 30 side along the first intermediate gear shaft 23. When the first intermediate gear 20 rotates in this state, the main shaft-side sliding portion 25 of the first intermediate gear 20 rotates while being in contact with the one end 9a of the plate spring 9.

As illustrated in FIGS. 4, 6, and 11 to 14, the layshaft-side sliding portion 26 of the first intermediate gear 20 is provided at the other end of the first intermediate gear 20, that is, at an end of the first intermediate gear 20 at the first layshaft gear 30 side. Specifically, the layshaft-side sliding portion 26 is an end surface of the other end of the tubular portion 24, is an annular surface facing the central axial direction of the first intermediate gear 20 formed at the other end of the tubular portion 24 and opposes the main shaft-side sliding portion 25 in the central axial direction of the first intermediate gear 20.

In the absolute encoder 2, the layshaft-side sliding portion 26 of the first intermediate gear 20 is in contact with the supporting projection 141, and the supporting projection 141 defines the position of the first intermediate gear 20 in the central axial direction of the first intermediate gear shaft 23. As described above, since the first intermediate gear 20 is pressed by the plate spring 9 in a direction from the supporting projection 131 at the main shaft gear 10 side toward the supporting projection 141 at the first layshaft gear 30 side, the layshaft-side sliding portion 26 of the first intermediate gear 20 is also pressed in the same direction to be in contact with the supporting projection 141. In this way, the pressing force of the plate spring 9 is transmitted from the first layshaft gear 30 to the supporting projection 141, and the first intermediate gear 20 is stably supported in the direction from the supporting projection 131 toward the supporting projection 141. When the first intermediate gear 20 rotates, the layshaft-side sliding portion 26 of the first intermediate gear 20 rotates while being in contact with the supporting projection 141.

The supporting projection 131 and the supporting projection 141 described above are respectively examples of a first shaft supporting portion and a second shaft supporting portion rotatably holding the first intermediate gear 20 via the first intermediate gear shaft 23. As illustrated in FIGS. 5, 6, and 11 to 13, the supporting projection 131 and the supporting projection 141 are paired with each other and are, for example, substantially rectangular parallelepiped portions protruding upward from the base portion 101 of the base 3 or portions having substantially rectangular parallelepiped portions. The supporting projection 131 is provided near the main shaft gear 10 and is provided near the left side of the base 3 and near the center of the base 3 in the front-rear direction in plan view (see FIGS. 6 and 11). The supporting projection 141 is provided in the vicinity of the first layshaft gear 30, and is provided at the right side and the front side of the base 3 in plan view.

As illustrated in FIGS. 6 and 11 to 13, the supporting projection 131 and the supporting projection 141 serve as supporting members swingably supporting the first intermediate gear shaft 23 along the horizontal plane, that is, serve as supporting members swingably supporting the first intermediate gear 20 along the horizontal plane. The first intermediate gear shaft 23 is a columnar rod-like member, and includes a main shaft-side end portion 23a as one end portion and a layshaft-side end portion 23b as the other end portion. The main shaft-side end portion 23a is an end portion of the first intermediate gear shaft 23 located at the main shaft gear 10 side in the absolute encoder 2, and the layshaft-side end portion 23b is an end portion of the first intermediate gear shaft 23 located at the first layshaft gear 30 side in the absolute encoder 2.

By the biasing mechanism 40 described below, the first worm wheel portion 21 provided at the main shaft-side end portion 23a side of the first intermediate gear shaft 23 is movable in a first meshing direction (direction indicated by an arrow P1 in FIG. 12), and is not movable in the extension direction of the first intermediate gear shaft 23 (central axial direction of the first intermediate gear shaft 23) and a direction (up-down direction) orthogonal to the first meshing direction P1. As described above, the first worm wheel portion 21 moves toward the first worm gear portion 11 to mesh with the first worm gear portion 11 in a direction. This direction is the first meshing direction.

As illustrated in FIGS. 11 to 14, the supporting projection 131 is formed with a through hole 143. The main shaft-side end portion 23a of the first intermediate gear shaft 23 is inserted into the through hole 143. A shape of a cross section orthogonal to the extension direction of the through hole 143 is a circular hole shape. The circular hole shape is a shape having a perfect circle or a substantially perfect circle profile.

The absolute encoder 2 may further include a snap ring (not illustrated) as a fixed portion formed to be engageable with the main shaft-side end portion 23a of the first intermediate gear shaft 23. The snap ring is a member forming a portion in the main shaft-side end portion 23a of the first intermediate gear shaft 23, the portion not passing through the through hole 143 of the supporting projection 131, and is a member partially increasing an outer diameter of the main shaft-side end portion 23a of the first intermediate gear shaft 23. The snap ring is an annular member such as an e-ring engaging with a groove (not illustrated) formed in the first intermediate gear shaft 23, for example. In the absolute encoder 2, the snap ring is provided at the main shaft-side end portion 23a of the first intermediate gear shaft 23 to be located on a side opposite to the layshaft-side end portion 23b side with respect to the supporting projection 131. That is, the snap ring is provided in contact with an outer surface 131a of the supporting projection 131. The outer surface 131a is a surface of the supporting projection 131 facing a side opposite to the supporting projection 141 side. This restricts the movement of the first intermediate gear shaft 23 in a direction from the main shaft-side end portion 23a toward the layshaft-side end portion 23b due to contact between the snap ring and the outer surface 131a of the supporting projection 131.

By the biasing mechanism 40 described below, the second worm gear portion 22 provided at the layshaft-side end portion 23b side of the first intermediate gear shaft 23 is movable in a second meshing direction (direction indicated by an arrow P2 in FIG. 12), and is not movable in the extension direction of the first intermediate gear shaft 23 (central axial direction of the first intermediate gear shaft 23) and a direction (Z-axis direction) orthogonal to the second meshing direction P2. As described above, the second worm gear portion 22 moves toward the second worm wheel portion 31 to mesh with the second worm wheel portion 31 in a direction. This direction is the second meshing direction.

The supporting projection 141 is formed with a through hole 145. The layshaft-side end portion 23b of the first intermediate gear shaft 23 is inserted into the through hole 145. A shape of a cross section orthogonal to the extension direction of the through hole 145 is an elongate hole shape. The elongate hole shape of the through hole 145 has a major axis and a minor axis orthogonal to the major axis. The major axis-side width is greater than the minor axis-side width. The major axis-side width of the elongate hole shape of the through hole 145 in the supporting projection 141 at the first layshaft gear 30 side is greater than the diameter of the outer peripheral surface of the first intermediate gear shaft 23. The minor axis-side width of the through hole 145 is identical or substantially identical to the diameter of the outer peripheral surface of the first intermediate gear shaft 23. In the absolute encoder 2, the major axis direction of the through hole 145 in the supporting projection 141 is parallel or substantially parallel to the horizontal plane. The first intermediate gear shaft 23 with the layshaft-side end portion 23b inserted into the through hole 145 of the supporting projection 141 is engaged with the biasing spring 41 as described below. The biasing spring 41 biases the layshaft-side end portion 23b of the first intermediate gear shaft 23 in the second meshing direction P2.

In this way, by the biasing mechanism 40 described below, the supporting projection 131, and the supporting projection 141, the first intermediate gear shaft 23 is configured such that the layshaft-side end portion 23b can move in parallel or substantially parallel to the horizontal direction with the main shaft-side end portion 23a as a fulcrum (center of oscillation), and the second worm gear portion 22 at the layshaft-side end portion 23b can move in parallel or substantially parallel to the horizontal direction over a larger width than the first worm wheel portion 21 at the main shaft-side end portion 23a side. This allows the first intermediate gear shaft 23, that is, the first intermediate gear 20 biased by the biasing mechanism 40 and supported on the supporting projection 131 and the supporting projection 141 to oscillate along the horizontal plane (XY plane).

In such a configuration, the amount of movement (amount of oscillation) of the first intermediate gear shaft 23 is determined by the depth of the through hole 143 formed in the supporting projection 131, that is, the thickness of the supporting projection 131 in the central axial direction of the first intermediate gear shaft 23, the clearance between the through hole 143 and the first intermediate gear shaft 23, and the major axis-side width of the through hole 145. However, when the clearance between the through hole 143 and the first intermediate gear shaft 23 is large, since the first intermediate gear shaft 23 is subject to more backlash and becomes misaligned, this clearance is preferably kept small. Therefore, by forming the supporting projection 131 with a thin plate or the like to reduce the thickness of the supporting projection 131, that is, making the through hole 143 shallower, making it possible to ensure the amount of movement of the first intermediate gear shaft 23 while reducing the clearance between the through hole 143 and the first intermediate gear shaft 23. The amount of movement of the first intermediate gear shaft 23 can be defined by the major axis-side width of the through hole 145 by setting the amount of movement of the first intermediate gear shaft 23 based on the thickness of the supporting projection 131 larger than the amount of movement of the first intermediate gear shaft 23 based on the major axis-side width of the through hole 145.

First Layshaft Gear

Figure 16:
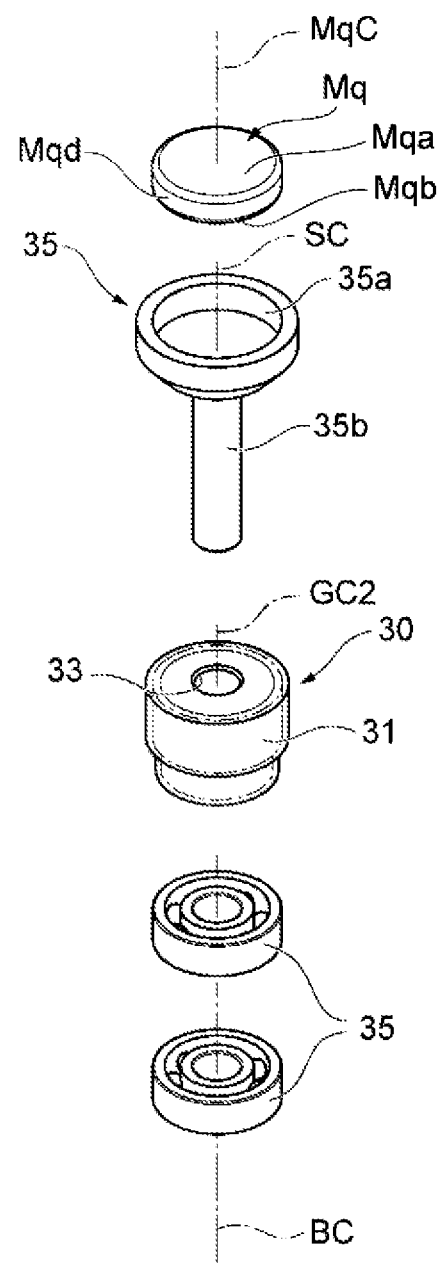
FIG. 16 is an exploded perspective view schematically illustrating the magnet, a magnet holder, the first layshaft gear, and a bearing disassembled in the configuration of the absolute encoder in FIG. 15.

FIG. 15 is a partial cross-sectional view schematically illustrating the configuration of the absolute encoder 2 in FIG. 2 cut along a plane through the central axis of the first layshaft gear 30 and orthogonal to the central axis of the first intermediate gear 20. FIG. 16 is an exploded perspective view schematically illustrating the magnet Mq, the magnet holder 35, the first layshaft gear 30, and the bearing 135 disassembled in the configuration of the absolute encoder 2 in FIG. 15.

As illustrated in FIGS. 15 and 16, the first layshaft gear 30 is a cylindrical member, and in the first layshaft gear 30, a shaft portion 35b of the magnet holder 35 is press-fitted and fixed to the magnet holder 35. The first layshaft gear 30 includes the second worm wheel portion 31, the gear portion 32, and a through hole 33. The first layshaft gear 30 is an integrally formed member made of metal or resin, and in this embodiment, the first layshaft gear 30 is made of polyacetal resin as an example.

The second worm wheel portion 31 is a gear meshed with the second worm gear portion 22 of the first intermediate gear 20. The second worm wheel portion 31 is an example of a second driven gear. The second worm wheel portion 31 is composed of, for example, a plurality of teeth provided at the outer peripheral portion of an upper-side cylindrical portion of the first layshaft gear 30. When the first intermediate gear 20 rotates, the rotational force of the first intermediate gear 20 is transmitted to the first layshaft gear 30 via the second worm gear portion 22 of the first intermediate gear 20 and the second worm wheel portion 31.

The gear portion 32 is a gear meshing with the gear portion 71 of the second intermediate gear 70. The gear portion 32 is an example of a third drive gear. The gear portion 32 is composed of, for example, a plurality of teeth provided at the outer peripheral portion of a lower-side cylindrical portion of the first layshaft gear 30. As illustrated in FIG. 15, the gear portion 32 is formed below the second worm wheel portion 31, and the addendum circle diameter of the gear portion 32 is smaller than the addendum circle diameter of the second worm wheel portion 31. As the first layshaft gear 30 rotates, the rotational force of the first layshaft gear 30 is transmitted to the second intermediate gear 70 via the gear portion 32 of the first layshaft gear 30 and the gear portion 71 of the second intermediate gear 70.

As illustrated in FIGS. 15 and 16, the through hole 33 is a hole passing through the layshaft gear 30 having a cylindrical shape along the central axis of the cylindrical layshaft gear 30. The shaft portion 35b of the magnet holder 35 is press-fitted into the through hole 33, and the first layshaft gear 30 is configured to rotate integrally with the magnet holder 35.

The magnet holder 35 includes a magnet holding portion 35a and the shaft portion 35b. The magnet holder 35 is an integrally formed member made of metal or resin, and in this embodiment, the magnet holder 35 is made of non-magnetic stainless steel as an example. The outer rings of two of the bearings 135 are press-fitted into the inner peripheral surface of the tubular bearing holder portion 134 formed in the base 3. The shaft portion 35b of the magnet holder 35 is a columnar member. The shaft portion 35b is press-fitted into the through hole 33 of the first layshaft gear 30, and the lower portion of the shaft portion 35b is fixed by being inserted into inner rings of the two bearings 135. Accordingly, the magnet holder 35 is supported on the base 3 by the two bearings 135, and rotates integrally with the first layshaft gear 30. The magnet holder 35 is held by the bearing holder portion 134 via the bearing 135 to be rotatable around a rotation axis parallel or substantially parallel to the Z-axis. A bearing stopper 35c is press-fitted into the shaft portion 35b of the magnet holder 35. In assembling the first layshaft gear 30, the outer ring of the bearing 135 installed at the upper surface 104 side of the base 3 is first press-fitted into the bearing holder portion 134, and then the shaft portion 35b of the magnet holder 35 is inserted into the inner ring of the bearing 135. Subsequently, the bearing stopper 35c is press-fitted into the shaft portion 35b of the magnet holder 35 until the bearing stopper 35c contacts the lower side of the inner ring of the bearing 135. Subsequently, while the shaft portion 35b of the magnet holder 35 is inserted into the inner ring of the bearing 135 installed at the lower surface 102 side of the base 3, and the outer ring is fixed by being press-fitted into the bearing holder portion 134. Thus, the bearing stopper 35c can prevent the magnet holder 35 inserted into the bearing 135 from being removed from the bearing 135, and the bearing 135 and the magnet holder 35 can be fixed with no gap, allowing backlash of the magnet Mg in the up-down direction to be minimized as much as possible. Although the press-fitting positions of the two bearings 135 are determined by contacting bearing positioning members 35d provided at the base 3, the two bearings 135 may be positioned to cause the surfaces of the upper surface 104 and the lower surface 102 of the base 3 and the surfaces of the bearings 135 to have the same height without the bearing positioning members 35d.

The magnet holding portion 35a is provided at the upper end of the magnet holder 35. The magnet holding portion 35a is a bottomed cylindrical member. The magnet holding portion 35a has a depression recessed from the upper end surface of the magnet holder 35 toward the lower side. The inner peripheral surface of the depression in the magnet holding portion 35a is formed in contact with an outer peripheral surface Mqd of the magnet Mq. This causes, in the absolute encoder 2, the magnet Mq to be accommodated in the depression of the magnet holding portion 35a to be fixed to the magnet holding portion 35a.

Since the shaft portion 35b of the magnet holder 35 is supported by the two bearings 135 disposed in the bearing holder portion 134 formed in the base 3, the magnet holder 35 can be prevented from tilting. Further, disposing the two bearings 135 at the furthest possible distance away from each other in the up-down direction of the shaft portion 35b increases the effect of preventing the magnet holder 35 from tilting.

As illustrated in FIG. 16, the magnet Mq is a disk-shaped or substantially disk-shaped permanent magnet to be press-fitted into the magnet holding portion 35a of the magnet holder 35, and has an upper surface Mqa and a lower surface Mqb. In the absolute encoder 2, the upper surface Mqa of the magnet Mq faces the lower surface of the angle sensor Sp with a certain distance in between. A central axis MqC of the magnet Mq (axis representing the center of the magnet Mq or axis passing through the center of a magnetic pole boundary) coincides with a central axis SC of the magnet holder 35, a central axis GC2 of the first layshaft gear 30, and a central axis BC of the bearing 135. When these central axes are made to coincide with each other, the rotation angle or the amount of rotation can be detected with higher accuracy.

In an embodiment of the present invention, the two magnetic poles (N/S) of the magnet Mq are preferably formed adjacent to each other in the horizontal plane (XY plane) perpendicular to the central axis MqC of the magnet Mq. This can further improve the detection accuracy of the rotation angle or the amount of rotation by the angle sensor Sq. The magnet Mq is formed from a magnetic material such as a terrific material, an Nd (neodymium) —Fe (iron) —B (boron) material. The magnet Mq may be, for example, a rubber magnet or a bond magnet including a resin binder.

Second Intermediate Gear

Figure 17:
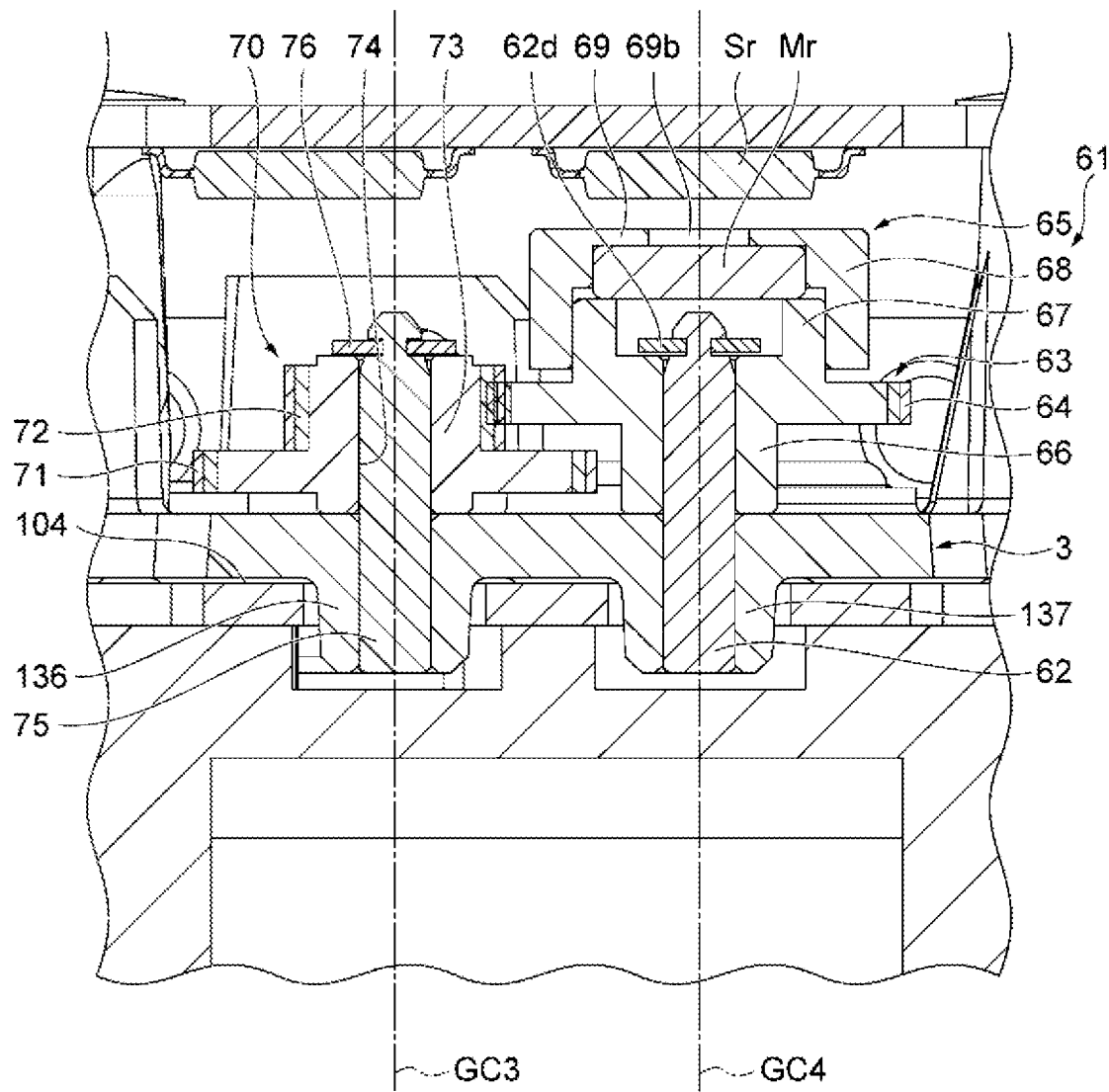
FIG. 17 is a partial cross-sectional view schematically illustrating the configuration of the absolute encoder in FIG. 2 cut along a plane through central axes of a second intermediate gear and a second layshaft gear.
Figure 18:
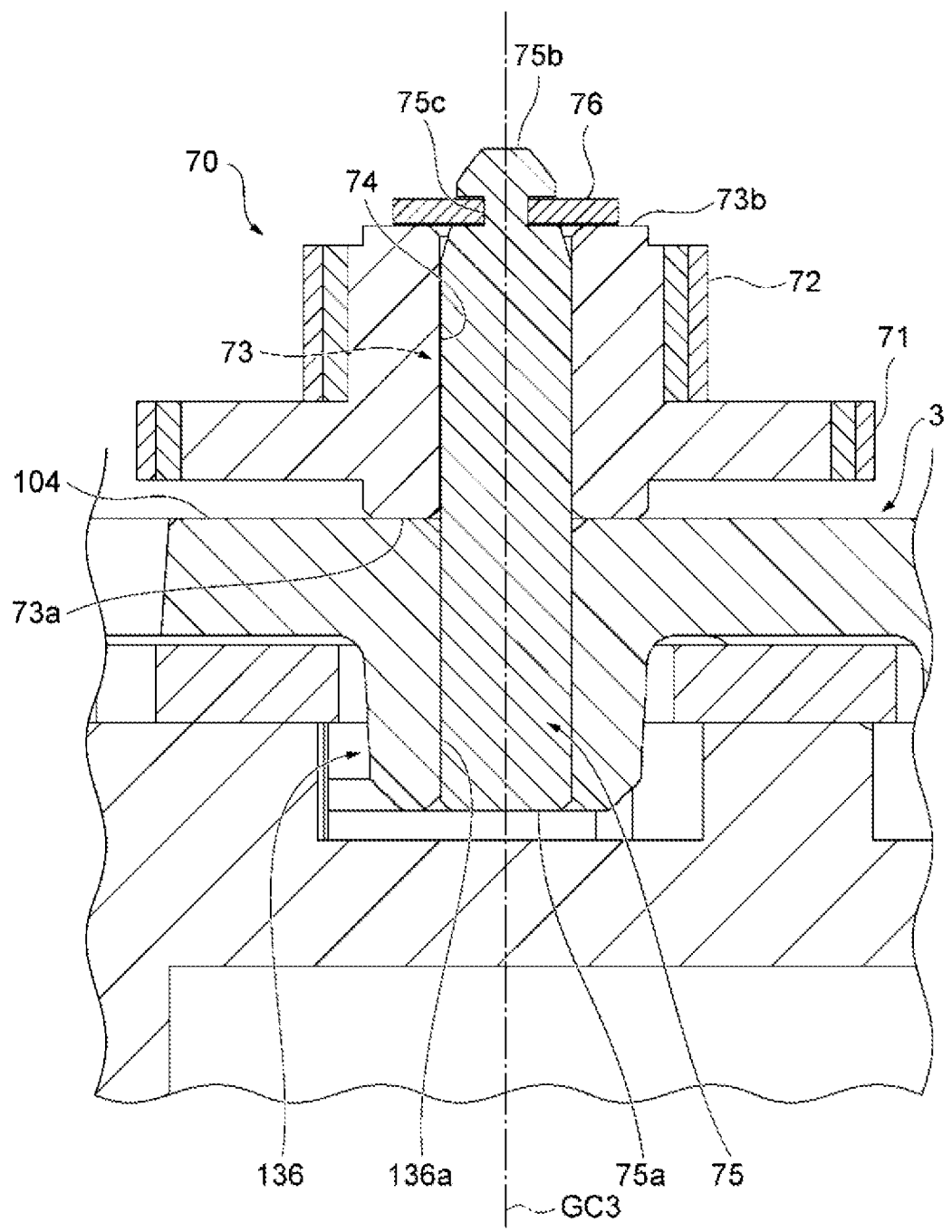
FIG. 18 is an enlarged cross-sectional view illustrating the second intermediate gear illustrated in FIG. 17.

FIG. 17 is a partial cross-sectional view schematically illustrating the configuration of the absolute encoder 2 in FIG. 2 cut along a plane through the central axes of the second intermediate gear 70 and the second layshaft gear 63. FIG. 18 is an enlarged cross-sectional view illustrating the second intermediate gear 70 illustrated in FIG. 17.

As illustrated in FIGS. 17 and 18, the second intermediate gear 70 is a member rotatably supported on the shaft 75 fixed to the shaft supporting portion 136 of the base 3, and includes the gear portion 71, the gear portion 72, and a main body portion 73. The second intermediate gear 70 is, for example, a member integrally formed from a resin material having low sliding resistance, and an example of the resin material of the second intermediate gear 70 is polyacetal resin. The shaft 75 is fixed to the shaft supporting portion 136 of the base 3 so that a central axis GC3 of the second intermediate gear 70 is parallel or substantially parallel to the central axis GC2 of the first layshaft gear 30, and for example, a portion at the lower end (lower end surface 75a) side of the shaft 75 is fixed by being press-fitted into a through hole 136a of the shaft supporting portion 136 of the base 3.

The main body portion 73 is a cylindrical or substantially cylindrical portion and has a through hole 74 inside. The through hole 74 is formed so that the shaft 75 is slidably inserted into the through hole 74. The gear portion 71 is a gear meshed with the gear portion 32 of the first layshaft gear 30. The gear portion 71 is an example of a third driven gear. The gear portion 71 is composed of, for example, a plurality of teeth provided at a lower-side outer peripheral portion of the main body portion 73. As the first layshaft gear 30 rotates, the rotational force of the first layshaft gear 30 is transmitted to the gear portion 71 of the second intermediate gear 70 via the gear portion 32 of the first layshaft gear 30. As a result, the second intermediate gear 70 rotates.

The gear portion 72 is a gear meshing with the gear portion 64 of the second layshaft gear 63. The gear portion 72 is an example of a fourth drive gear. The gear portion 72 is composed of, for example, a plurality of teeth provided at an upper-side outer peripheral portion of the main body portion 73, and is provided above the gear portion 71. As the second intermediate gear 70 rotates, the rotational force of the second intermediate gear 70 is transmitted to the gear portion 64 of the second layshaft gear 63 via the gear portion 72. As a result, the second layshaft gear 63 rotates.

As illustrated in FIGS. 17 and 18, in the second intermediate gear 70, the through hole 74 is a hole extending through the main body portion 73 so that the central axis of the through hole 74 coincides or substantially coincides with the central axis of each of the gear portion 71 and the gear portion 72. The through hole 74 is formed so that the central axis GC3 of the second intermediate gear 70 coincides or substantially coincides with the central axis of the shaft 75.

An end surface on a lower side (lower end surface 73a) of the main body portion 73 is formed in contact with the upper surface 104 of the base 3 and slidably with respect to the upper surface 104. The lower end surface 73a of the main body portion 73 is, for example, a plane or a substantially plane orthogonal or substantially orthogonal to the central axis GC3 of the second intermediate gear 70. An end surface on an upper side (upper end surface 73b) of the main body portion 73 is formed in contact with a member facing the upper end surface 73b and slidably with respect to the member. The upper end surface 73b of the main body portion 73 is, for example, a plane or a substantially plane orthogonal or substantially orthogonal to the central axis GC3 of the second intermediate gear 70.

An annular groove 75c is formed around the axial line of the shaft 75 in a portion at an upper end (upper end surface 75b) side of the shaft 75, and a snap ring 76 is formed to be engageable with the groove 75c. The snap ring 76 is a member for holding a state of the second intermediate gear 70 being rotatably supported on the shaft 75 and is a member for partially increasing an outer diameter of a portion of the shaft 75 at the upper end surface 75b side. As illustrated in FIG. 18, the snap ring 76 is, for example, an annular member such as a c-ring or an e-ring. In the absolute encoder 2, the groove 75c is provided in the shaft 75 so that the snap ring 76 faces the upper end surface 73b of the main body portion 73 of the second intermediate gear 70. In the absolute encoder 2, the snap ring 76 attached to the groove 75c may be in contact with the upper end surface 73b of the second intermediate gear 70, or may face the upper end surface 73b of the second intermediate gear 70 with a gap. Movement of the second intermediate gear 70 in the axial direction of the shaft 75 is restricted by the snap ring 76.

The second intermediate gear 70 is configured as described above, the shaft 75 is inserted into the through hole 74 of the second intermediate gear 70 and the snap ring 76 is attached to the groove 75c of the shaft 75 in the absolute encoder 2, and the second intermediate gear 70 is attached in the absolute encoder 2. In the absolute encoder 2, the second intermediate gear 70 is rotatable about a rotation axis parallel or substantially parallel to the central axis GC2 of the first layshaft gear 30 with the shaft 75 as a rotation axis. The second intermediate gear 70 is slidable on the upper surface 104 of the base 3 and the snap ring 76 attached to the shaft 75, restricting movement of the second intermediate gear 70 in the axial direction of the shaft 75.

Second Lay Shaft Gear

Figure 19:
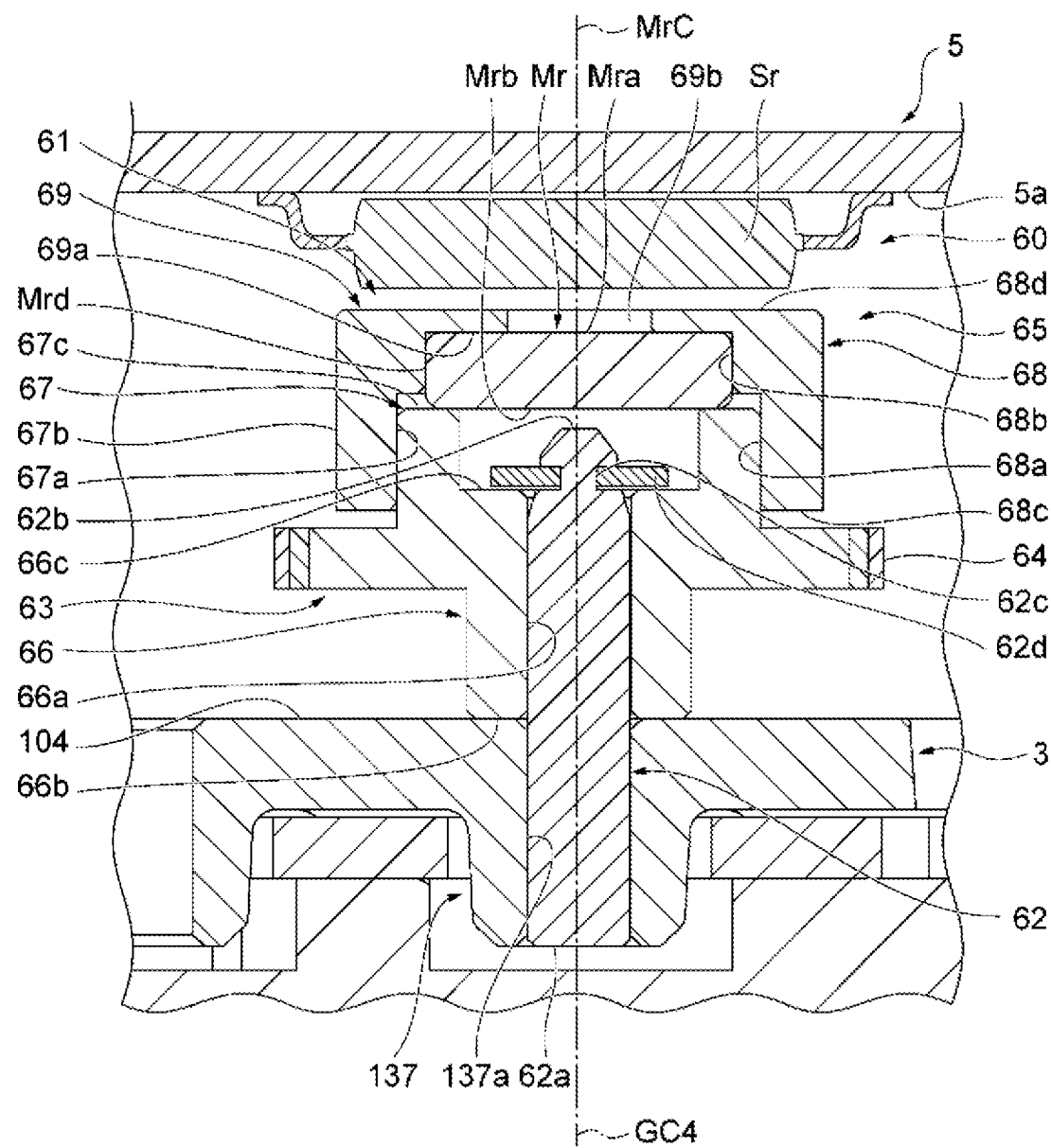
FIG. 19 is an enlarged cross-sectional view illustrating the magnet holder including the second layshaft gear illustrated in FIG. 17.
Figure 20:
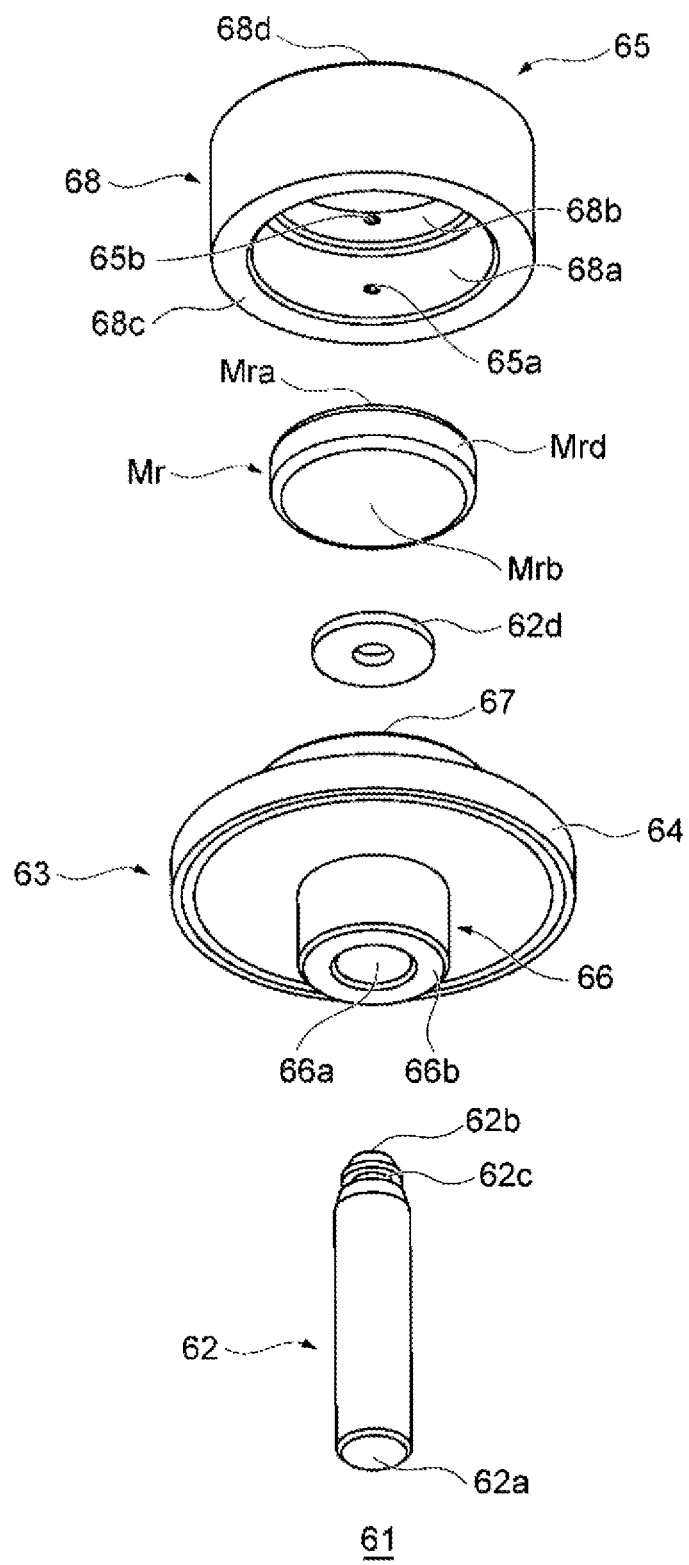
FIG. 20 is an exploded perspective view schematically illustrating the magnet holder illustrated in FIG. 19 exploded.

FIG. 19 is an enlarged cross-sectional view illustrating the magnet holder 61 including the second layshaft gear 63 illustrated in FIG. 17, and FIG. 20 is an exploded perspective view schematically illustrating an exploded state of the magnet holder 61 illustrated in FIG. 19.

As illustrated in FIGS. 17, 19, and 20, the magnet holder 61 is a member rotatably supported on the second layshaft gear shaft 62 fixed to the shaft supporting portion 137 of the base 3, and includes the second layshaft gear 63, a magnet holder portion 65, and the magnet Mr. The magnet holder portion 65 is a member for fixing the magnet Mr in the magnet holder 61 by clamping the magnet Mr in the magnet holder 61 between the magnet holder portion 65 and the second layshaft gear 63. The second layshaft gear shaft 62 is fixed to the shaft supporting portion 137 of the base 3 so that an axial line (central axis GC4) of second layshaft gear shaft 62 is parallel or substantially parallel to the central axis GC3 of the second intermediate gear 70, and for example, a portion of the second layshaft gear shaft 62 at a lower end (lower end surface 62a) side is fixed by being press-fitted into the through hole 137a of the shaft supporting portion 137 of the base 3. In the absolute encoder 2, the second layshaft gear shaft 62 is fixed to the base 3 so that the magnet Mr of the magnet holder 61 faces the angle sensor Sr attached to the substrate 5, in the direction of the central axis GC3.

The second layshaft gear 63 includes the gear portion 64, a main body portion 66, and a magnet supporting portion 67. The second layshaft gear 63 is a member integrally formed from a resin material having low sliding resistance. That is, the gear portion 64, the main body portion 66, and the magnet supporting portion 67 are integrally formed from the same material and each form part of the second layshaft gear 63. Polyacetal resin is an example of the resin material of the second layshaft gear 63. The main body portion 66 is a cylindrical or substantially cylindrical portion and has a through hole 66a inside. The through hole 66a is formed so that the second layshaft gear shaft 62 is slidably inserted into the through hole 66a. The gear portion 64 is a gear meshed with the gear portion 72 of the second intermediate gear 70. The gear portion 64 is an example of a fourth driven gear. The gear portion 64 is composed of, for example, a plurality of teeth provided at the outer peripheral portion of the main body portion 66. In the illustrated example, the gear portion 64 forms a disc-shaped portion protruding from the outer peripheral surface of the main body portion 66 in the outer peripheral direction, and a plurality of teeth are provided at the outer peripheral surface of the disc-shaped portion. As the second intermediate gear 70 rotates, the rotational force of the second intermediate gear 70 is transmitted to the gear portion 64 of the second layshaft gear 63 via the gear portion 72 of the second intermediate gear 70. As a result, the second layshaft gear 63 rotates.

As illustrated in FIGS. 17 and 19, in the second layshaft gear 63, the through hole 66a is a hole extending through the main body portion 66 so that the central axis of the through hole 66a coincides or substantially coincides with the central axis of the gear portion 64. The through hole 66a is formed so that the central axis GC4 of the second layshaft gear 63 coincides or substantially coincides with the central axis of the second layshaft gear shaft 62.

An end surface on a lower side (lower end surface 66b) of the main body portion 66 is formed in contact with the upper surface 104 of the base 3 and slidably with respect to the upper surface 104. The lower end surface 66b of the main body portion 66 is, for example, a plane or a substantially plane orthogonal or substantially orthogonal to the central axis GC4 of the second layshaft gear 63. An end surface on an upper side (upper end surface 66c) of the main body portion 66 is formed in contact with a member faced by the upper end surface 66c and slidably with respect to the member. The upper end surface 66c of the main body portion 66 is, for example, a plane or a substantially plane orthogonal or substantially orthogonal to the central axis GC4 of the second layshaft gear 63.

The magnet supporting portion 67 is a portion extending upward from a portion of the main body portion 66 above the gear portion 64, and is a tubular portion extending along the central axis GC4 of the second layshaft gear 63. The magnet supporting portion 67 extends upward beyond the upper end surface 66c of the main body portion 66, and a cylindrical space is formed inside the magnet supporting portion 67 by the upper end surface 66c of the main body portion 66 and a surface (inner peripheral surface 67a) facing the inner peripheral side of the magnet supporting portion 67. The outer peripheral surface 67b of the magnet supporting portion 67 is located at the inner peripheral side from a distal end of the gear portion 64. The magnet supporting portion 67 is, for example, a cylindrical or substantially cylindrical member centered or substantially centered on the central axis GC4 of the second layshaft gear 63. As illustrated in FIG. 19, the upper end surface 66c of the main body portion 66 is connected to the inner peripheral surface 67a of the magnet supporting portion 67, and the main body portion 66 may be larger at the outer peripheral side than the portion below the gear portion 64 at the portion connected to the magnet supporting portion 67, or may not be larger at the outer peripheral side than the portion below the gear portion 64 at the portion connected to the magnet supporting portion 67. The shape of the magnet supporting portion 67 is not limited to a cylindrical shape or a substantially cylindrical shape, and may be another shape. For example, the shape of the magnet supporting portion 67 may be a rectangular tube shape or the like.

An end surface on an upper side (upper end surface 67c) of the magnet supporting portion 67 is a plane or a substantially plane orthogonal or approximately orthogonal to the central axis GC4 of the second layshaft gear 63. In the absolute encoder 2, the inner peripheral surface 67a of the magnet supporting portion 67 is located at the inner peripheral side from the surface (outer peripheral surface Mrd) facing the outer peripheral side of the magnet Mr so that the magnet Mr can contact the entire circumference of the upper end surface 67a. In the absolute encoder 2, the magnet supporting portion 67 is formed so that the upper end surface 67c is located above an end surface on an upper side (upper end surface 62b) of the second layshaft gear shaft 62. The upper end surface 67c of the magnet supporting portion 67 is parallel or substantially parallel to the upper surface 104 of the base 3, and when the second layshaft gear 63 rotates, the upper end surface 67c rotates without surface wobbling with respect to the upper surface 104 of the base 3.

The magnet holder portion 65 is made of a bottomed cylindrical resin material. The resin material of the magnet holder portion 65 is, for example, a resin material. An adhesive adheres to the resin material. Specifically, the magnet holder portion 65 has a tubular portion 68 extending in a tubular shape and a bottom portion 69 extending from an end at one end side of the tubular portion 68 to an inner peripheral side. The tubular portion 68 forms a fitting portion 65a configured to accommodate the magnet supporting portion 67 of the second layshaft gear 63 inside and allows the magnet holder portion 65 to be fitted into the magnet supporting portion 67. The tubular portion 68 and the bottom portion 69 form a magnet accommodating portion 65b configured to accommodate and hold the magnet Mr inside.

In the absolute encoder 2, the tubular portion 68 of the magnet holder portion 65 has an inner peripheral surface 68a having a cylindrical surface shape or a substantially cylindrical surface shape extending along a central axis coinciding or substantially coinciding with the central axis MC4 of the second layshaft gear 63. The inner peripheral surface 68a is a surface facing the inner peripheral side, is a surface extending toward the bottom portion 69 from an end (opening end 68c) of the tubular portion 68 on a side opposite to an end at the bottom portion 69 side, and forms an opening at the opening end 68c of the tubular portion 68. A space formed inside by the inner peripheral surface 68a is the fitting portion 65a. The inner peripheral surface 68a is formed in contact with the outer peripheral surface 67b of the magnet supporting portion 67 so that the magnet supporting portion 67 is tightly fitted into the magnet holder portion 65 when the magnet supporting portion 67 of the second layshaft gear 63 is accommodated in the fitting portion 65a. The shape of the inner peripheral surface 68a of the tubular portion 68 is not limited to a cylindrical shape or a substantially cylindrical shape, and may be another shape. The shape of the inner peripheral surface 68a of the tubular portion 68 corresponds to the shape of the magnet supporting portion 67 to be accommodated.

In the absolute encoder 2, the tubular portion 68 of the magnet holder portion 65 has an inner peripheral surface 68b having a cylindrical surface shape or a substantially cylindrical surface shape extending along a central axis coinciding or substantially coinciding with the central axis MC4 of the second layshaft gear 63 and extending along a central axis coinciding or substantially coinciding with the central axis MrC of the magnet Mr. The inner peripheral surface 68b is a surface facing the inner peripheral side, and is a surface extending between the inner peripheral surface 68a and a bottom surface 69a of the bottom portion 69. A space formed inside by the inner peripheral surface 68b and the bottom surface 69a of the bottom portion 69 is the magnet accommodating portion 65b. The inner peripheral surface 68b is formed facing the outer peripheral surface Mrd of the magnet Mr in the radial direction when the magnet Mr is accommodated in the magnet accommodating portion 65b. The inner peripheral surface 68b is located at an inner peripheral side from the inner peripheral surface 68a, and a step is formed between the inner peripheral surface 68a and the inner peripheral surface 68b. The width of the inner peripheral surface 68b in the central axial direction is smaller than the width of the magnet Mr in the direction of the central axis MrC. The inner peripheral surface 68b may be formed facing the outer peripheral surface Mrd of the magnet Mr with a space between the inner peripheral surface 68b and the magnet Mr in the radial direction or may be formed facing the outer peripheral surface Mrd of the magnet Mr without a space between the inner peripheral surface 68b and the magnet Mr in the radial direction when the magnet Mr is accommodated in the magnet accommodating portion 65b.

The bottom portion 69 of the magnet holder portion 65 is a disk-shaped portion extending toward the inner peripheral side from an end (closed end 68d) of the tubular portion 68 on a side opposite to the opening end 68c, and has the bottom surface 69a described above. The bottom surface 69a is a surface facing the magnet accommodating portion 65b, and is a surface along a plane or a substantially plane orthogonal or substantially orthogonal to the central axis of the tubular portion 68. The bottom portion 69 is formed with an opening 69b, a through hole passing through the bottom portion 69 in the central axial direction of the tubular portion 68. The bottom surface 69a of the bottom portion 69 is formed in contact with an upper surface Mra of the magnet Mr in an orientation of the magnet Mr having the central axis MrC of the magnet Mr parallel or substantially parallel to the central axis of the tubular portion 68 when the magnet Mr is accommodated in the magnet accommodating portion 65b. The opening portion 69b of the bottom portion 69 is formed so that the magnetic flux of the magnet Mr passes through the opening portion 69b when the magnet Mr is accommodated in the magnet accommodating portion 65b.

As described above, the second layshaft gear shaft 62 is made of a magnetic material, and an attractive force due to a magnetic force is generated between the magnet Mr and the second layshaft gear shaft 62 in the direction of the rotation axis of the magnet holder 61. Specifically, the second layshaft gear shaft 62 generates a magnetic force urging the magnet Mr in the direction of the second layshaft gear shaft 62.

An annular groove 62c is formed around the axial line of the second layshaft gear shaft 62 in a portion at the upper end (upper end surface 62b) side of the second lay shaft gear shaft 62, and a snap ring 62d is formed to be engageable with the groove 62c. The snap ring 62d is a member for restricting the movement of the magnet holder 61 in the axial direction of the second layshaft gear shaft 62, and is a member for partially increasing the outer diameter of a portion of the second layshaft gear shaft 62 at the upper end surface 62b side. As illustrated in FIG. 19, the snap ring 62d is, for example, an annular member such as a c-ring or an e-ring. In the absolute encoder 2, the groove 62c is provided in the second layshaft gear shaft 62 so that the snap ring 62d faces the upper end surface 66c of the main body portion 66 of the second layshaft gear 63 with a space between the snap ring 62d and the upper end surface 66c.

Figure 21:
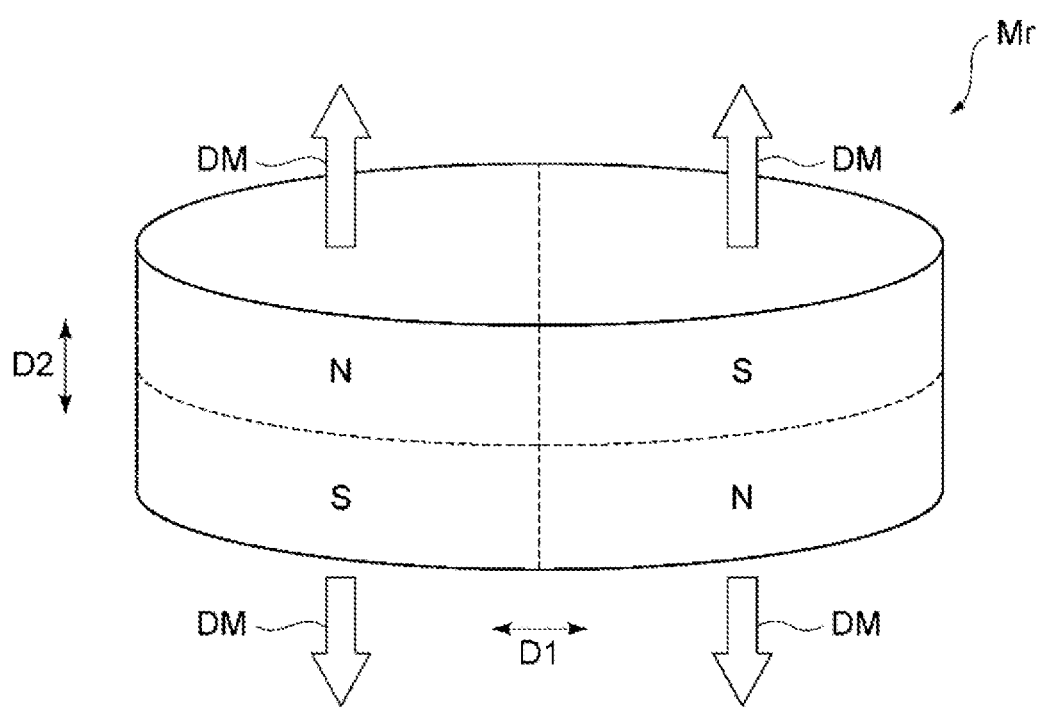
FIG. 21 is a schematic perspective view illustrating a cylindrical magnet applicable to a magnet of the magnet holder illustrated in FIG. 19.

As illustrated in FIGS. 19 and 20, the magnet Mr is a disk-shaped or substantially disk-shaped permanent magnet to be accommodated in the magnet accommodating portion 65b of the magnet holder portion 65, and has the upper surface Mra, a lower surface Mrb, and the outer peripheral surface Mrd. In an embodiment of the present invention, the two magnetic poles (N/S) of the magnet Mr are preferably formed adjacent in the horizontal plane (XY plane) perpendicular to the central axis MrC of the magnet Mr. This can further improve the detection accuracy of the rotation angle or the amount of rotation by the angle sensor Sr. The magnet Mr is formed from a magnetic material such as a ferritic material, an Nd (neodymium) —Fe (iron) —B (boron) material. The magnet Mr may be, for example, a rubber magnet or a bond magnet including a resin binder. FIG. 21 is a schematic perspective view illustrating the cylindrical magnet Mr applicable to an embodiment of the present invention. In the magnet Mr of the illustrated example, a first magnetic pole portion N and a second magnetic pole portion S are provided adjacent to each other side by side in a radial direction D1 with the center or substantially the center of the magnet Mr in the radial direction D1 as a boundary. In the magnet Mr of the illustrated example, the first magnetic pole portion N and the second magnetic pole portion S are provided adjacent to each other side by side in an axial direction D2 with the center or substantially the center in the axial (central axis MrC) direction D2 as a boundary. An arrow DM illustrated in FIG. 21 indicates a magnetization direction. Such a magnetization direction is generally called in-plane magnetization, and a magnet magnetized in the in-plane direction is used as the magnet Mr.

The magnet holder 61 is configured as described above, the second layshaft gear shaft 62 is inserted into the through hole 66a of the main body portion 66 of the second layshaft gear 63 and the snap ring 62d is attached to the groove 62c of the second layshaft gear shaft 62 in the absolute encoder 2, and the second layshaft gear 63 is attached in the absolute encoder 2. In the absolute encoder 2, the magnet holder 61 is rotatable around the rotation axis. The rotation axis of the magnet holder 61 coincides or substantially coincides with the central axis GC4 of the second layshaft gear shaft 62. The snap ring 62d and a portion of the second layshaft gear shaft 62 at the upper end surface 62b side are accommodated in a space formed at the inner peripheral side by the magnet supporting portion 67 of the second layshaft gear 63.

In the absolute encoder 2, the magnet Mr is accommodated in the magnet accommodating portion 65b of the magnet holder portion 65 and is fixed to the magnet holder portion 65. The magnet Mr is fixed to the magnet holder portion 65 by bonding with an adhesive. For example, the inner peripheral surface 68b forming the magnet accommodating portion 65b of the magnet holder portion 65 and the outer peripheral surface Mrd of the magnet Mr are bonded to each other with an adhesive. Fixing the magnet Mr to the magnet holder portion 65 with the lower surface Mrb of the magnet Mr in contact with the bottom surface 69a forming the magnet accommodating portion 65b of the magnet holder portion 65 allows the central axis MrC of the magnet Mr to coincide with the central axis of the second layshaft gear shaft 62, the central axis MrC of the magnet Mr to coincide with the rotation axis of the second layshaft gear shaft 62, and the angle sensor Sr to detect the amount of rotation or the rotation angle of the magnet Mr with higher accuracy. The fixing of the magnet Mr to the magnet accommodating portion 65b is not limited to the fixing by an adhesive, and may be achieved by another fixing method such as press-fitting of the magnet Mr to the magnet accommodating portion 65b as in the first layshaft gear 30.

In the absolute encoder 2, the magnet holder portion 65 with the magnet Mr fixed as described above is fitted into the magnet supporting portion 67 of the second layshaft gear 63, the magnet holder portion 65 is fixed to the second layshaft gear 63, and the magnet holder 61 is assembled. Specifically, the magnet supporting portion 67 is press-fitted into the fitting portion 65a of the magnet holder portion 65, the inner peripheral surface 65a forming the fitting portion 65a of the magnet holder portion 65 presses the outer peripheral surface 67b of the magnet supporting portion 67 to the inner peripheral side. The outer peripheral surface 67b of the magnet supporting portion 67 presses the inner peripheral surface 68a of the magnet holder portion 65 to the outer peripheral side, and the magnet holder portion 65 is fixed to the second layshaft gear 63. The magnet holder portion 65 may be fixed to the second layshaft gear 63 not only by fitting but also by another fixing method.

In the magnet holder 61 assembled by fixing the magnet holder portion 65 to the second layshaft gear 63, the magnet Mr is clamped and fixed between the second layshaft gear 63 and the magnet holder portion 65. Specifically, the upper end surface 67c of the magnet supporting portion 67 comes into contact with the lower surface Mrb of the magnet Mr, the magnet Mr is interposed between the upper end surface 67c of the magnet supporting portion 67 and the bottom surface 69a of the bottom portion 69 of the magnet holder portion 65, and the magnet Mr is fixed in the direction of the central axis MrC. On the other hand, fixing of the magnet Mr in the radial direction orthogonal to the central axis MrC is achieved by adhesion between the outer peripheral surface Mrd of the magnet Mr and the inner peripheral surface 68b of the magnet holder portion 65.

In the absolute encoder 2, the upper surface Mra of the magnet Mr faces the angle sensor Sr in the central axial MrC direction of the magnet Mr via the opening 69b formed in the bottom portion 69 of the magnet holder portion 65. This allows the angle sensor Sr to detect a magnetic flux from the magnet Mr.

As described above, the magnet holder 61 attached to the absolute encoder 2 is rotatable about the rotation axis parallel or substantially parallel to the central axis GC3 of the second intermediate gear 70 with the second layshaft gear shaft 62 as a rotation shaft.

The second layshaft gear shaft 62 is made of a magnetic material and generates a magnetic force urging the magnet Mr toward the second layshaft gear shaft 62. Therefore, in the absolute encoder 2, the magnetic force from the second layshaft gear shaft 62 acts on the magnet Mr and attracts the magnet Mr toward the second layshaft gear shaft 62. When the absolute encoder 2 is in the illustrated orientation (upright state), the lower end surface 66b of the main body portion 66 of the second layshaft gear 63 is slidably in contact with the upper surface 104 of the base 3, and an axial force from the second layshaft gear shaft 62 biases the magnet holder 61 in a direction of the lower end surface 66b of the second layshaft gear 63 contacting the upper surface 104 of the base 3. A magnet magnetized in the plane direction has a characteristic that the magnetic flux density is concentrated at the center of the magnet as compared with a magnet magnetized in the radial direction. As described above, the magnet Mr is a magnet magnetized in the plane direction, and the second layshaft gear shaft 62 is made of a magnetic material. Thus, the magnetic flux density of the magnet Mr is more concentrated near the center of the magnet Mr due to the magnetic material of the second layshaft gear shaft 62, thus allowing the angle sensor Sr to accurately detect a magnetic flux in the absolute encoder 2.

On the other hand, when the absolute encoder 2 is inverted in the up-down direction (inverted state) from the illustrated upright state, the magnet holder 61 can move relative to the second layshaft gear shaft 62 in the direction of the central axis MC4 of the second layshaft gear 63 due to the gap between the snap ring 62d and the upper end surface 66c of the main body portion 66 of the second layshaft gear 63. That is, the magnet Mr moves to the angle sensor Sr side, and a gap between the magnet Mr and the angle sensor Sr can be changed. However, in the absolute encoder 2, the second layshaft gear shaft 62 is made of a magnetic material, and the second layshaft gear shaft 62 attracts the magnet Mr toward the second layshaft gear shaft 62 by the magnetic force of the magnetic material. Accordingly, even when the absolute encoder 2 is in the inverted state, the magnet holder 61 is held with the lower end surface 66b of the second layshaft gear 63 in contact with the upper surface 104 of the base 3, maintaining the position of the magnet holder 61 in the central axis MC4 direction in the upright state and preventing the magnet Mr from moving to the angle sensor Sr side. Therefore, even in the inverted state, the gap between the magnet Mr and the angle sensor Sr is maintained at the gap in the upright state.

As described above, in the absolute encoder 2, the gap between the magnet Mr and the angle sensor Sr is not changed depending on the use orientation of the absolute encoder 2, and the influence of the use orientation of the absolute encoder 2 on the detection accuracy can be reduced.

The movement of the second layshaft gear 63 in the axial direction of the second layshaft gear shaft 62 is restricted by the snap ring 62d attached to the second lay shaft gear shaft 62. That is, the movement of the magnet holder 61 in the axial direction of the second layshaft gear shaft 62 is restricted. Therefore, even when a large impact is applied to the absolute encoder 2 and a force is applied to move the magnet holder 61 upward in the axial direction of the second layshaft gear shaft 62 against the magnetic force of the second layshaft gear shaft 62, the movement of the magnet holder 61 is restricted by the snap ring 62d. Therefore, the occurrence of problems such as coming-off of the magnet holder 61 from the second layshaft gear shaft 62 can be prevented.

As described above, the magnet supporting portion 67 in the second layshaft gear 63 has the upper end surface 67c, an end surface on the upper side, also serving as a magnet supporting portion supporting the magnet Mr on the upper side of the second layshaft gear 63. The magnet holder portion 65 serves as a magnet holding portion configured to cover the magnet Mr and the second layshaft gear 63 from above and hold the magnet Mr on the upper end surface 67c of the magnet supporting portion 67.

The magnet holder portion 65 is made of a resin material having a higher breaking elongation characteristic than the second layshaft gear 63. The magnet holder portion 65 has the bottom surface 69a of the bottom portion 69 serving as a magnet joining portion, and the inner peripheral surface 68a serving as the fitting portion 65a.

The assembly structure by press-fitting is one of construction methods relatively easily performed without requiring special equipment in terms of ensuring the concentricity of members to be assembled. In the press-fit structure between resins such as the magnet holder portion 65 and the second layshaft gear 63, the securing of the holding and centering of assembled components and the securing of the holding strength between press-fit members need to be considered using part of the shape of the member, specifically, the outer peripheral surface 67b of the magnet supporting portion 67 as a guide. Therefore, for the resin material of the magnet holder portion 65 and the second layshaft gear 63, a material having a tendency of a low linear expansion coefficient and a high elastic modulus needs to be selected using a filler-added reinforcing material. However, such a resin material having a low linear expansion coefficient and a high elastic modulus is likely to be cracked at the time of press-fitting in terms of strength, and obtaining durability for maintaining the press-fitted state is difficult.

The magnet holder portion 65 having the fitting portion 65a has an escape place for deformation after press-fitting in the outer peripheral direction, and is likely to receive tensile stress. On the other hand, since the second layshaft gear 63 at the shaft side to be press-fitted has no place to escape deformation after the magnet holder portion 65 is press-fitted, the risk of breakage due to stress is low compared to the magnet holder portion 65. Thus, focusing on the breaking elongation characteristic of a material in the absolute encoder 2 and adopting the magnet holder portion 65 having a characteristic of the breaking elongation larger than the second layshaft gear 63 without changing the reinforcing filler content rate can prevent breakage at the time of press-fitting. The breaking elongation characteristic (elongation at break) is an elongation at break of a test piece in a tensile test, or an elongation immediately before break between predetermined gauge points.

Second Layshaft Gear Shaft

Figure 22:
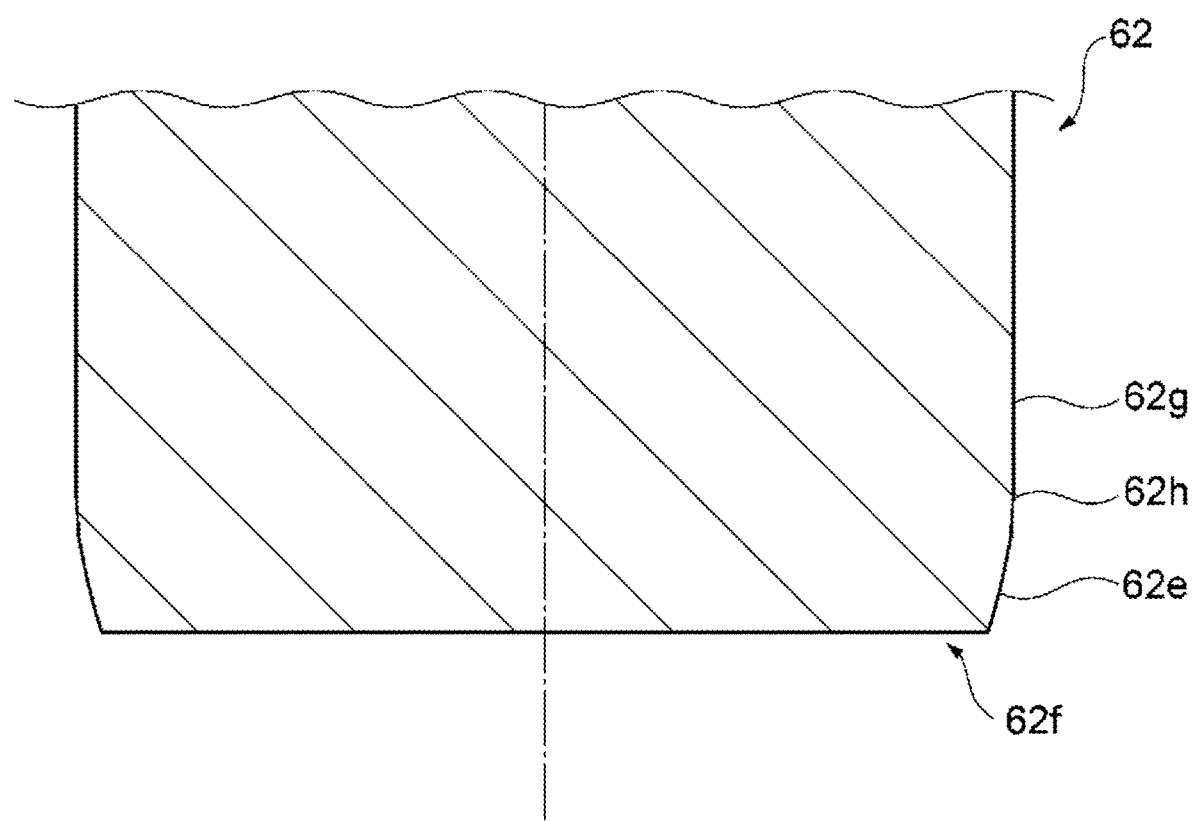
FIG. 22 is an enlarged cross-sectional view illustrating one end portion at the lower end side of the second layshaft gear shaft illustrated in FIG. 18.

A specific shape of the second layshaft gear shaft 62 described above is described below. FIG. 22 is an enlarged cross-sectional view illustrating one end portion 62f of the second layshaft gear shaft 62 at the lower end surface 62a side.

As described above, the second layshaft gear shaft 62 of the second layshaft gear 63 is a shaft press-fitted into and fixed to the through hole 137a of the shaft supporting portion 137 of the base portion 101 of the base 3. As illustrated in FIG. 22, the second layshaft gear shaft 62 has a tapered surface portion 62e. The tapered surface portion 62e is an inclined outer peripheral surface such that the diameter of the one end portion 62f is smaller than the diameter of a peripheral surface 62g. The tapered surface portion 62e is connected by a curved surface to a connecting portion 62h on the outer peripheral surface between the tapered surface portion 62e and the peripheral surface 62g of the second layshaft gear shaft 62. That is, the tapered surface portion 62e is subjected to curved surface processing at the connecting portion 62h on the outer peripheral surface between the tapered surface portion 62e and the peripheral surface 62g.

Figure 23:
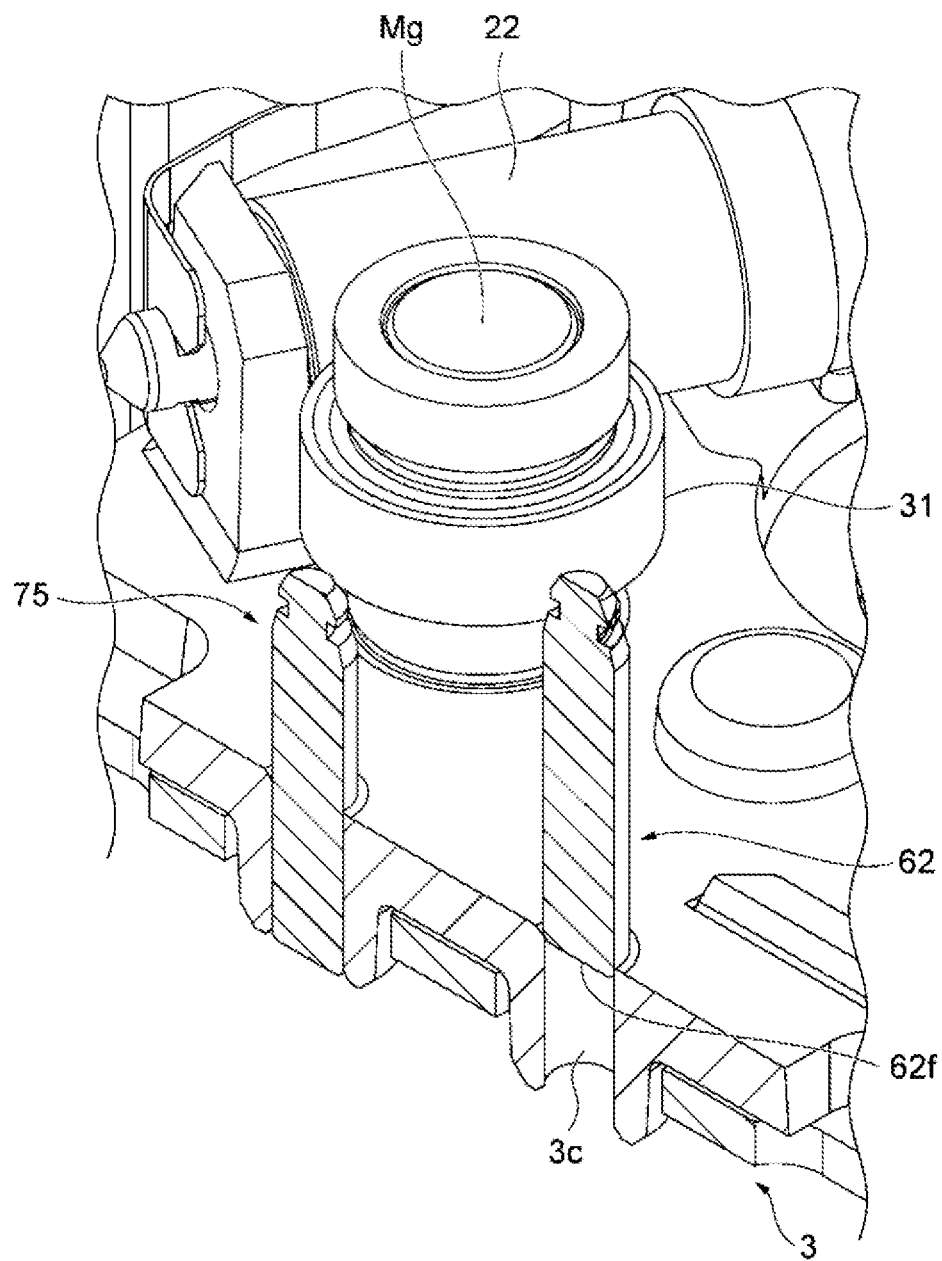
FIG. 23 is a schematic view illustrating a state of the second layshaft gear shaft being press-fitted into a shaft supporting portion of a base portion of a base.
Figure 24:
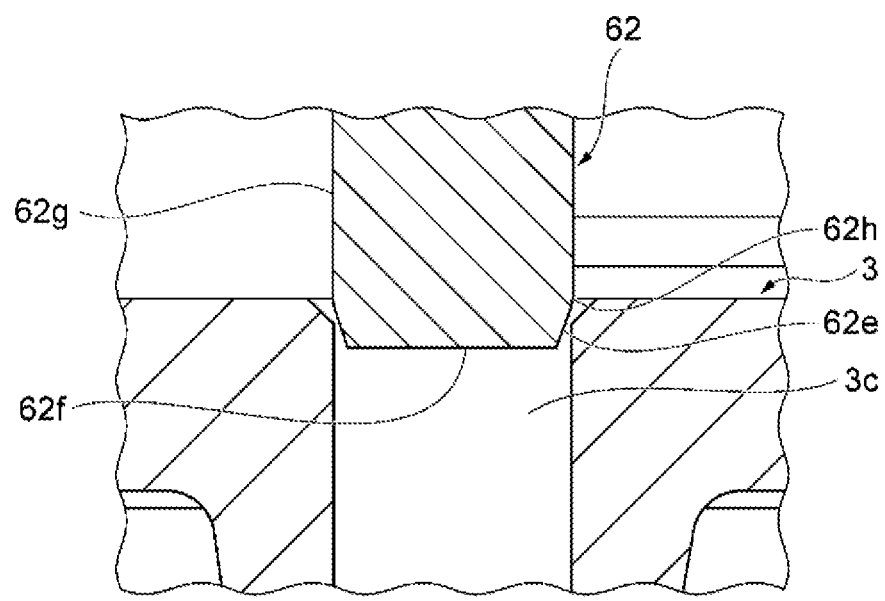
FIG. 24 is a schematic view illustrating a state of the second layshaft gear shaft being press-fitted into the shaft supporting portion of the base portion of the base.

FIGS. 23 and 24 are schematic views illustrating a state of the second layshaft gear shaft 62 being press-fitted into the through hole 137a of the base portion 101 of the base 3.

As illustrated in FIGS. 23 and 24, when the second layshaft gear shaft 62 is press-fitted into the through hole 137a of the base 3, after the tapered surface portion 62e is inserted into the through hole 137a, the connecting portion 62h at the outer peripheral surface between the tapered surface portion 62e and the peripheral surface 62g comes into contact with the through hole 137a Similar to the connecting portions 126a and 127a of the tapered surface portions 126 and 127 of the main shaft adapter 12, the connecting portion 62h is also subjected to the curved surface processing, and thus the second layshaft gear shaft 62 is smoothly press-fitted into the through hole 137a. This can prevent both the second layshaft gear shaft 62 and the through hole 137a from being scraped. The surface roughness Rmax (maximum roughness) of the surface of the main shaft adapter 12 may be, for example, 1.6 [µm] or less. Therefore, the second layshaft gear shaft 62 can suppress scattering of shavings and the like similar to the main shaft adapter 12. According to the second layshaft gear shaft 62, the second layshaft gear shaft 62 can be suppressed from falling (inclining) and being press-fitted due to the member being cut. Further, the second layshaft gear shaft 62 suppresses the inclination of the second layshaft gear shaft 62 and can reduce a press-fitting margin (dimension necessary for press-fitting).

In the absolute encoder 2, an example of curved surface processing on the connecting portion at the outer peripheral surface between the tapered surface portion and the peripheral surface in the shaft to be press-fitted into the supporting member is not limited to the main shaft adapter 12 or the second layshaft gear shaft 62 described above. In the absolute encoder 2, for example, the curved surface processing may be performed on a connecting portion at the outer peripheral surface between the tapered surface portion and the peripheral surface in the supporting shaft of the first layshaft gear 30.

In the absolute encoder 2, the main shaft gear 10, the first intermediate gear 20, the first layshaft gear 30, the second intermediate gear 70, and the second layshaft gear 63 are provided as described above, the rotation axes of the main shaft gear 10 and the first layshaft gear 30 are parallel to each other, and the rotation axis of the first intermediate gear 20 is located at a twisted position with respect to the rotation axes of the main shaft gear 10 and the first layshaft gear 30. The rotation axes of the first layshaft gear 30, the second intermediate gear 70, and the second layshaft gear 63 are parallel to one another. By arranging each gear in this manner, the amount of rotation of the main shaft gear 10 over multiple rotations can be specified according to the detection results of the angle sensors Sq and Sr. Since the rotation axis of the first intermediate gear 20 is located at a twisted position with respect to the rotation axes of the main shaft gear 10 and the first layshaft gear 30 and is orthogonal to the rotation axes in front view, the absolute encoder 2 can include a bent transmission path and be made thinner.

Backlash Reduction Mechanism

As described above, the absolute encoder 2 includes the biasing mechanism 40 biasing the second worm gear portion 22 in the direction of the second worm wheel portion 31, and the biasing mechanism 40 is a backlash reduction mechanism configured to reduce backlash between the second worm gear portion 22 and the second worm wheel portion 31. As illustrated in FIGS. 5, 6, 11, 14, and others, the biasing mechanism 40 includes the biasing spring 41, the supporting projection 45, and the screw 8b for fixing the biasing spring 41 to the supporting projection 45. The through hole 143 of the supporting projection 131 and the through hole 145 of the supporting projection 141 of the base 3 also constitute the biasing mechanism 40.

Figure 14:
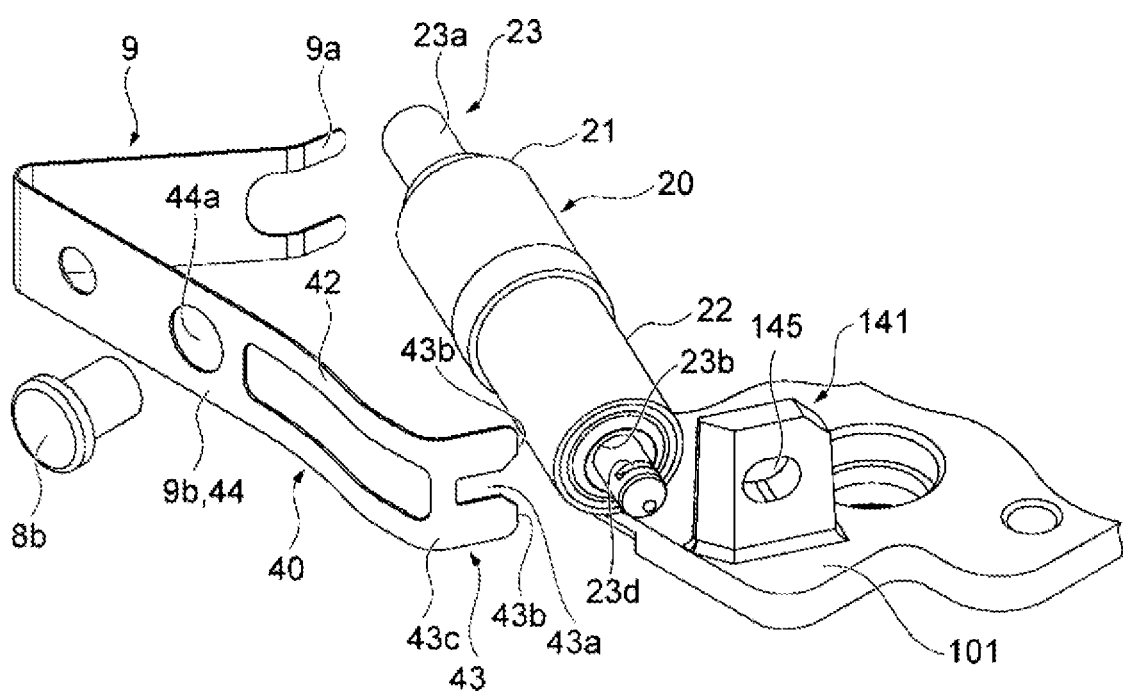
FIG. 14 is an exploded perspective view schematically illustrating a base, the first intermediate gear, a first intermediate gear shaft, a plate spring, and a screw disassembled in the configuration of the absolute encoder in FIG. 12.

The biasing spring 41 is a member for generating a pressing force pressing the second worm gear portion 22 in the direction of the second worm wheel portion 31, and is an elastic member. The biasing spring 41 is, for example, a plate spring, and is made of a metal plate. As illustrated in FIGS. 12 and 14, specifically, the biasing spring 41 includes a spring portion 42 being a portion elastically deforming to generate a pressing force, and an engaging portion 43 and a fixed portion 44 being opposing portions interposing the spring portion 42 between the engaging portion 43 and the fixed portion 44. The engaging portion 43 and the fixed portion 44 are portions forming a pair of end portions of the biasing spring 41.

The fixed portion 44 is formed to be fixable to the supporting projection 45 protruding from the upper surface 104 of the base portion 101 of the base 3 by using the screw 8b. The screw 8b is an example of a fixing member, and the fixed portion 44 is formed with a hole 44a. The screw 8b is inserted into the hole 44a. The fixed portion 44 extends in a planar shape and is configured to be fixed to the supporting projection 45 by the screw 8b while in contact with a planar supporting surface 45a of the supporting projection 45.

The engaging portion 43 has a shape capable of engaging with the layshaft-side end portion 23b of the first intermediate gear shaft 23. As illustrated in FIGS. 13 and 14, the engaging portion 43 includes, for example, an engaging groove 43a forming a gap extending along an extension direction from the spring portion 42 of the engaging portion 43. The engaging groove 43a is a groove open to a side of a tip end edge 43b being an end edge opposing a connecting portion 43c of the engaging portion 43 with the spring portion 42, and is formed by a branched portion divided into two prongs, similar to the one end 9a of the plate spring 9 described above. The engaging portion 43 extends in a planar shape. The layshaft-side end portion 23b of the first intermediate gear shaft 23 is formed with an engaged groove 23d being an annular groove extending in a direction orthogonal or substantially orthogonal to the central axis of the first intermediate gear shaft 23, and the engaging groove 43a of the engaging portion 43 can engage with the engaged groove 23d. When one side of the engaging groove 43a parallel to the up-down direction presses the first intermediate gear shaft 23 in the engaged groove 23d, the first intermediate gear 20 is biased in the direction of the second worm gear portion 22 moving toward the second worm wheel portion 31. Two sides of the engaging groove 43a parallel to the left-right direction are in contact with the first intermediate gear shaft 23 in the engaged groove 23d, and movement of the biasing spring 41 in the up-down direction is restricted by the first intermediate gear shaft 23.

The spring portion 42 has a shape being likely to elastically deform in the engaging direction of the engaging portion 43 with the first intermediate gear shaft 23, and specifically, as illustrated in FIG. 14, the spring portion 42 has a shape likely to deflect in the extension direction of the engaging groove 43a. For example, the spring portion 42 is curved protruding in a direction opposite to the direction of biasing the first intermediate gear 20.

The biasing spring 41 is fixed to the supporting projection 45 by the screw 8b at the fixed portion 44 in an orientation of the spring portion 42 being raised from the fixed portion 44 on the side opposite to the supporting projection 45. The dimensions of the spring portion 42 and the engaging portion 43, the angle of the extension direction of the engaging portion 43 with respect to the extension direction of the spring portion 42, and the like are set so that the engaging groove 43*a* of the engaging portion 43 engages with the engaged groove 23*d* of the first intermediate gear shaft 23 in this fixed state and that the spring portion 42 generates a pressing force for pressing the engaging portion 43 against the first intermediate gear shaft 23 in this engaged state. When the snap ring (not illustrated) described above is attached to the first intermediate gear shaft 23, the snap ring is in contact with the outer surface of the supporting projection 141 in the fixed and engaged state of the biasing spring 41. To achieve a backlash reduction mechanism described below, the engaging groove 43*a* of the engaging portion 43 is preferably formed extending in a direction orthogonal or substantially orthogonal to the central axis of the first intermediate gear shaft 23 in the fixed state of the biasing spring 41. The snap ring may be omitted as described above because the biasing spring 41 can restrict the movement of the first intermediate gear shaft 23 in the central axial direction.

As illustrated in FIGS. 5, 6, 11, 14, and others, the plate spring 9 and the biasing spring 41 are integrally formed as one member. Specifically, the other end 9*b* of the plate spring 9 and the fixed portion 44 of the biasing spring 41 are integrally formed and made of the same member. That is, the plate spring 9 and the biasing spring 41 are formed by a continuous elastic member and are each part of the continuous elastic member, and the other end 9*b* of the plate spring 9 and the fixed portion 44 of the biasing spring 41 are formed in the same part of the continuous elastic member.

The action of the biasing mechanism 40 of the absolute encoder 2 is described below.

In the absolute encoder 2, the first intermediate gear shaft 23 is supported at the base 3 by the main shaft-side end portion 23*a* being inserted into the through hole 143 formed in the supporting projection 131 of the base 3 and the layshaft-side end portion 23*b* being inserted into the through hole 145 formed in the supporting projection 141 of the base 3. In this way, the first intermediate gear shaft 23 is supported on the supporting projections 131 and 141.

The first intermediate gear 20 is rotatably supported on the first intermediate gear shaft 23 in this way. Due to the action of the plate spring 9, the first intermediate gear 20 is biased toward the supporting projection 141, and the layshaft-side sliding portion 26 of the first intermediate gear 20 is in contact with an inner surface 141*a* of the supporting projection 141 (see FIG. 13).

As described above, the through hole 145 has an elongate hole shape with the major axis longer than the minor axis and supports the layshaft-side end portion 23*b* of the first intermediate gear shaft 23, the layshaft-side end portion 23*b* is supported to be movable along the major axis of the through hole 145, that is, within the range of the width of the major axis of the through hole 145 along with the horizontal plane. On the other hand, the through hole 143 supporting the main shaft-side end portion 23*a* of the first intermediate gear shaft 23 has a circular hole shape, and thus, in the absolute encoder 2, the first intermediate gear shaft 23 can oscillate along the horizontal plane by the through holes 143 and 145 of the supporting projections 141 and 142 and the biasing mechanism 40, with the supported portion of the main shaft-side end portion 23*a* as a center or a substantial center.

In the first intermediate gear shaft 23 supported in this manner, the engaging portion 43 of the biasing spring 41 is engaged with the engaged groove 23*d* of the layshaft-side end portion 23*b*, and the biasing spring 41 applies a biasing force to the layshaft-side end portion 23*b* of the first intermediate gear shaft 23 to press the second worm gear portion 22 of the first intermediate gear 20 toward the direction (second meshing direction P2) of the second worm wheel portion 31 of the first layshaft gear 30. This causes the second worm gear portion 22 of the first intermediate gear 20 to be pressed against the second worm wheel portion 31 of the first layshaft gear 30 and causes a so-called "bottoming-out" phenomenon between the second worm gear portion 22 and the second worm wheel portion 31, resulting in the backlash between gears of zero.

Since the layshaft-side end portion 23*b* at the moving side of the first intermediate gear shaft 23, supported in an oscillating manner, is biased by the biasing spring 41, the first intermediate gear shaft 23 is constantly biased in the direction of the second worm gear portion 22 moving toward the second worm wheel portion 31 during oscillation. Therefore, the backlash between the second worm gear portion 22 and the second worm wheel portion 31 can always be made zero without causing rotation malfunction between gears due to oscillation of the first intermediate gear shaft 23.

For example, when the ambient temperature around the absolute encoder 2 is high, the first layshaft gear 30 expands according to the linear expansion coefficient of the material, and the pitch circles of the gears of the second worm wheel portion 31 expand. At this time, when the through hole 145 formed in the supporting projection 141 of the base 3 is not an elongate hole as in the present embodiment but a circular hole, the layshaft-side end portion 23*b* of the first intermediate gear shaft 23 is fixed by the through hole 145, and the first intermediate gear shaft 23 cannot oscillate as in the present embodiment. Therefore, the second worm wheel portion 31 of the first layshaft gear 30, having expanded gear pitch circles due to the increase in temperature, may come into forceful contact with the second worm gear portion 22 of the first intermediate gear 20 and the gear may not rotate.

Additionally, when the ambient temperature around the absolute encoder 2 is low, the first layshaft gear 30 contracts according to the linear expansion coefficient of the material, and the pitch circles of the gears of the second worm wheel portion 31 are reduced. At this time, when the through hole 145 formed in the supporting projection 141 of the base 3 is not an elongate hole as in the present embodiment but a circular hole, the layshaft-side end portion 23*b* of the first intermediate gear shaft 23 is fixed by the through hole 145, and the first intermediate gear shaft 23 cannot oscillate as in the present embodiment. In this case, the backlash between the second worm gear portion 22 of the first intermediate gear 20 and the second worm wheel portion 31 of the first layshaft gear 30 increases, and the rotation of the first intermediate gear 22 is not accurately transferred to the first layshaft gear 30.

In contrast, in the absolute encoder 2 according to the present embodiment, as described above, the first intermediate gear shaft 23 is supported in a manner allowing the first intermediate gear shaft 23 to oscillate along the horizontal plane with the supported portion of the main shaft-side end portion 23*a* as a center or a substantial center, and the first intermediate gear 20 is constantly biased by the biasing mechanism 40 from the second worm gear portion 22 side to the second worm wheel portion 31 side. Additionally, the first intermediate gear 20 supported on the first intermediate gear shaft 23 is biased toward the supporting projection 141 by the plate spring 9. Therefore, even when a change in the ambient temperature occurs and the pitch circles of the gears of the second worm wheel portion 31 of the first layshaft gear 30 are changed as described above, the backlash becomes zero while the tooth surfaces between the second worm gear portion 22 and the second worm wheel portion 31 are kept in contact by an appropriate pressing force. Therefore, non-rotation of the gear due to a change in temperature and deterioration of the accuracy of the rotation transmitted from the first intermediate gear 20 to the first layshaft gear 30 can be avoided.

Therefore, in the absolute encoder 2, the influence of backlash in the reduction mechanism on detection accuracy can be reduced. This can broaden the range of the specifiable amount of rotation of the main shaft 1a while maintaining the specifiable resolution of the amount of rotation of the main shaft 1a.

Regardless of the position of the layshaft-side end portion 23b of the first intermediate gear shaft 23 due to oscillation, the biasing mechanism 40 is preferably set so that a constant or substantially constant pressing force is generated from the biasing spring 41.

As described above, the through hole 143 of the supporting projection 131 supporting the main shaft-side end portion 23a of the first intermediate gear shaft 23 has a circular hole shape, the through hole 145 of the supporting projection 141 supporting the layshaft-side end portion 23b has an elongate hole shape with the major axis-side width larger than the minor axis-side width, and the first intermediate gear shaft 23 can oscillate in parallel or substantially parallel to the horizontal direction with the through hole 143 of the supporting projection 141 as a fulcrum. Therefore, during oscillation of the first intermediate gear shaft 23, the amount of movement of the second worm gear portion 22 relative to the second worm wheel portion 31 is greater than the amount of movement of the first worm wheel portion 21 relative to the first worm gear portion 11, and the first worm gear portion 11 and the first worm wheel portion 21 do not bottom out even when the second worm gear portion 22 and the second worm wheel portion 31 bottom out.

Figure 25:
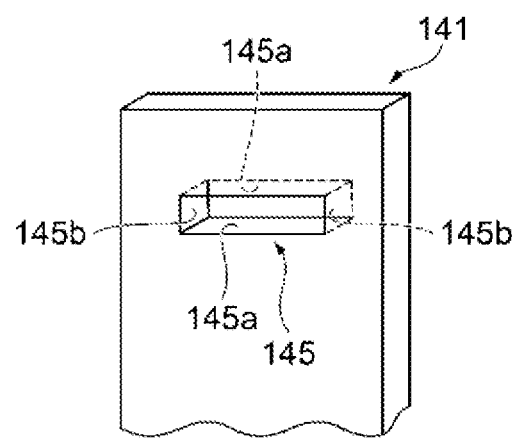
FIG. 25 is a diagram schematically illustrating a modified example of a supporting projection supporting a main shaft-side end portion of the first intermediate gear shaft in the absolute encoder.

As illustrated in FIGS. 10 to 13, the through hole 145 supporting the first intermediate gear shaft 23 at the layshaft-side end portion 23b forms a tubular surface or a substantially cylindrical surface, but the through hole 145 is not limited to having such a shape. For example, as illustrated in FIG. 25, the cross-sectional shape of the through hole 145 may be a rectangle or a substantial rectangle instead of an elongate hole. That is, the through hole 145 may be a through hole extending in a quadrangular pillar shape and forming a pair of surfaces 145a opposing each other and a pair of surfaces 145b opposing each other. The pair of surfaces 145a and the pair of surfaces 145b forming the through hole 145 may be flat surfaces or curved surfaces. In the absolute encoder 2, the pair of surfaces 145a extend in the horizontal direction, and the pair of surfaces 145b extend in the up-down direction. The width in the horizontal direction of the surface 145a is greater than the width in the up-down direction of the surface 145b. The first intermediate gear shaft 23 can oscillate also in the through hole 145 illustrated in FIG. 25 similar to the through hole 145 described above.

Figure 26:
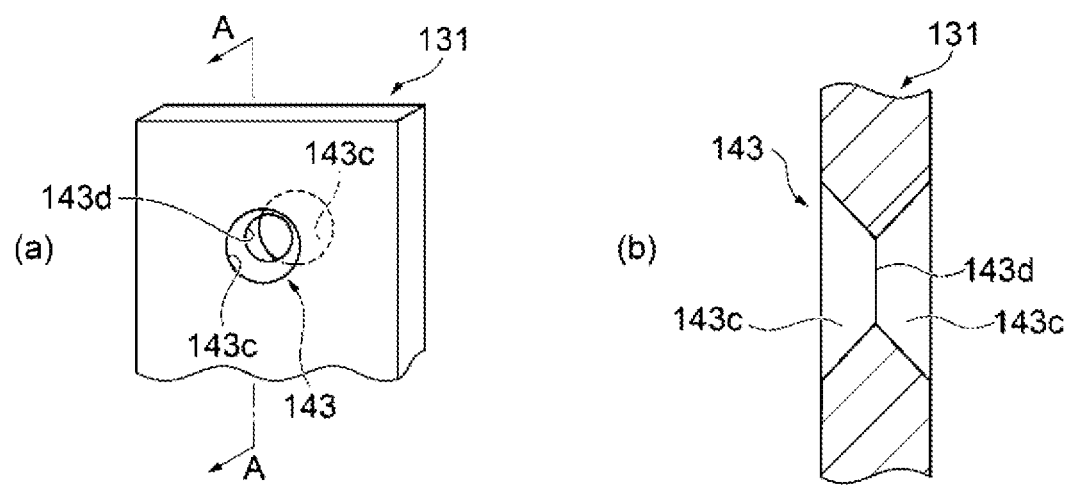
FIG. 26 is a diagram schematically illustrating a modified example of the supporting projection supporting the main shaft-side end portion of the first intermediate gear shaft in the absolute encoder.

Similarly, the through hole 143 is not limited to having the shape described above. For example, the through hole 143 may have a so-called knife edge structure. Specifically, the through hole 143 may be in contact with the first intermediate gear shaft 23 by line contact or point contact. For example, as illustrated in (a) and (b) of FIG. 26, the through hole 143 may be formed by a pair of conical or substantially conical inclined surfaces 143c having a smaller diameter further inward along the extension direction of the through hole 143. In this case, the through hole 143 is in contact with and supports the first intermediate gear shaft 23 along an annular line (connecting line 143d) depicting a circular hole of the connecting portions of the pair of inclined surfaces 143c. The circular hole shape of the connecting line 143d has a similar shape in plan view to the circular hole shape of the through hole 143 described above. Since the through hole 143 supports the first intermediate gear shaft 23 by line contact or point contact, the first intermediate gear shaft 23 can oscillate even though the diameter of the circular hole of the through hole 143 is made closer to the diameter of the first intermediate gear shaft 23. Therefore, the cross-sectional shape of the through hole 143 can be made closer to a shape having no gap between the through hole 143 and the first intermediate gear shaft 23. This can suppress movement of the portion of the first intermediate gear shaft 23 in contact with the through hole 143 during oscillation of the first intermediate gear shaft 23, and the oscillation of the first intermediate gear shaft 23 can suppress variation in the distance between the first worm gear portion 11 and the first worm wheel portion 21. The through hole 145 of the supporting projection 141 may also have the so-called knife edge structure like the through hole 143 of the supporting projection 131 described above, or may be formed by a pair of conical or substantially conical inclined surfaces forming an annular line depicting an elongate hole.

Figure 27:
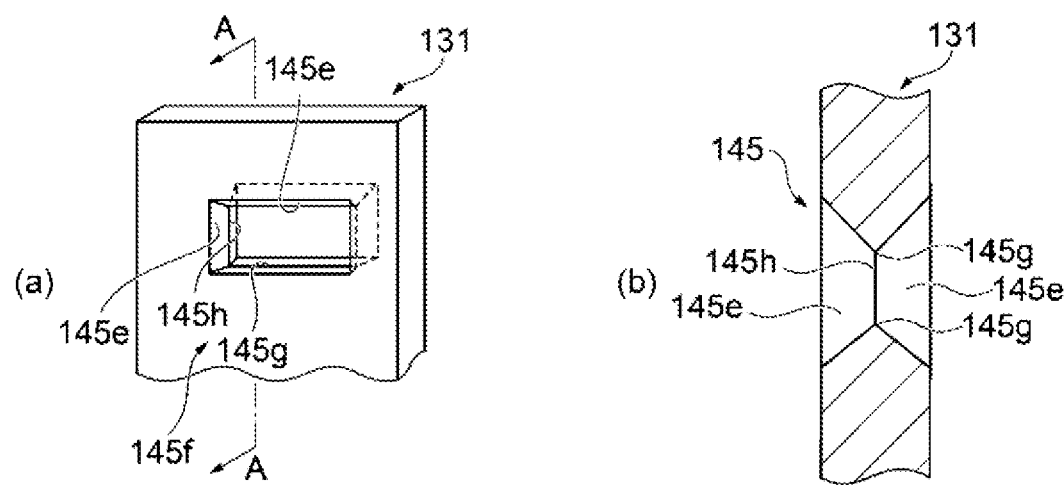
FIG. 27 is a diagram schematically illustrating a modified example of the supporting projection supporting the main shaft-side end portion of the first intermediate gear shaft in the absolute encoder.

As illustrated in (a) and (b) of FIG. 27, the through hole 145 may be formed by a pair of quadrangular pyramid-shaped or substantially quadrangular pyramid-shaped inclined surfaces 145e tapering toward the inner side in the extension direction of the through hole 145. In this case, the through hole 145 is in contact with and supports the first intermediate gear shaft 23 along an annular line (connecting line 145f) depicting a rectangular shape or substantially rectangular shape of connecting portions of the pair of inclined surfaces 145e. The connecting line 145f has line portions 145g being a pair of portions opposing each other, and line portions 145h being a pair of portions opposing each other. The pair of line portions 145g and the pair of line portions 145h may be straight lines or curved lines. In the absolute encoder 2, the pair of line portions 145g extend horizontally, and the pair of line portions 145h extend in the up-down direction. The length of the line portion 145g is greater than the length of the line portion 145h in the up-down direction. The through hole 143 of the supporting projection 131 may also be formed by a pair of quadrangular pyramid-shaped or substantially quadrangular pyramid-shaped inclined surfaces forming an annular line depicting a rectangular shape or a substantially rectangular shape, similar to the through hole 145 of the supporting projection 142 described above. In this case, the annular line is a square or a substantial square. In this case as well, similar to the case in FIG. 26 described above, since the through hole 143 supports the first intermediate gear shaft 23 by line contact or point contact, the first intermediate gear shaft 23 can oscillate even though the length of the line portion extending in the up-down direction (corresponding to the line portion 145h in FIG. 27) and the length of the line portion extending in the horizontal direction (corresponding to the line portion 145g in FIG. 27) are made closer to the diameter of the first intermediate gear shaft 23. Therefore, the shape of the through hole 143 can be made closer to a shape having no gap in the up-down direction and the horizontal direction between the through hole 143 and the first intermediate gear shaft 23. This can suppress movement of the portion of the first intermediate gear shaft 23 in contact with the through hole 143 during oscillation of the first intermediate gear shaft 23, and the oscillation of the first intermediate gear shaft 23 can suppress variation in the distance between the first worm gear portion 11 and the first worm wheel portion 21.

Control Unit

A control unit of the absolute encoder 2 is described below. FIG. 28 is a view of the substrate 5 in FIG. 2 when viewed from the lower surface 5a side. The microcomputer 51, a line driver 52, a bidirectional driver 53, and the connector 6 are mounted on the substrate 5. The microcomputer 51, the line driver 52, the bidirectional driver 53, and the connector 6 are electrically connected by pattern wiring on the substrate 5.

The bidirectional driver 53 performs bidirectional communication with an external device connected to the connector 6. The bidirectional driver 53 converts data such as operation signals into differential signals to communicate with the external device. The line driver 52 converts data representing the amount of rotation into a differential signal, and outputs the differential signal in real time to the external device connected to the connector 6. The connector 6 is connected to a connector of the external device.

Figure 29:
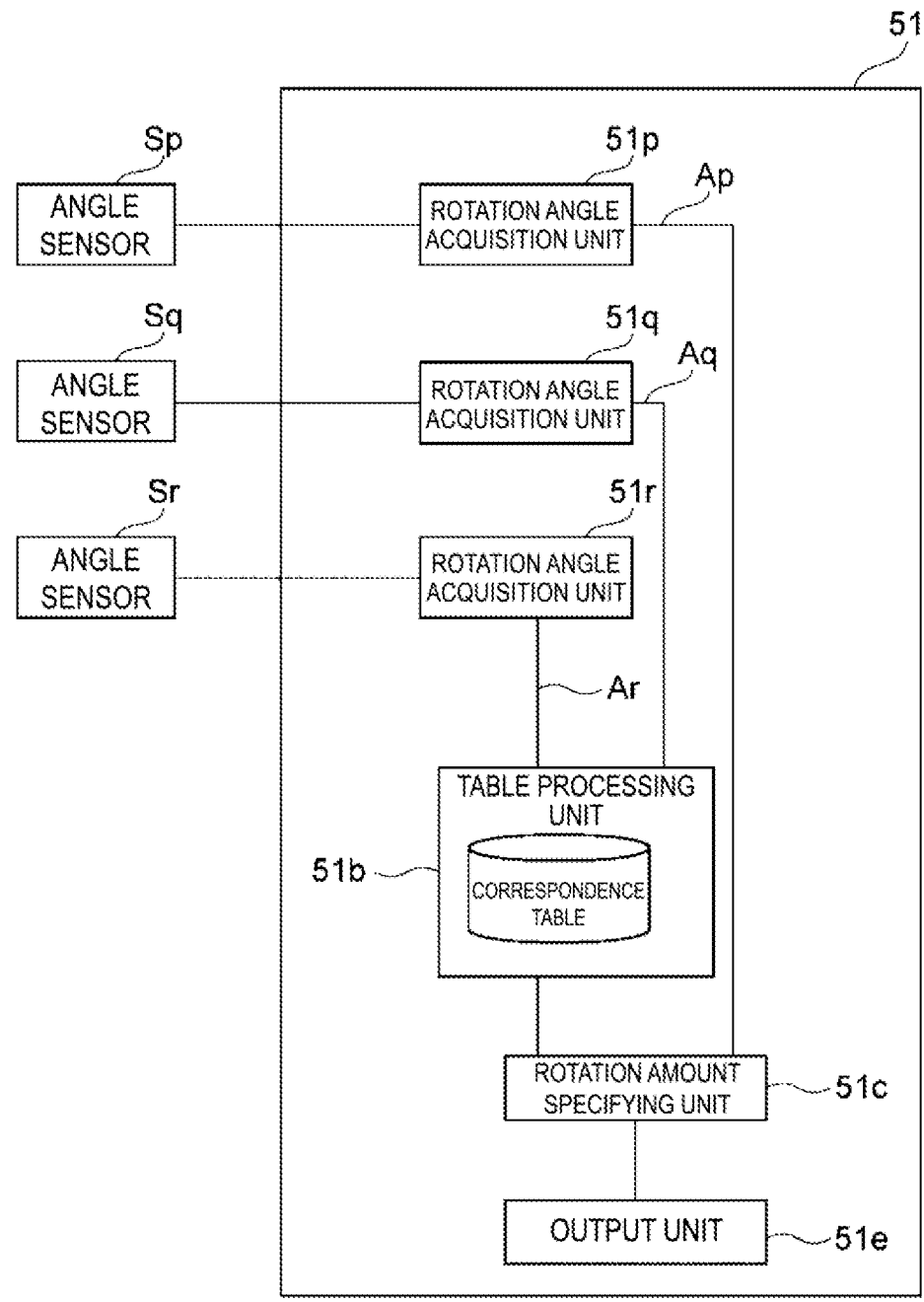
FIG. 29 is a block diagram schematically illustrating a functional configuration of the absolute encoder in FIG. 1.

FIG. 29 is a block diagram schematically illustrating a functional configuration of the absolute encoder 2 in FIG. 1. Each block of the microcomputer 51 illustrated in FIG. 29 represents a function implemented by executing a program by using a central processing unit (CPU) serving as the microcomputer 51.

The microcomputer 51 includes a rotation angle acquisition unit $51p$, a rotation angle acquisition unit $51q$, a rotation angle acquisition unit $51r$, a table processing unit $51b$, a rotation amount specifying unit $51c$, and an output unit $51e$. The rotation angle acquisition unit $51p$ acquires a rotation angle Ap of the main shaft gear 10 based on a signal output from the angle sensor Sp. The rotation angle Ap is angle information indicating the rotation angle of the main shaft gear 10. The rotation angle acquisition unit $51q$ acquires a rotation angle Aq of the first layshaft gear 30 based on a signal output from the magnetic sensor Sq. The rotation angle Aq is angle information indicating the rotation angle of the first layshaft gear 30. The rotation angle acquisition unit $51r$ acquires a rotation angle Ar of the magnet holder 61, that is, the second layshaft gear 63, based on a signal output from the magnetic sensor Sr. The rotation angle Ar is angle information indicating the rotation angle of the second layshaft gear 63.

The table processing unit $51b$ refers to a first correspondence table storing the rotation number of the main shaft gear 10 corresponding to the rotation angle Aq of the first layshaft gear 30 and the rotation angle Ar of the second layshaft gear 63, and specifies the rotation number of the main shaft gear 10 corresponding to the acquired rotation angles Aq and Ar. The rotation amount specifying unit $51c$ specifies the amount of rotation of the main shaft gear 10 over multiple rotations according to the rotation number of the main shaft gear 10 (main shaft 1a) specified by the table processing unit $51b$ and the acquired rotation angle Ap of the main shaft gear 10. The output unit $51e$ converts the amount of rotation of the main shaft gear 10 over the multiple rotations into information indicating the amount of rotation, and outputs the information, the amount of rotation being specified by the rotation amount specifying unit $51c$.

Case and Shielding Member

Figure 30:
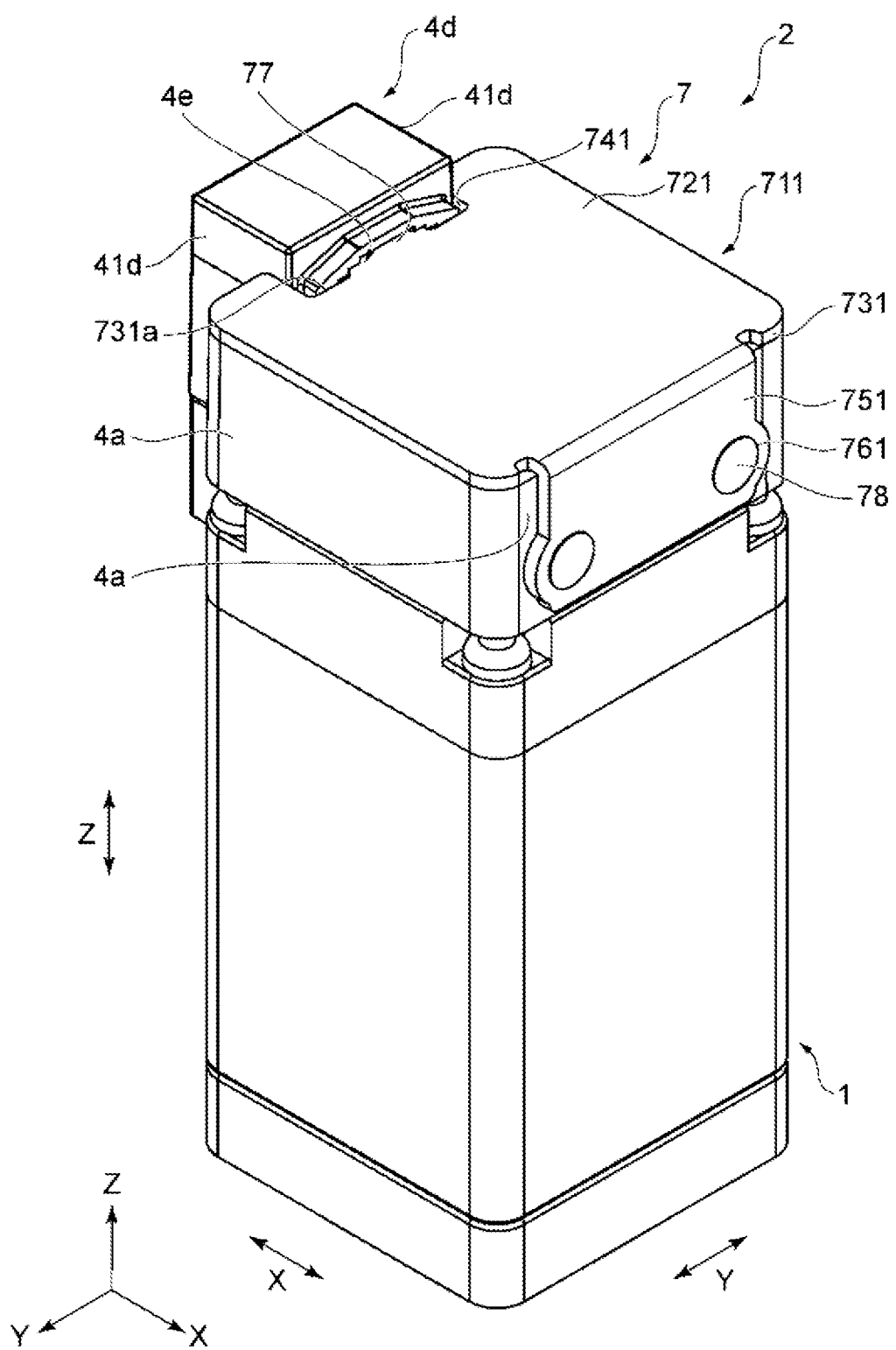
FIG. 30 is a perspective view schematically illustrating configurations of the case and a shielding member included in the absolute encoder.
Figure 31:
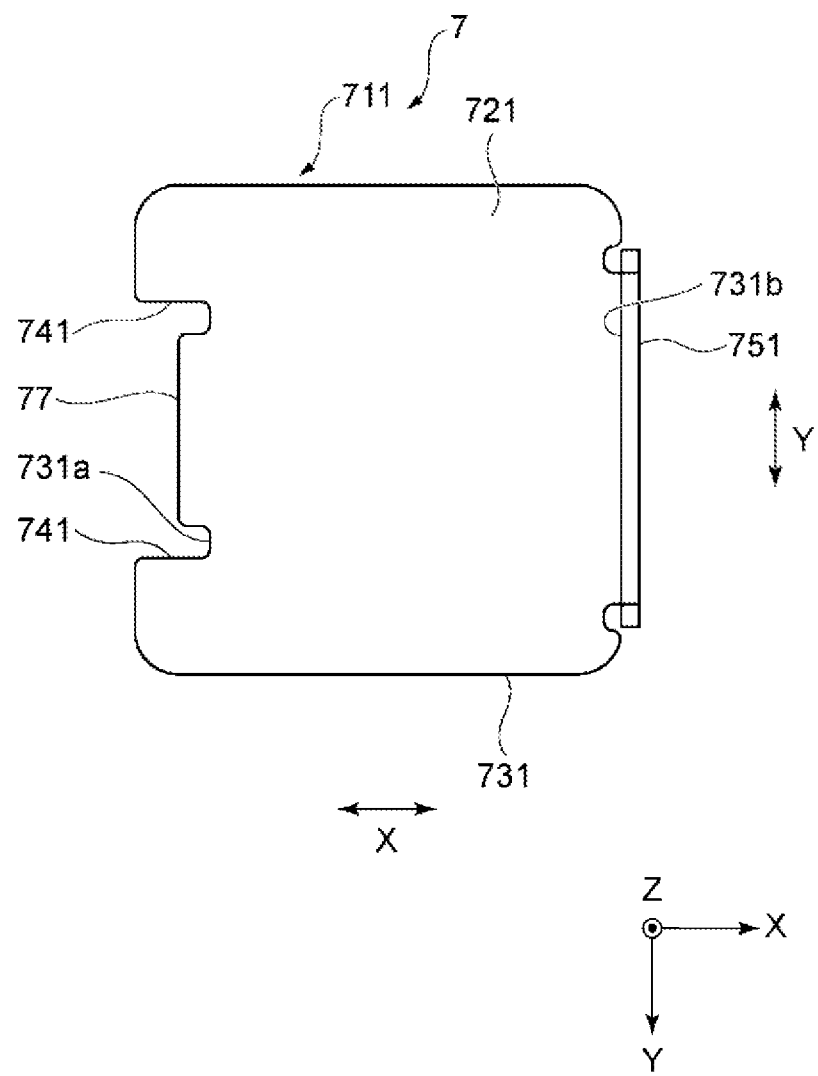
FIG. 31 is a plan view schematically illustrating a configuration of a shielding member included in the absolute encoder.

FIG. 30 is a perspective view schematically illustrating configurations of the case 4 and the shielding member 7 included in the absolute encoder 2. FIG. 31 is a plan view schematically illustrating a configuration of the shielding member 7 included in the absolute encoder 2.

The configuration of the shielding member 7 is described in detail with reference to FIGS. 30 and 31. The shielding member 7 mainly includes a shielding member body 711, a plane portion 721, an outer peripheral portion 731, a protruding portion 77, an outer surface portion 741, a bent surface portion 751, and through holes 761.

The shielding member body 711 is a magnetic member constituting the shielding member 7. The shielding member body 711 has a shape corresponding to the shape of the lid portion 4b, specifically, for example, a member having a flat plat shape, so as to be able to cover the lid portion 4b of the case 4. The plane portion 721 is a plane extending in the X-axis direction and the Y-axis direction in the shielding member body 711. The outer peripheral portion 731 corresponds to an end portion at the outer peripheral side of the plane portion 721.

The protruding portion 77 protrudes outward from an outer peripheral portion 731a at the X-axis side of the shielding member body 711, that is, protrudes in the negative X-axis direction in FIG. 30 and others. The amount of projection of the protruding portion 77 in the negative X-axis direction from the outer peripheral portion 731a is determined by the depth of the recessed portion 4e at the outer side in the X-axis direction. The length (width) of the protruding portion 77 in the Y-axis direction corresponds to the length (width) of the recessed portion 4e in the Y-axis direction. The width of the protruding portion 77 is determined according to the plate thickness of the shielding member 7.

The outer surface portion 741 is provided at the outer side in the width direction (Y-axis direction) of the protruding portion 77. By providing the outer surface portion 741, the protruding portion 77 is provided to be surrounded by the outer surface portion 741 in the Y-axis direction as illustrated in FIG. 31. As illustrated in FIG. 30, the outer surface portion 741 faces the side surface 41d at the outer side in the width direction (Y-axis direction side) from a recessed portion forming portion 4d with the shielding member 7 attached to the case 4.

The bent surface portion 751 is provided at the outer peripheral portion 731b of the shielding member body 711 on a side opposite to the position where the protruding portion 77 is provided. The bent surface portion 751 is bent downward (in the negative Z-axis direction) at a right angle or a substantially right angle with respect to the plane portion 721 so as to extend along the sidewall portion of the case 4, that is, the outer wall portion 4a. The through holes 761 are holes formed in the bent surface portion 751 and passing through the shielding member body 711 in the thickness direction. The through holes 761 are formed at positions corresponding to screw holes 4f of the case 4 with the shielding member 7 attached to the case 4.

Figure 32:
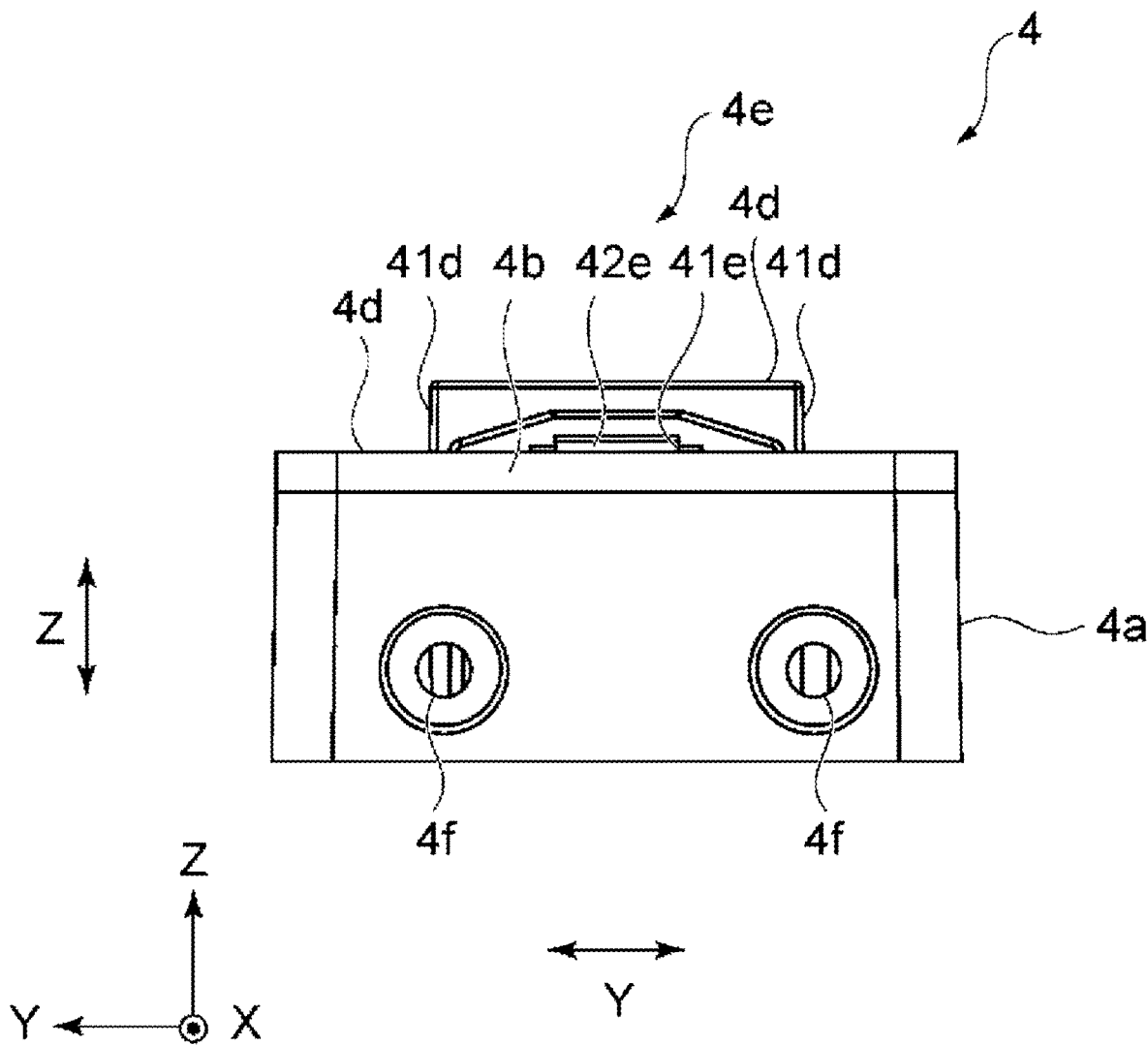
FIG. 32 is a side view schematically illustrating a configuration of the case included in the absolute encoder when viewed from an X-axis direction.
Figure 33:
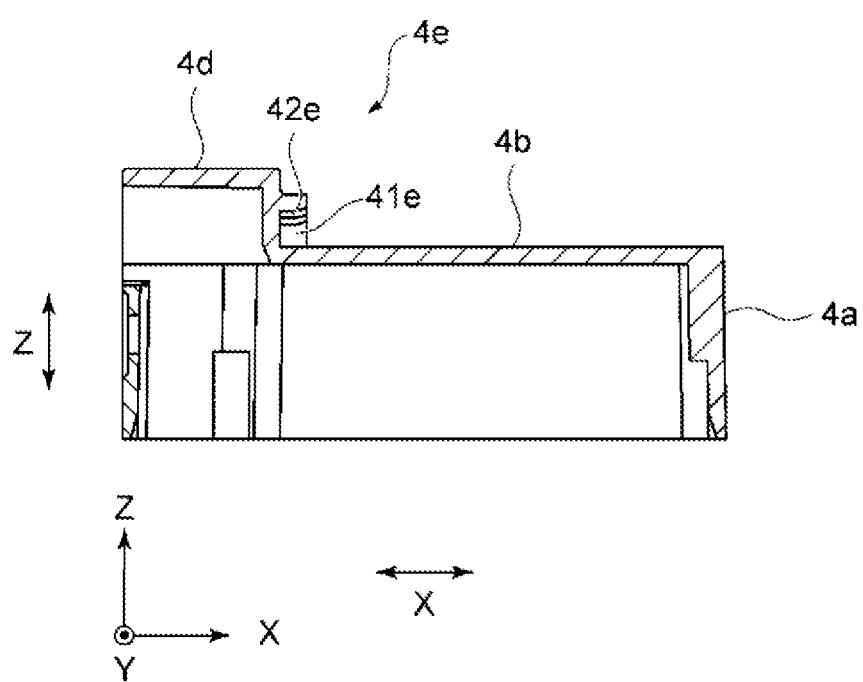
FIG. 33 is a cross-sectional view schematically illustrating the configuration of the case when viewed from a Y-axis direction.

FIG. 32 is a side view schematically illustrating a configuration of the case 4 included in the absolute encoder 2 when viewed from the X-axis direction. FIG. 33 is a cross-sectional view schematically illustrating the configuration of the case 4 when viewed from the Y-axis direction.

The configuration of the case 4 is described in detail with reference to FIGS. 32 and 33 in addition to FIG. 30. The case 4 of the absolute encoder 2 mainly includes the outer wall portion 4a, the lid portion 4b, the recessed portion forming portion 4d, the recessed portion 4e, and the screw hole 4f. The case 4 has a flat and substantially rectangular parallelepiped shape in the X-axis direction and the Y-axis direction and has a length in the height direction (Z-axis direction)

shorter than a length in the depth direction (X-axis direction) and the width direction (Y-axis direction).

The case 4 is provided with a plurality of (for example, four) outer wall portions 4a. The outer wall portion 4a surrounds at least part of the main shaft 1a of the motor 1, the main shaft gear 10, and the first intermediate gear 20 from a side surface (the X-axis direction or the Y-axis direction). The lid portion 4b is formed integrally with the four outer wall portions 4a of the case 4 at upper end portions of the outer wall portions 4a. The outer wall portion 4a and the lid portion 4b define a general shape of a substantially rectangular parallelepiped of the case 4. Inside the outer wall portion 4a and the lid portion 4b, a space capable of accommodating components such as part of the main shaft 1a of the motor 1, the main shaft gear 10 of the absolute encoder 2, and the first intermediate gear 20 is formed.

The recessed portion forming portion 4d protrudes upward (in the positive Z-axis direction) from the outer side of the lid portion 4b corresponding to the upper surface portion of the case 4, for example, from an end portion in the negative X-axis direction. The recessed portion forming portion 4d has a flat and substantially rectangular parallelepiped shape in the X-axis direction and the Y-axis direction and has a length in the height direction (Z-axis direction) shorter than a length in the depth direction (X-axis direction) and the width direction (Y-axis direction). The shape of the recessed portion forming portion 4d is not limited to the example illustrated in FIG. 30 and others as long as the recessed portion 4e can be formed. The recessed portion 4e is formed at the inner side (negative X-axis side) of the recessed portion forming portion 4d.

The recessed portion 4e is a recessed groove provided at the outer side of the lid portion 4b of the case 4, that is, in the recessed portion forming portion 4d at an end portion in the negative X-axis direction in FIG. 30. The depth direction of the groove of the recessed portion 4e is the surface direction of the lid portion 4b of the case 4, that is, the negative X-axis direction in FIG. 30. The recessed portion 4e opens toward the inside of the case 4 in the recessed portion forming portion 4d, that is, toward the center of the case 4 in the X-axis direction in FIG. 30. The recessed portion 4e accommodates the protruding portion 77 inserted from the center direction of the case 4 to the outer side direction. A sidewall portion 41e and an upper wall portion 42e are formed in the recessed portion 4e.

The sidewall portion 41e is a wall-like portion extending in the height direction (Z-axis direction) at the outer side in the width direction (Y-axis direction) of the recessed portion 4e. A plurality of sidewall portions 41e having different widths (lengths in the Y-axis direction) are provided in the recessed portion 4e. The widths of the plurality of sidewall portions 41e are set according to the width of the protruding portion 77 of the shielding member 7 having different plate thicknesses.

The upper wall portion 42e is a wall-like portion extending in the width direction of the recessed portion 4e. A plurality of upper wall portions 42e having different heights from the lid portion 4b are provided in the recessed portion 4e. The height of the upper wall portion 42e from the lid portion 4b is set according to the height (plate thickness of the shielding member 7) of the protruding portion 77 of the plurality of shielding members 7 having different plate thicknesses.

The screw hole 4f is a hole provided at the outer wall portion 4e on the side opposite to the position where the recessed portion 4e is provided in the case 4. A female screw is formed in the hole. The screw hole 4f communicates with the through hole 761 of the shielding member 7 with the shielding member 7 attached to the case 4. The number, position, and hole diameter of the screw holes 4f are not limited to the examples illustrated in FIG. 30 and others.

The relationship between the protruding portion 77 and the recessed portion 4e when the shielding member 7 is attached to the case 4 is described below.

Figure 34:
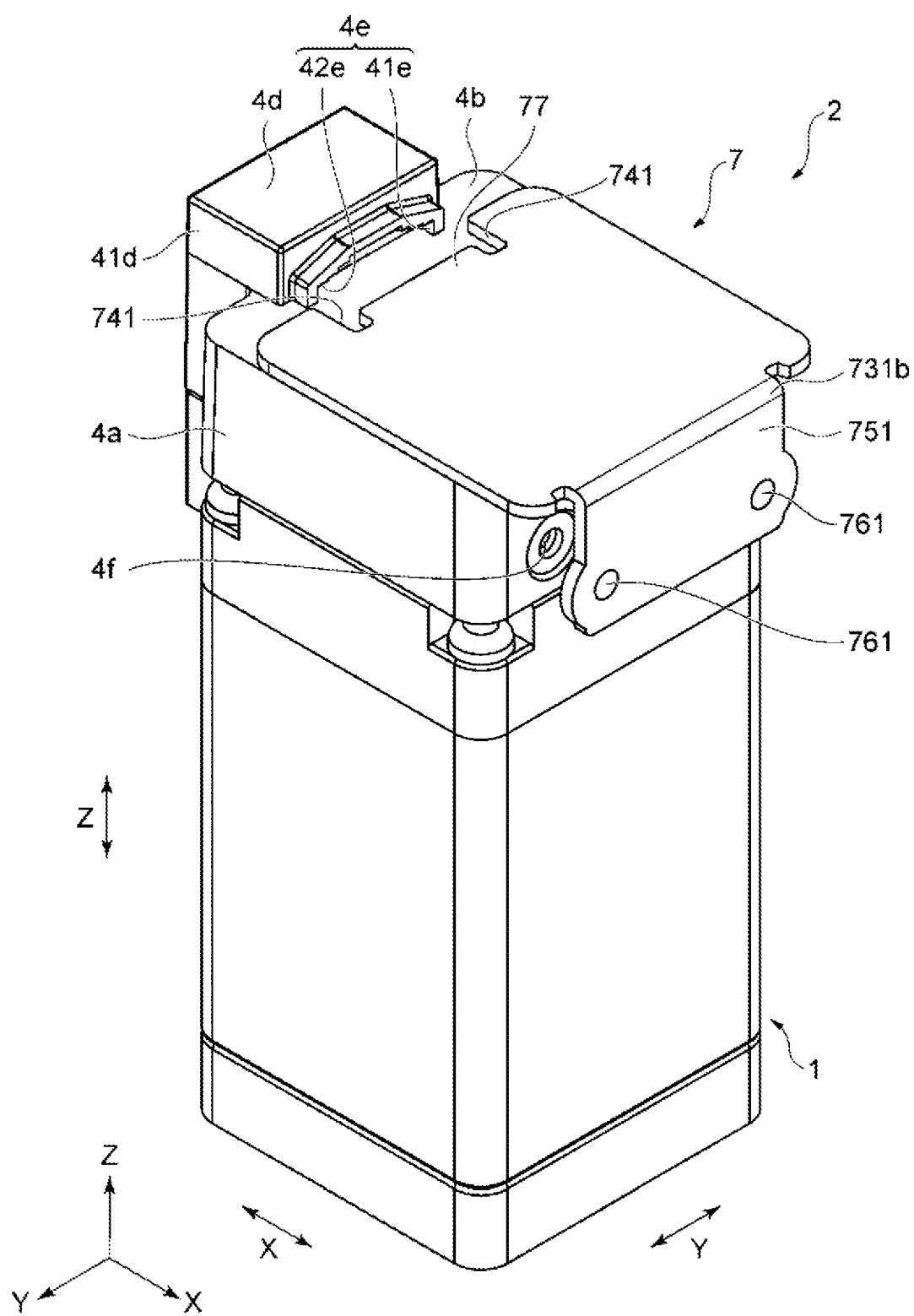
FIG. 34 is a schematic view illustrating a state of a protruding portion of the shielding member being inserted into a recessed portion of the case of the absolute encoder.

FIG. 34 is a schematic view illustrating a state of the protruding portion 77 of the shielding member 7 being inserted into the recessed portion 4e of the case 4 of the absolute encoder 2.

As illustrated in FIG. 34, when the shielding member 7 is attached to the case 4, the shielding member 7 is moved in the X-axis direction so that the plane portion 721 of the shielding member 7 extends along the lid portion 4b of the case 4. By moving the shielding member 7 in this way, the protruding portion 77 is inserted into the recessed portion 4e. The width of the sidewall portion 41e at the lowermost stage (side closest to the lid portion 4b) of the recessed portion 4e is formed corresponding to the width of the protruding portion 77 of the shielding member 7. The height of the upper wall portion 42e at the lowermost step of the recessed portion 4e is formed corresponding to the plate thickness of the shielding member 7. In the shielding member 7, the outer surface portion 741 provided at the outer side in the width direction of the protruding portion 77 is formed corresponding to the width of the outer surface from the recessed portion forming portion 4d of the case 4.

Since the case 4 and the shielding member 7 are formed as described above, positioning of the shielding member 7 with respect to the case 4 in the X-axis direction, the Y-axis direction, and the Z-axis direction is easily performed in the absolute encoder 2.

In the absolute encoder 2, the bent surface portion 751 formed along the outer wall portion 4a of the case 4 is provided at the outer peripheral portion 731b on the side opposite in the X-axis direction to the side where the protruding portion 77 is formed. By providing such a bent surface portion 751, the shielding member 7 is easily positioned in the X-axis direction. The bent surface portion 751 is provided with the through hole 761 for inserting a screw 78 for fixing the shielding member 7 to the case 4. Inserting the screw 78 into the through hole 761 and fastening the screw 78 to the screw hole 4f provided in the outer wall portion 4a of the case 4 allows the absolute encoder 2 to reliably fix the shielding member 7 to the case 4.

Figure 35:
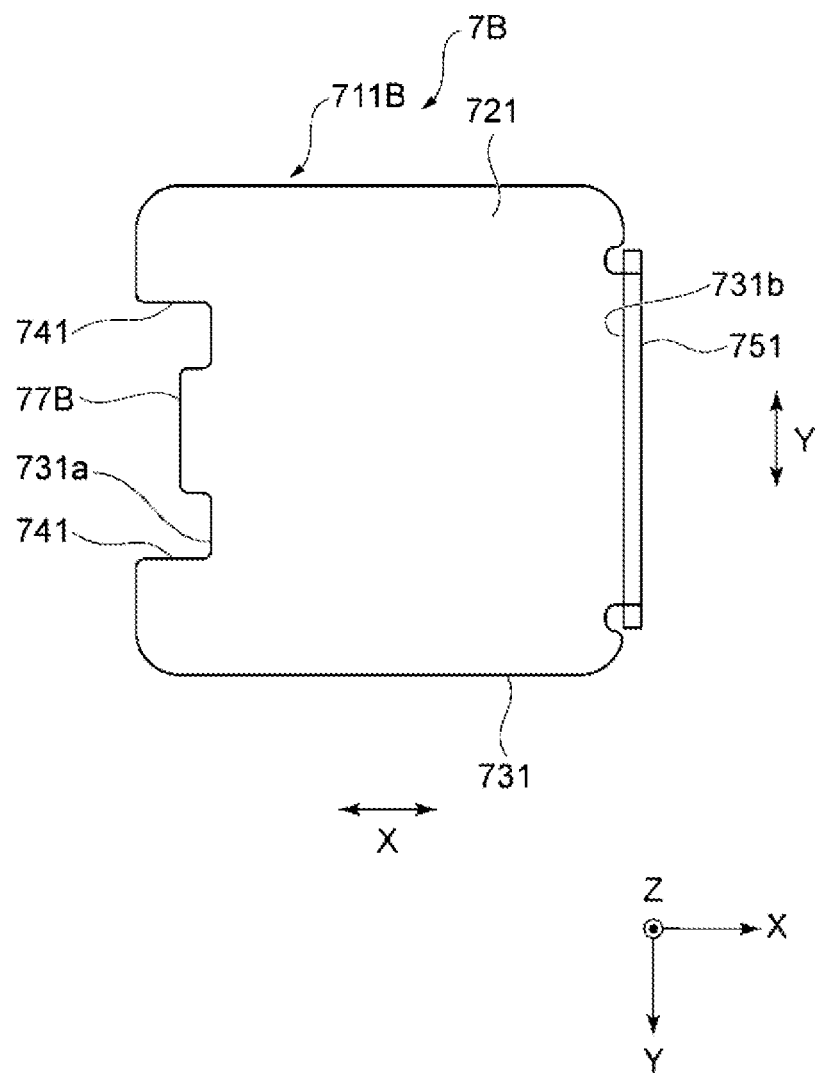
FIG. 35 is a plan view schematically illustrating a configuration of the other shielding member included in the absolute encoder.
Figure 36:
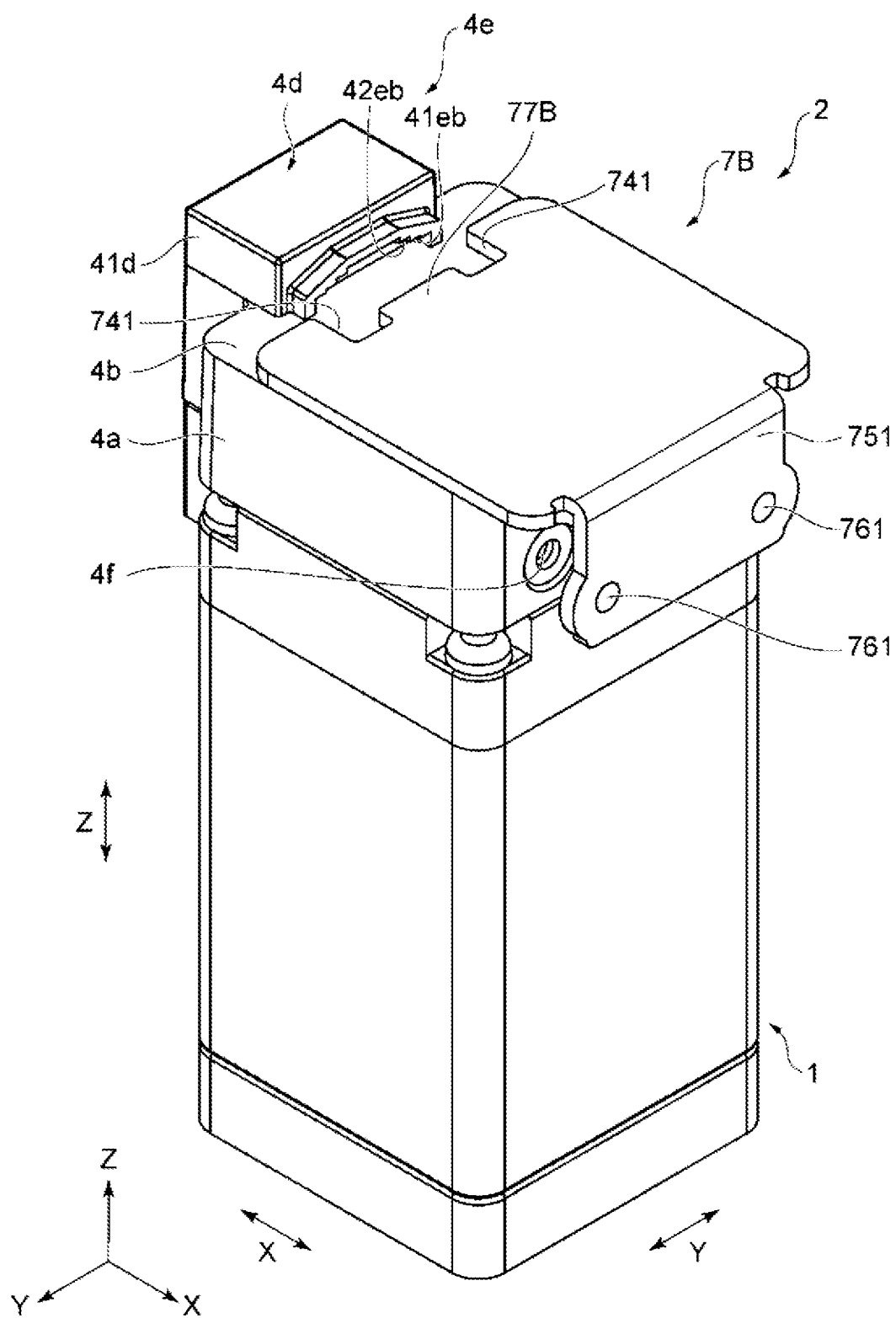
FIG. 36 is a schematic view illustrating a state of a protruding portion of the other shielding member being inserted into the recessed portion of the case of the absolute encoder.
Figure 37:
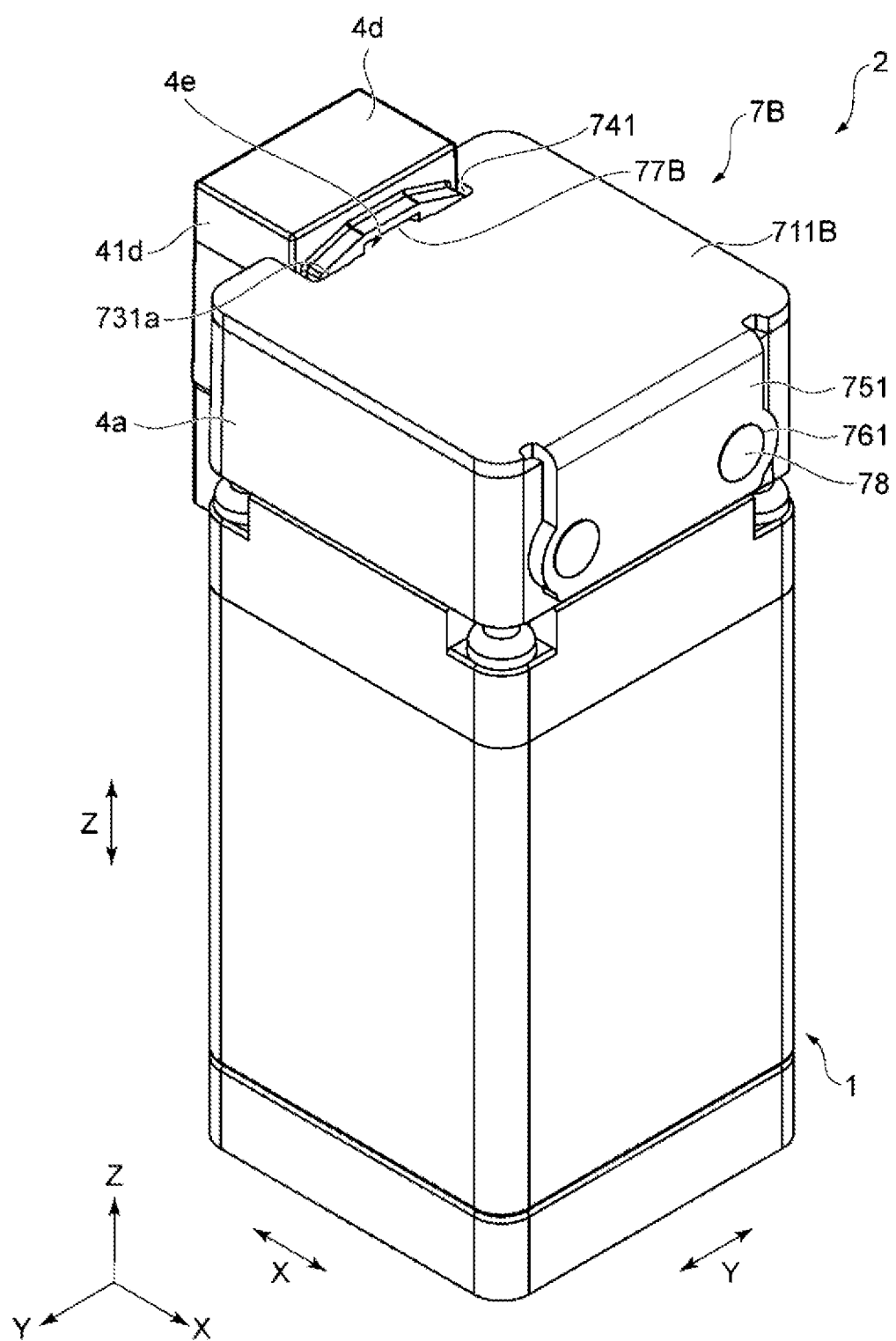
FIG. 37 is a perspective view schematically illustrating the configuration of the absolute encoder including another shielding member.

FIG. 35 is a plan view schematically illustrating the configuration of the shielding member 7B included in the absolute encoder 2. FIG. 36 is a schematic view illustrating a state of a protruding portion 77B of a shielding member 7B being inserted into the recessed portion 4e of the case 4 of the absolute encoder 2. FIG. 37 is a perspective view schematically illustrating the configuration of the absolute encoder 2 including the shielding member 7B.

The shielding member 7B illustrated in FIGS. 35 to 37 is different from the shielding member 7 described above in the following points. The plate thickness of a shielding member body 711B is thicker than the plate thickness of the shielding member 7. In the shielding member 7B, the length (width) of the protruding portion 77B in the Y-axis direction is narrower than the width of the protruding portion 77 of the shielding member 7.

As illustrated in FIG. 36, when the shielding member 7B is attached to the case 4, a plane portion 721B of the shielding member 7B is moved along the lid portion 4b of the case 4. The width of a sidewall portion 41eb at the third stage from below the recessed portion 4e is formed corresponding to the width of the protruding portion 77B of the shielding member 7B. The height of an upper wall portion 42eb at the second stage from below the recessed portion 4e is formed corresponding to the plate thickness of the shielding member 7B.

Since the case 4 and the shielding member 7B are formed as described above, in the absolute encoder 2, positioning in the X-axis direction, the Y-axis direction, and the Z-axis direction of the shielding member 7B with respect to the case 4 is easily performed similar to the shielding member 7 described above.

Figure 38:
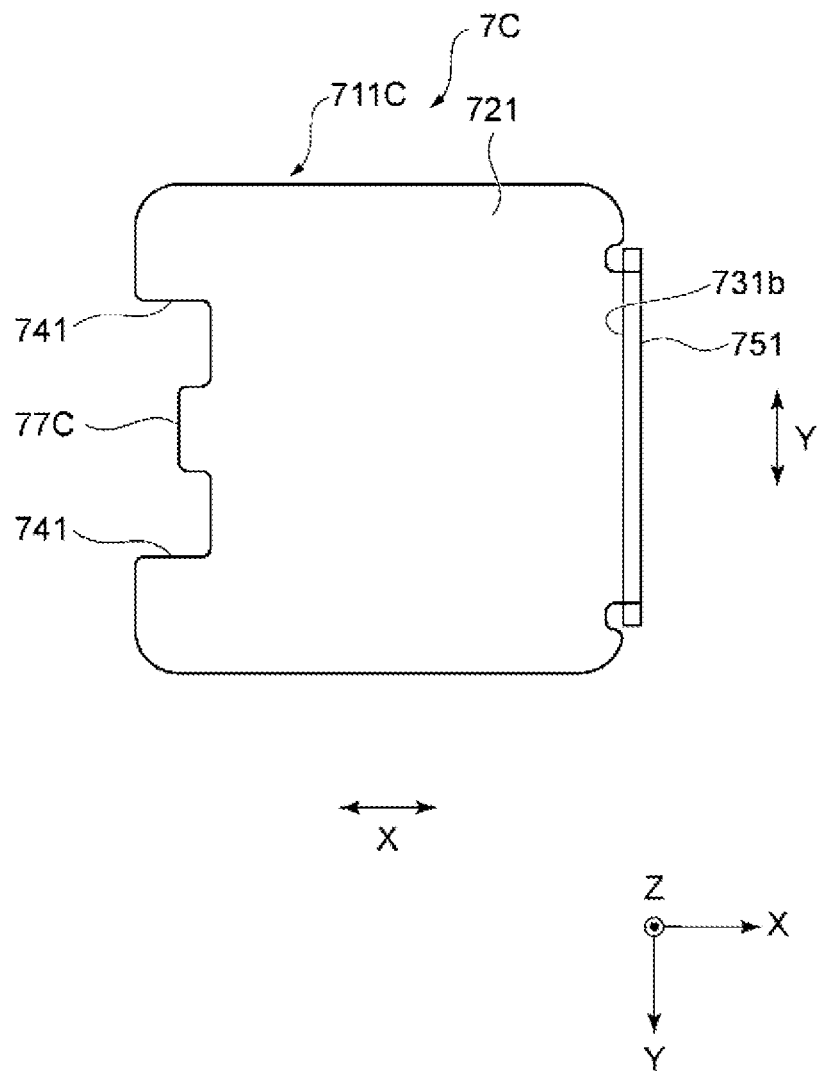
FIG. 38 is a plan view schematically illustrating a configuration of another shielding member included in the absolute encoder.
Figure 39:
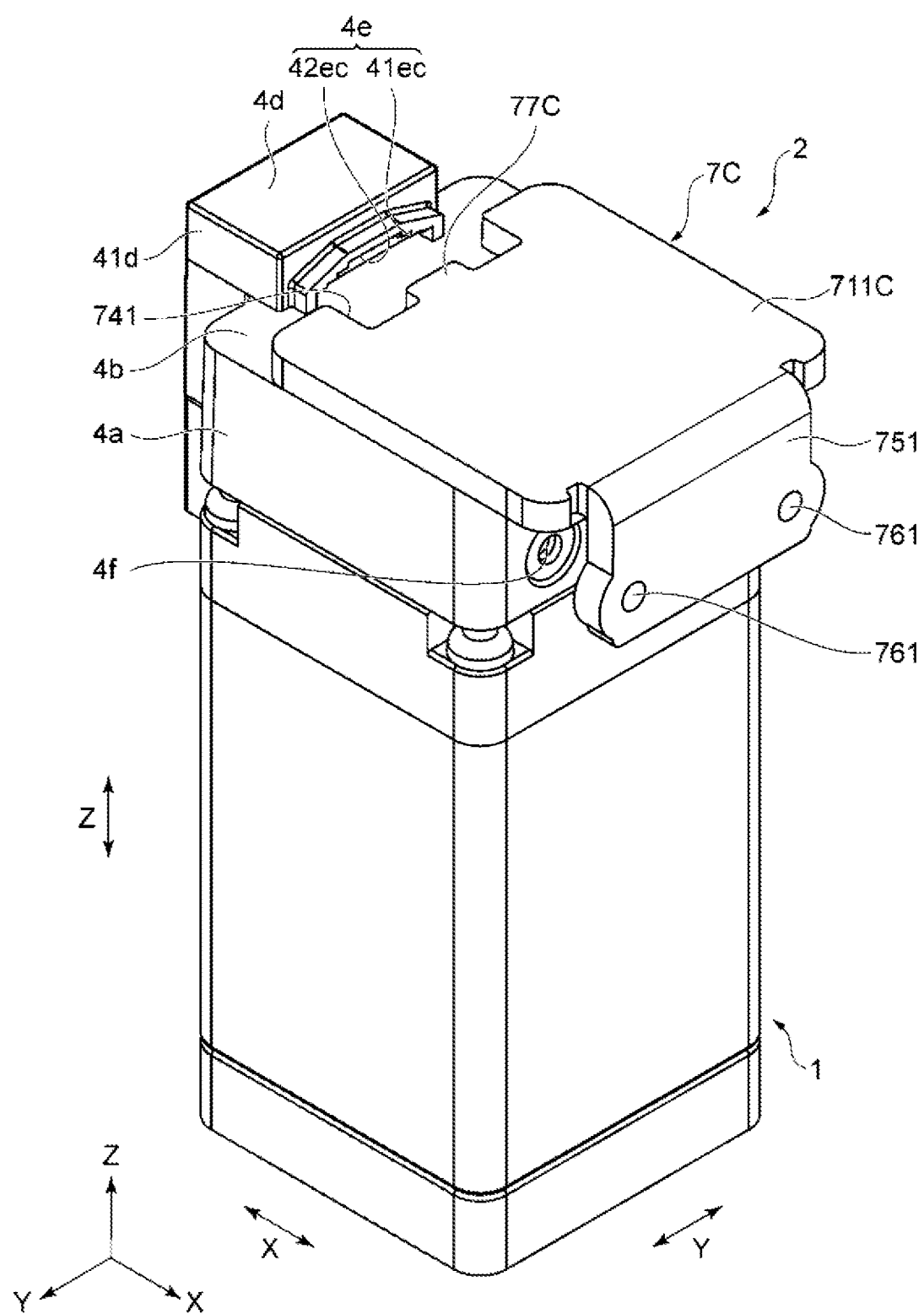
FIG. 39 is a schematic view illustrating a state of a protruding portion of the other shielding member being inserted into the recessed portion of the case of an absolute encoder.
Figure 40:
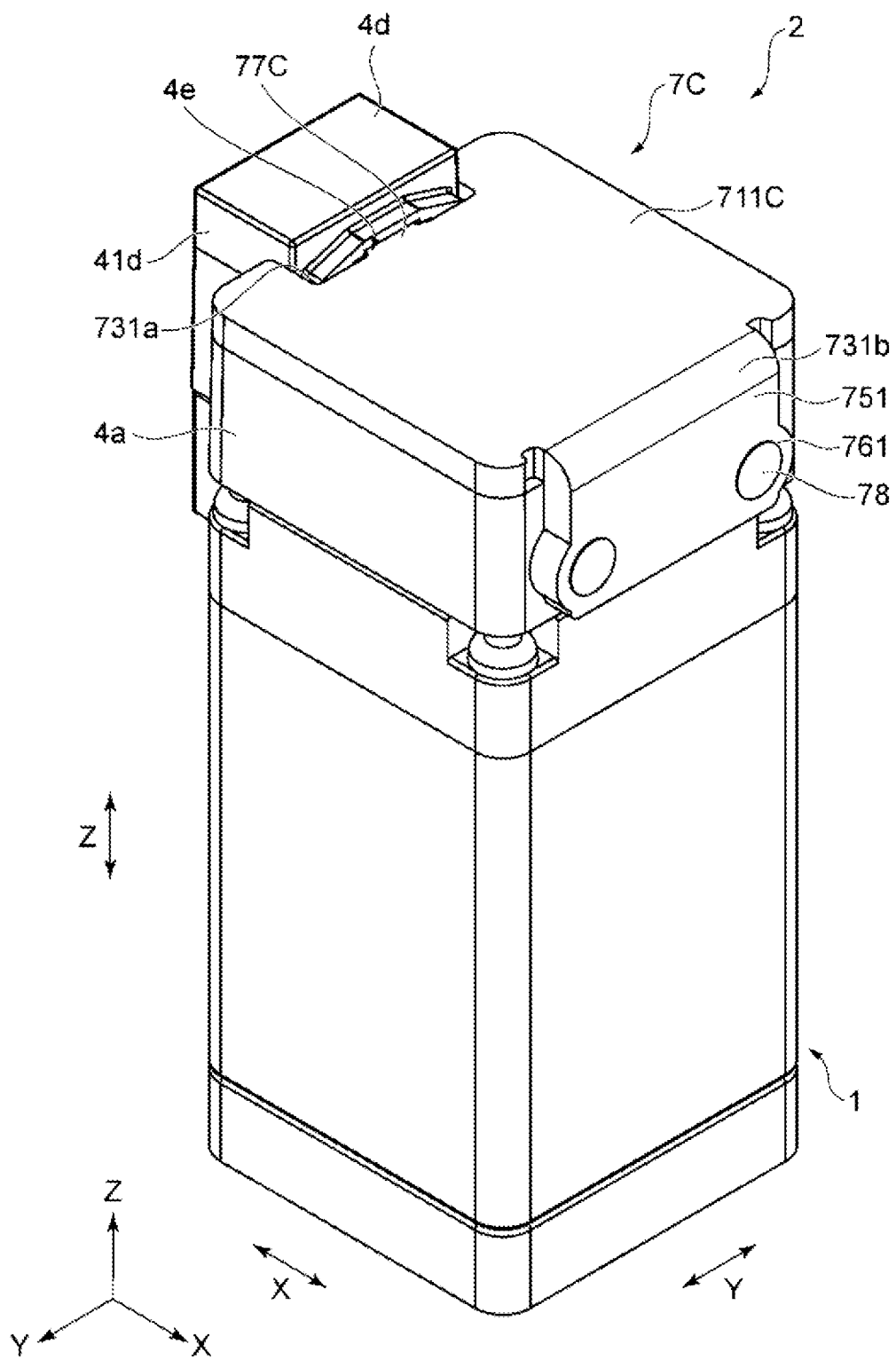
FIG. 40 is a perspective view schematically illustrating the configuration of the absolute encoder including the other shielding member.

FIG. 38 is a plan view schematically illustrating a configuration of a shielding member 7C included in the absolute encoder 2. FIG. 39 is a schematic view illustrating a state of a protruding portion 77C of the shielding member 7C being inserted into the recessed portion 4e of the case 4 of the absolute encoder 2. FIG. 40 is a perspective view schematically illustrating the configuration of the absolute encoder 2 including the shielding member 7C.

The shielding member 7C illustrated in FIGS. 38 to 40 is different from the shielding member 7 and the shielding member 7B described above in the following points. The plate thickness of a shielding member body 711C is thicker than the plate thicknesses of the shielding member 7 and the shielding member 7B. In the shielding member 7C, the length (width) of the protruding portion 77C in the Y-axis direction is narrower than the width of the protruding portion 77 of the shielding member 7 and the protruding portion 77B of the shielding member 7B.

As illustrated in FIG. 39, when the shielding member 7C is attached to the case 4, a plane portion 721C of the shielding member 7C is moved along the lid portion 4b of the case 4. The width of a sidewall portion 41ec at the uppermost stage (farthest from the lid portion 4b) from below the recessed portion 4e is formed corresponding to the width of the protruding portion 77C of the shielding member 7C. The height of an upper wall portion 42ec at the uppermost stage of the recessed portion 4e is formed corresponding to the plate thickness of the shielding member 7C.

Since the case 4 and the shielding member 7C are formed as described above, in the absolute encoder 2, positioning in the X-axis direction, the Y-axis direction, and the Z-axis direction of the shielding member 7C with respect to the case 4 is easily performed similar to the shielding member 7 and the shielding member 7B described above.

That is, in the absolute encoder 2, the combination of the plurality of sidewall portions 41e having different widths and the plurality of upper wall portions 42e having different heights of the recessed portion 4e provided in the case 4 is set according to the widths of the protruding portions 77, 77B, and 77C of the shielding members 7, 7B, and 7C having different plate thicknesses. As the plate thicknesses of the shielding members 7, 7B, and 7C increase, the effect of magnetic shielding of the angle sensors Sp, Sq, and Sr of the case 4 from the outside increases. Consequently, the absolute encoder 2 configured in this manner can easily select the shielding members 7, 7B, and 7C having various plate thicknesses according to requirements for the performance of the shielding effect due to various factors such as the use of magnetic sensors having different performances.

Figure 41:
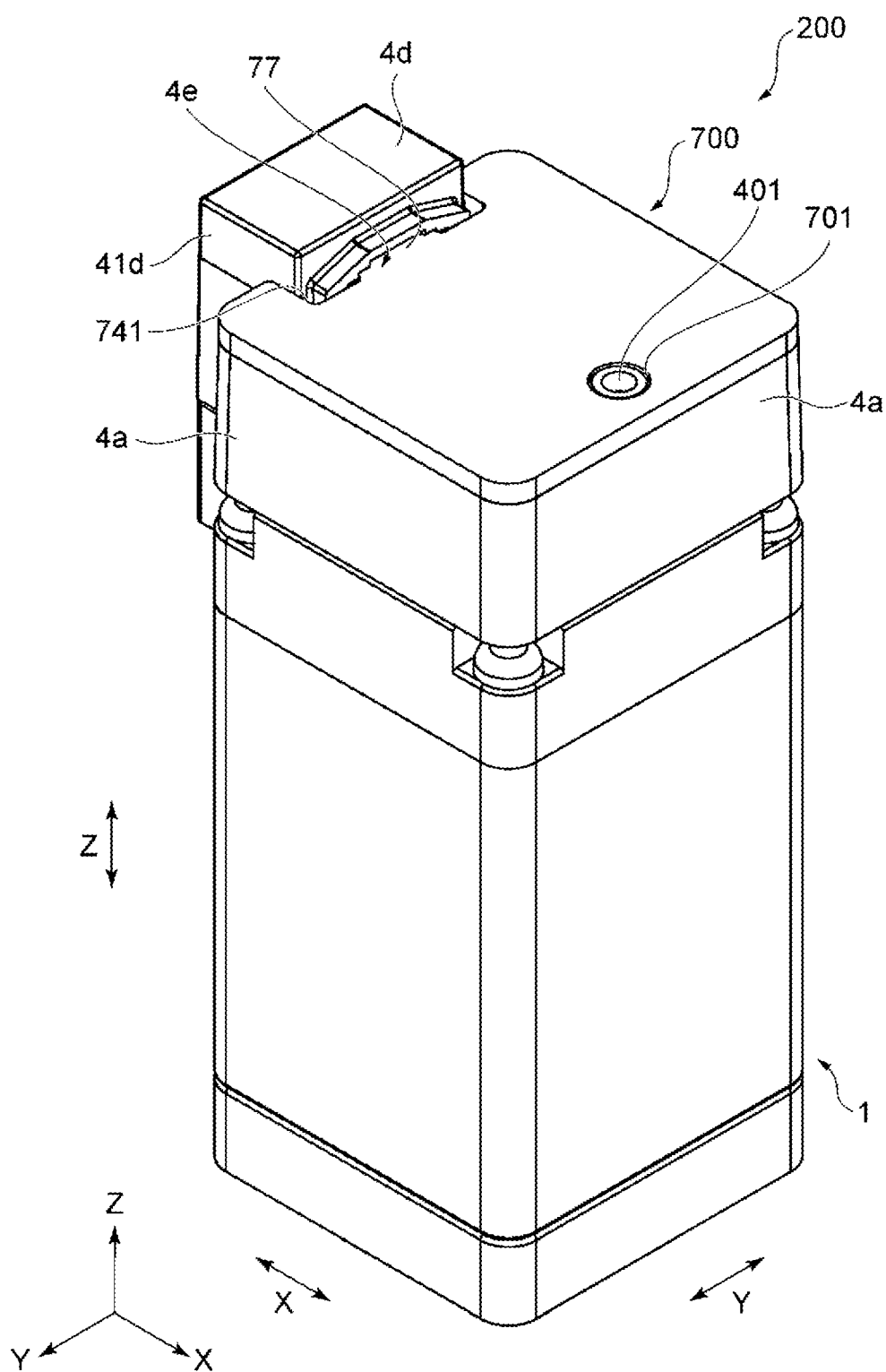
FIG. 41 is a perspective view schematically illustrating a configuration of an absolute encoder according to a modified example of an embodiment of the present invention.

FIG. 41 is a perspective view schematically illustrating a configuration of an absolute encoder 200 according to a modified example of an embodiment of the present invention. In FIG. 41, in an absolute encoder 200, configurations of a case 400 and a shielding member 700 are different from the configurations of the case 4 and the shielding members 7, 7B and 7C described above in the following points.

The case 400 is different from the case 4 described above in that a boss portion 401 protruding upward (in the positive Z-axis direction) from the lid portion 4b is provided and the screw hole 4f is not provided in the outer wall portion 4a. The shielding member 700 is different from the shielding members 7, 7B, and 7C in that a boss hole 701 capable of accommodating the boss portion 401 is provided and the bent surface portion 751 and the through hole 761 are not provided.

In the absolute encoder 2 described above, the positioning of the shielding members 7, 7B, and 7C in the X-axis direction with respect to the case 4 is performed by the bent surface portion 751 and the outer wall portion 4a. On the other hand, in the absolute encoder 200, positioning of the shielding member 700 in the X-axis direction with respect to the case 400 is performed by the boss portion 401 of the case 400 and the boss hole 701 of the shielding member 700.

Also in the absolute encoder 200 described above, positioning in the X-axis direction, the Y-axis direction, and the Z-axis direction of the shielding member 700 with respect to the case 400 is easily performed similar to the absolute encoder 2 described above.

In particular, the absolute encoder 200 is provided with the boss portion 401 protruding upward (in the positive Z-axis direction) from the lid portion 4b of the case 4. The absolute encoder 200 is provided with the boss hole 701 engageable with the boss portion 401 at a position corresponding to the boss portion 401 of the plane portion 721 of the shielding member 700. The shielding member 700 includes the boss portion 401 and the boss hole 701, allowing the shielding member 700 to be easily positioned in the X-axis direction. The boss portion 401 and the boss hole 701 are fixed fitted into each other at the time of assembly by using the bending of the case 400 and the shielding member 700. Having such a configuration allows the absolute encoder 200 to reliably fix the shielding member 700 to the case 400 with a simple configuration.

An embodiment of the present invention has been described above, but the present invention is not limited to the absolute encoder 2 according to the embodiment of the present invention described above and includes any aspects included in the gist of the present invention and the scope of the claims. Further, configurations may be combined with each other or combined with known technology as appropriate to at least partially address the problem described above and achieve the effects described above. For example, a shape, a material, an arrangement, a size, and the like of each of the components in the embodiment described above may be changed as appropriate according to a specific usage aspect of the present invention.

REFERENCE SIGNS LIST

1 Motor, 1a Main shaft, 1b Press-fitting portion, 2 Absolute encoder, 3 Base, 3a Supporting plate, 4 Case, 4a Outer wall portion, 4b Lid portion, 4c Claw portion, 4d Recessed portion forming portion, 4e Recessed portion, 4f Screw hole, 5 Substrate, 5a Lower surface, 5b Positioning hole, 6 Connector, 7 Shielding member, 7B Shielding member, 7C Shielding member, 8a Screw, 8b Screw, 8c Screw, 9 Plate spring, 9a One end, 9b Other end, 10 Main shaft gear, 11 First worm gear portion, 12 Main shaft adapter, 12a Upper end surface, 13 Tubular portion, 13a Upper end surface, 14 Press-fitting portion, 15 Magnet holding portion, 15a Inner peripheral surface, 15b Bottom surface, 20 First intermediate gear, 21 First worm wheel portion, 22 Second worm gear portion, 23 First intermediate gear shaft, 23a Main shaft-side end portion, 23b Layshaft-side end portion, 23c Groove, 23d Engaged groove, 24 Tubular portion, 24a Through hole, 24b Inner peripheral surface, 25 Main shaft-side sliding portion, 26 Layshaft-side sliding portion, 30 First layshaft gear, 31 Second worm wheel portion, 32 Gear portion, 33 Through hole, 35 Magnet holder, 35a Magnet holding portion, 35b Shaft portion, 35c Bearing stopper, 35d Bearing positioning member, 40 Biasing mechanism, 41 Biasing spring, 41d Side surface, 41e Sidewall portion, 41eb Sidewall portion, 41ec Sidewall portion, 42 Spring portion, 42e Upper wall portion, 42eb Upper wall portion, 42ec Upper wall portion, 43 Engaging portion, 43a Engaging groove, 43b Tip end edge, 43c Connecting portion, 44 Fixed portion, 44a Hole, 45 Supporting projection, 45a Supporting surface, 51 Microcomputer, 51b Table processing unit, 51c Rotation amount specifying unit, 51e Output unit, 51p Rotation angle acquisition unit, 51q Rotation angle acquisition unit, 51r Rotation angle acquisition unit, 52 Line driver, 53 Bidirectional driver, 60 Magnetism detection device, 61 Magnet holder, 62 Second layshaft gear shaft, 62a Lower end surface, 62b Upper end surface, 62c Groove, 62d Snap ring, 62e Tapered surface portion, 62f One end portion, 62g Peripheral surface, 62h Connecting portion, 63 Second layshaft gear, 64 Gear portion, 65 Magnet holder portion, 65a Fitting portion, 65b Magnet accommodating portion, 66 Main body portion, 66a Through hole, 66b Lower end surface, 66c Upper end surface, 67 Magnet supporting portion, 67a Inner peripheral surface, 67b Outer peripheral surface, 67c Upper end surface, 68 Tubular portion, 68a Inner peripheral surface, 68b Inner peripheral surface, 68c Opening end, 68d Closed end, 68e Outer peripheral surface, 69 Bottom portion, 69a Bottom surface, 69b Opening portion, 70 second intermediate gear, 711 Shielding member body, 71 Gear portion, 711B Shielding member body, 711C Shielding member body, 72 Gear portion, 73 Main body portion, 73a Lower end surface, 73b Upper end surface, 74 Through hole, 75 Shaft, 75a Lower end surface, 75b Upper end surface, 75c Groove, 76 Snap ring, 77 Protruding portion, 77B Protruding portion, 77C Protruding portion, 78 Screw, 100 Shielding member, 101 Base portion, 102 Lower surface, 103 Recessed portion, 104 Upper surface, 105 Outer peripheral surface, Right-side outer peripheral surface, 106 Rear-side outer peripheral surface, 107 Left-side outer peripheral surface, 108 Front-side outer peripheral surface, 110 Substrate pillar, 111 Upper end surface, 112 Screw hole, 120 Substrate positioning pin, 121 Tip end portion, 122 Base portion, 123 Stepped surface, 124 One end portion, 125 Other end portion, 126 Tapered surface portion, 126a Connecting portion, 127 Tapered surface portion, 127a Connecting portion, 128 Through hole, 128a First hole portion, 128b End portion, 128c Second hole portion, 129 Peripheral surface, 131 Supporting projection, 131a Outer surface, 132 Supporting projection, 132a Projection, 134 Bearing holder portion, 135 Bearing, 136 Shaft supporting portion, 136a Through hole, 137 Shaft supporting portion, 137a Through hole, 141 Supporting projection, 141a Inner surface, 142 Supporting projection, 143 Through hole, 143c Inclined surface, 143d Connecting line, 144 Snap ring, 145 Through hole, 145a Surface, 145b Surface, 145e Inclined surface, 145f Connecting line, 145g Line portion, 145h Line portion, 200 Absolute encoder, 400 Case, 401 Boss portion, 700 Shielding member, 701 Boss hole, 721 Plane portion, 721B Plane portion, 721C Plane portion, 731 Outer peripheral portion, 731a Outer peripheral portion, 731b Outer peripheral portion, 741 Outer surface portion, 751 Bent surface portion, 761 Through hole, Ap Angle information, Aq Angle information, BC Central axis of bearing, GC1 Central axis of main shaft gear, GC2 Central axis of first layshaft gear, GC3 Central axis, GC4 Central axis, MoC Central axis of main shaft of motor, Mp Magnet, Mpa Upper surface, Mpb Lower surface, MpC Central axis of magnet, Mpd Outer peripheral surface, Mq Magnet, Mqa Upper surface, Mqb Lower surface, MqC Central axis of magnet, Mqd Outer peripheral surface, Mr Magnet, Mra Upper surface, Mrb Lower surface, MrC Central axis of magnet, Mrd Outer peripheral surface, P Biasing direction, P1 First meshing direction, P2 Second meshing direction, R1 First transmission mechanism, R2 Second transmission mechanism, SaC Central axis of main shaft adapter, SC Central axis of magnet holder, Sp Angle sensor, Sq Angle sensor, Sr Angle sensor, XYZ Orthogonal coordinate system

The invention claimed is:

1. A magnetism detection device, comprising:
a magnet magnetized;
a magnetic sensor configured to detect a magnetic flux from the magnet;
a magnet holder holding the magnet;
a shaft;
a case including a plurality of sidewall portions and an upper surface portion and configured to accommodate the magnet and the magnetic sensor inside; and
a shielding member having a flat plate shape and a shape corresponding to the upper surface portion and attached to the upper surface portion,
wherein the shielding member includes a protruding portion protruding outward from an outer peripheral portion,
the case includes a recessed portion opening inward at an end portion outside of the upper surface portion and configured to accommodate the protruding portion, and
the recessed portion includes a plurality of sidewall portions having different widths and a plurality of upper wall portions having different heights.

2. The magnetism detection device according to claim 1, wherein the heights of the plurality of upper wall portions are set according to a height of the protruding portion of a plurality of the shielding members having different plate thicknesses, and
the widths of the plurality of sidewall portions are set according to a width of the protruding portion of the plurality of the shielding members having different plate thicknesses.

3. The magnetism detection device according to claim 1, wherein the case includes a recessed portion forming portion with the recessed portion formed projecting upward from an end portion outside of the upper surface portion, and
the shielding member includes an outer surface portion facing the recessed portion forming portion at an outer side in a width direction from the protruding portion.

4. The magnetism detection device according to claim 1, wherein the case includes a boss portion protruding upward from the upper surface portion, and the shielding member includes a boss hole configured to accommodate the boss portion.

5. The magnetism detection device according to claim 1, wherein the shielding member includes, at an outer peripheral portion on a side opposite to a position where the protruding portion is provided, a bent surface portion bent along a sidewall portion of the sidewall portions of the case and a through hole formed in the bent surface portion, and the case includes, at the sidewall portion on a side opposite to a position where the recessed portion is provided, a screw hole configured to communicate with the through hole.

6. An absolute encoder comprising a magnetism detection device according to claim 1.

* * * * *